United States Patent
Daneshvaran et al.

(10) Patent No.: US 11,964,752 B2
(45) Date of Patent: Apr. 23, 2024

(54) ACOUSTICALLY TREATED LANDING GEAR DOOR AND METHOD FOR REDUCING NOISE FROM LANDING GEAR OF AN AIRCRAFT

(71) Applicant: The Boeing Company, Chicago, IL (US)

(72) Inventors: Navid Daneshvaran, Mukilteo, WA (US); Justin H. Lan, Bothell, WA (US); Takao Suzuki, Mill Creek, WA (US); Deric A. Babcock, Saint Charles, MO (US); Jordan R. Kreitzman, Saint Charles, MO (US); Eric H. Nesbitt, Duvall, WA (US)

(73) Assignee: The Boeing Company, Arlington, VA (US)

( * ) Notice: Subject to any disclaimer, the term of this patent is extended or adjusted under 35 U.S.C. 154(b) by 86 days.

(21) Appl. No.: 17/726,491

(22) Filed: Apr. 21, 2022

(65) Prior Publication Data

US 2022/0380026 A1    Dec. 1, 2022

Related U.S. Application Data

(60) Provisional application No. 63/193,562, filed on May 26, 2021.

(51) Int. Cl.
*B64C 25/00* (2006.01)
*B64C 25/16* (2006.01)
(Continued)

(52) U.S. Cl.
CPC ............ *B64C 25/001* (2013.01); *B64C 25/16* (2013.01); *G10K 11/168* (2013.01); *G10K 11/20* (2013.01); *B64C 2025/003* (2013.01)

(58) Field of Classification Search
CPC . B64C 25/001; B64C 25/16; B64C 2025/003; G10K 11/168; G10K 11/20
See application file for complete search history.

(56) References Cited

U.S. PATENT DOCUMENTS

| 8,708,272 B1 * | 4/2014 | Jones ............... B64C 23/005 244/1 N |
| 2006/0219475 A1 | 10/2006 | Olsen et al. |

(Continued)

FOREIGN PATENT DOCUMENTS

| GB | 2252076 A  * | 7/1992 | ............ B32B 3/12 |
| GB | 2252076 A | 7/1992 | |

(Continued)

OTHER PUBLICATIONS

Dobrzynski, Werner M., "Airframe Noise: Landing Gear Noise", Encyclopedia of Aerospace Engineering, Dec. 15, 2010, John Wiley & Sons, Ltd., DOI: 10.1002/9780470686652.eae337, 13 pages.

(Continued)

*Primary Examiner* — Justin M Benedik

(57) ABSTRACT

There is provided an acoustically treated landing gear door for reducing noise from a landing gear of an aircraft. The acoustically treated landing gear door includes a landing gear door for attachment to the aircraft. The landing gear door includes an acoustic treatment assembly integrated on an inner mold line of an interior side, and extending within an interior cavity of the landing gear door. The acoustic treatment assembly includes a core structure having a first side and a second side, a plurality of core cells extending between the first side and the second side, and a drainage system. The acoustic treatment assembly further includes an acoustic facesheet and a nonporous backsheet. The acoustically treated landing gear door reduces the noise from the landing gear, when the landing gear is in a deployed posi- (Continued)

tion, by attenuating acoustic waves emanating from the landing gear and reflected off the acoustic treatment assembly.

20 Claims, 21 Drawing Sheets

(51) Int. Cl.
*G10K 11/168* (2006.01)
*G10K 11/20* (2006.01)

(56) References Cited

U.S. PATENT DOCUMENTS

| | | |
|---|---|---|
| 2015/0102162 A1 | 4/2015 | Langtry et al. |
| 2017/0369147 A1 | 12/2017 | Wong |

FOREIGN PATENT DOCUMENTS

| | | |
|---|---|---|
| WO | 2004039671 A1 | 5/2004 |
| WO | 2004089743 A1 | 10/2004 |

OTHER PUBLICATIONS

Ito, Y. et al., "Noise Reduction of Regional Jet Two-Wheel Main Landing Gear", Database Compendex, Engineering Information Inc., New York, NY, US; Database accession No. E20195107868978, 25th AIAA (American Institute of Aeronautics and Astronautics Inc.) / CEAS (Council of European Aerospace Societies) Aeroacoustics Conference, 2019, DOI: 10.2514/6.2019-2481, 2 pages.

Extended European Search Report (EESR), European Patent Office, dated Sep. 23, 2022, for Application No. EP22171572.5, Applicant The Boeing Company, 10 pages.

Takaishi et al., "Further Noise Reduction Design for Landing Gear toward FQUROH Second Flight Demonstration", AIAA (American Institute of Aeronautics and Astronautics) Aviation Forum, 2018, 16 pages.

Electronic Code of Federal Regulations, Title 14: Aeronautics and Space, Chapter I, Subchapter C, Part 36: Noise Standards: Aircraft Type and Airworthiness Certification, www.ecfr.gov, Mar. 24, 2021, 97 pages.

European Patent Office (EPO) Office Action, Feb. 14, 2024, for counterpart foreign Application No. EP22171572.5, Applicant The Boeing Company, 7 pages.

\* cited by examiner

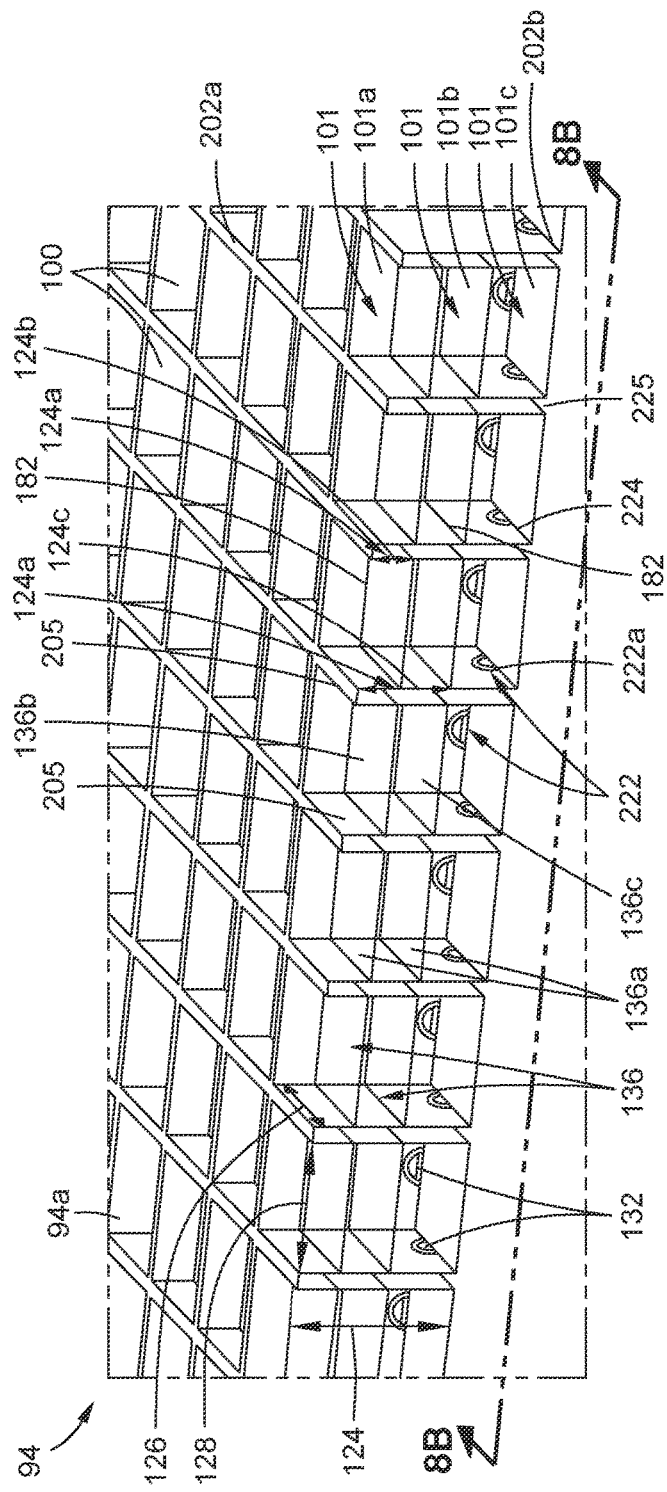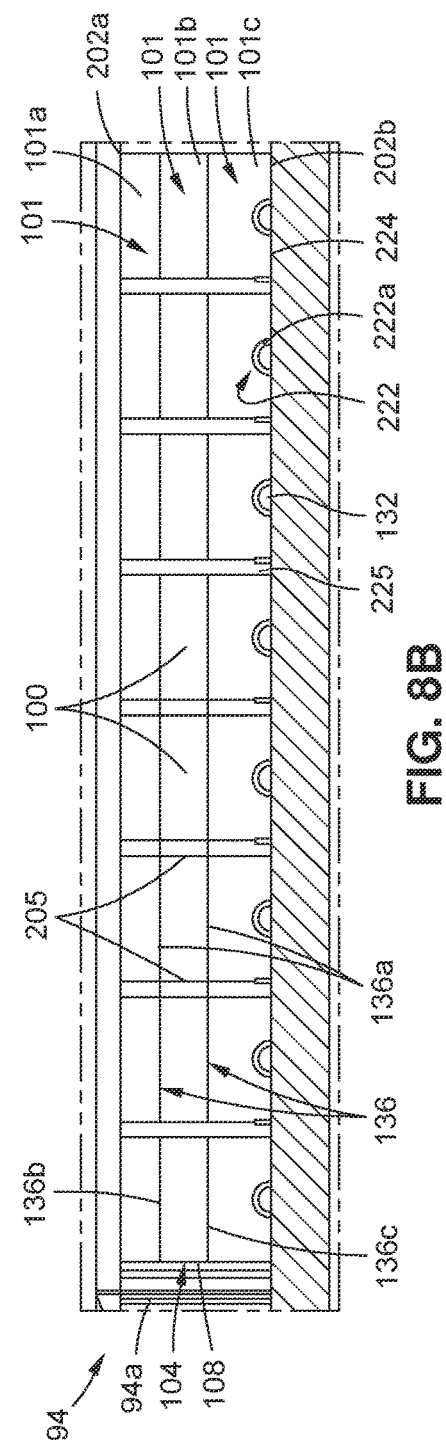
FIG. 8A
FIG. 8B

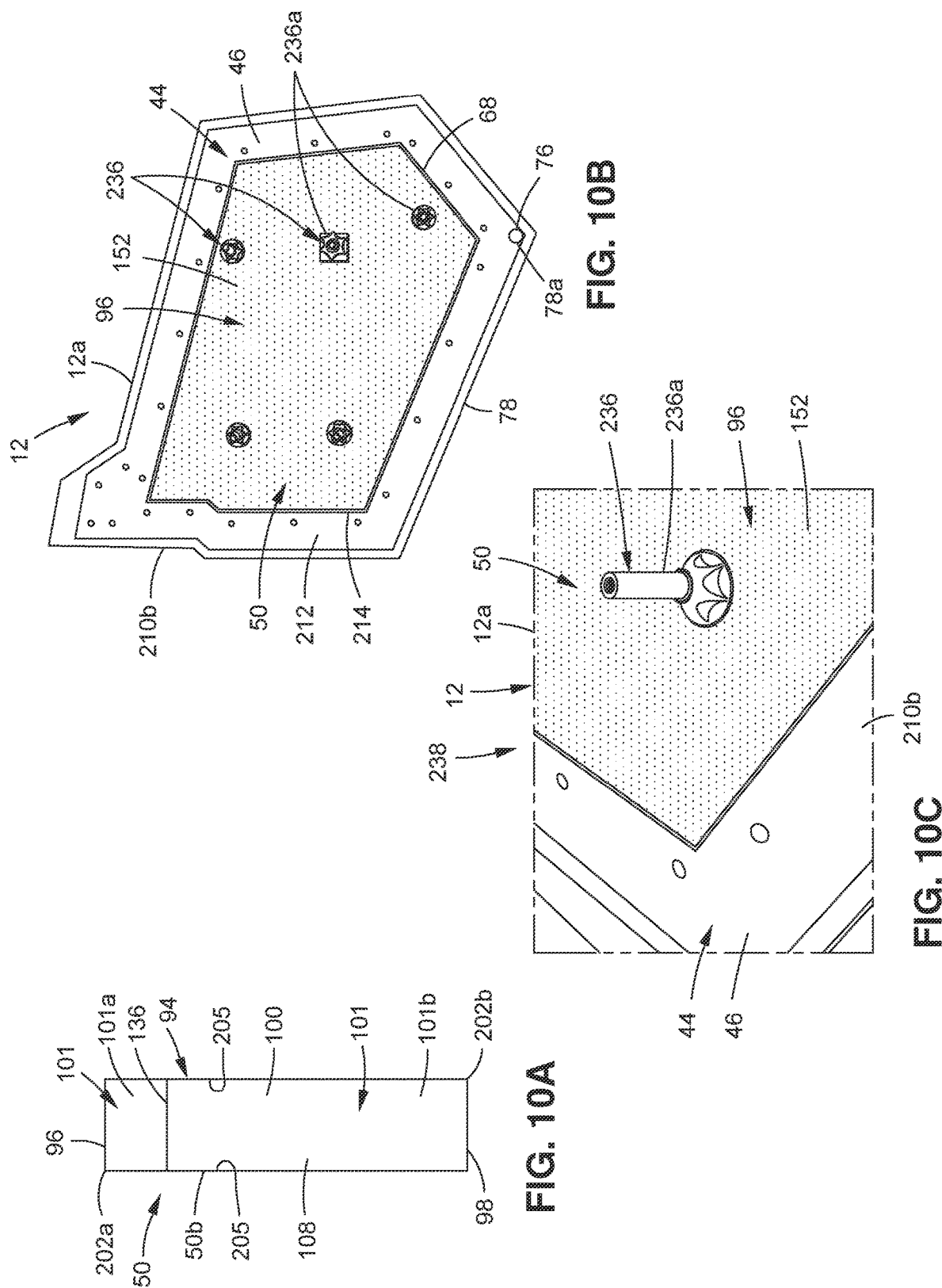

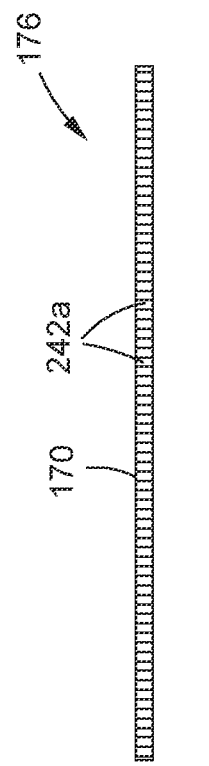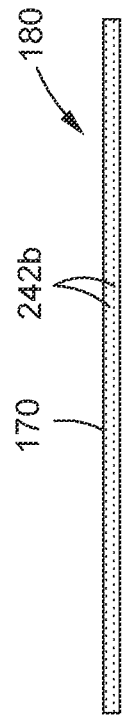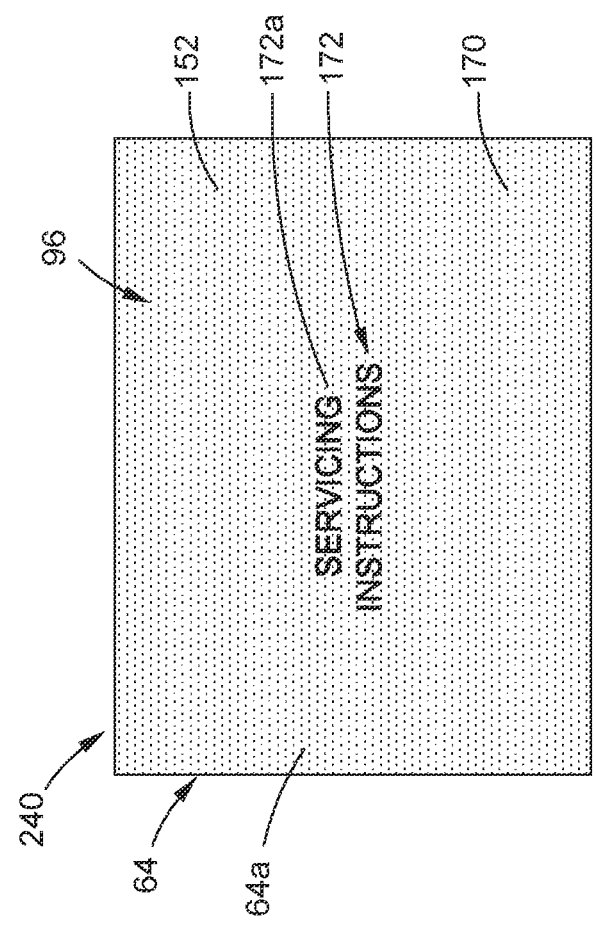
FIG. 11A
FIG. 11B
FIG. 11C

ACOUSTICALLY TREATED LANDING GEAR DOOR AND METHOD FOR REDUCING NOISE FROM LANDING GEAR OF AN AIRCRAFT

CROSS-REFERENCE TO RELATED APPLICATION

This nonprovisional application claims priority to U.S. Provisional Application Ser. No. 63/193,562, filed May 26, 2021, which is incorporated herein by reference in its entirety.

FIELD

The disclosure relates generally to assemblies and methods to reduce or attenuate noise emanating from an aircraft, and more particularly, to assemblies and methods using acoustic treatment to reduce or attenuate noise emanating from aircraft landing gear.

BACKGROUND

Aircraft noise reduction is a continuing issue at and near airports, and people living near airports, or along aircraft takeoff and landing flight paths, may express concerns about aircraft noise. Typically, airports have regulations that set noise limits and control aircraft flight paths before and during takeoff and landing phases. Further, the Federal Aviation Administration (FAA) regulates a maximum noise level that an individual civil aircraft can emit through requiring aircraft to meet certain noise certification standards as defined in the Code of Federal Regulations (C.F.R.) Title 14, Part 36—Noise Standards: Aircraft Type and Airworthiness Certification (14 C.F.R. Part 36). If an aircraft does not meet such noise certification standards, various penalties may result.

In addition to aircraft turbine engines, aircraft landing gear, such as main landing gear and nose landing gear, may be sources of unwanted noise, such as before and during the takeoff and landing phases of the aircraft. For aircraft landing gear, unwanted noise may be caused by air flow contacting and passing over the landing gear structures and creating turbulence around the region of the landing gear structures, and, in turn, creating the unwanted noise. When the landing gear doors are in a deployed position, acoustic waves, or sound waves, generated from the landing gear are reflected off the landing gear door without any absorption. Further, unlike unwanted noise from fans in aircraft turbine engines, which is produced at a specific frequency range, the unwanted noise from the main landing gear and the nose landing gear is produced randomly over a broad range of frequencies and angles.

Known noise attenuation assemblies for aircraft landing gear have been tested. One known noise attenuation assembly that has been tested includes a porous plate cover installed between a pair of wheels of the aircraft landing gear. However, such porous plate cover may add unwanted weight and unwanted mechanical complexity to the aircraft landing gear structure. Another known noise attenuation assembly that has been tested includes absorbent material with an open cell structure, i.e., a bulk absorber, affixed to a surface of aircraft landing gear doors. However, such absorbent material with an open cell structure may result in unwanted added thickness and bulk to the aircraft landing gear doors. Moreover, such absorbent material with open cell structure may not be practically usable in a wide range of temperatures and environments, including rain, snow, and ice. For example, in a rain condition, such absorbent material with the open cell structure may absorb or retain liquid that may freeze and expand at altitude.

In addition, known aircraft landing gear typically include servicing placards attached to the inner surface of the main landing gear and the nose landing gear doors. Such servicing placards contain information and/or instructions for ground service operators, mechanics, or other personnel to read and follow. However, such servicing placards are typically made of solid sheets of aluminum and may occupy a large area on the inner surface of the landing gear doors, thus limiting available area for possible acoustic treatment.

Accordingly, there is a need in the art for an assembly and a method to reduce or attenuate noise emanating from aircraft landing gear. Further, there is a need in the art for an assembly and a method that are practically usable in a wide range of temperatures and environments, that minimize weight and complexity, that do not create bulk on the aircraft landing gear doors, that provide a means for fluid removal, that maintain the readability of any servicing placards on the aircraft landing gear doors, and that provide advantages over known assemblies, systems, and methods.

SUMMARY

Example implementations of this disclosure provide an assembly and method for reducing or attenuating noise emanating from aircraft landing gear, and provide significant advantages over known assemblies, systems, and methods.

In one version of the disclosure, there is provided an acoustically treated landing gear door for reducing noise from a landing gear of an aircraft. The acoustically treated landing gear door comprises a landing gear door configured for attachment to the aircraft. The landing gear door comprises an acoustic treatment assembly integrated on an inner mold line of an interior side of the landing gear door, and extending within an interior cavity of the landing gear door.

The acoustic treatment assembly comprises a core structure. The core structure comprises a first side and a second side, a plurality of core cells extending between the first side and the second side, and a drainage system configured to evacuate fluid from the core structure. The drainage system has a plurality of drainage paths coupled to one or more drainage exits. The plurality of drainage paths are interconnected between the plurality of core cells, and the one or more drainage exits are located at one or more perimeter portions of the landing gear door.

The acoustic treatment assembly further comprises an acoustic facesheet coupled atop the first side of the core structure. The acoustic facesheet allows for fluid communication between an external environment and the plurality of core cells. The acoustic treatment assembly further comprises a nonporous backsheet directly coupled between the second side of the core structure and a portion of the interior cavity of the landing gear door.

When the landing gear of the aircraft is in a deployed position, the acoustically treated landing gear door reduces the noise created by acoustic waves emanating from the landing gear, by absorbing the acoustic waves through the acoustic facesheet and the core structure of the acoustic treatment assembly, and reflecting the acoustic waves off the nonporous backsheet of the acoustic treatment assembly.

In another version of the disclosure, there is provided an aircraft. The aircraft comprises a fuselage and one or more wings attached to the fuselage. The aircraft further comprises one or more main landing gear retractably coupled to a center undercarriage portion of the fuselage, and a nose landing gear retractably coupled to a nose undercarriage portion of the fuselage.

The aircraft further comprises one or more acoustically treated landing gear doors. Each of the one or more acoustically treated landing gear doors comprises a landing gear door attached to the fuselage, and associated with one of, the one or more main landing gear, and the nose landing gear.

Each of the one or more acoustically treated landing gear doors further comprises an acoustic treatment assembly integrated on an inner mold line of an interior side of the landing gear door, and extending within an interior cavity of the landing gear door. The acoustic treatment assembly comprises a core structure. The core structure comprises a plurality of core cells, one or more porous septum layers coupled to one or more of the plurality of core cells, and a drainage system configured to evacuate fluid from the core structure. The drainage system has a plurality of drainage paths coupled to one or more drainage exits. The plurality of drainage paths are interconnected between the plurality of core cells, and the one or more drainage exits are located at one or more perimeter portions of the landing gear door.

The acoustic treatment assembly further comprises an acoustic facesheet coupled atop a first side of the core structure. The acoustic facesheet allows fluid communication between an external environment and the plurality of core cells. The acoustic treatment assembly further comprises a nonporous backsheet directly coupled between a second side of the core structure and a portion of the interior cavity of the landing gear door.

Each of the one or more acoustically treated landing gear doors reduces noise created by acoustic waves emanating from one of, the one or more main landing gear, and the nose landing gear, in a deployed position, by absorbing the acoustic waves through the acoustic facesheet and the core structure of the acoustic treatment assembly, and reflecting the acoustic waves off the nonporous backsheet of the acoustic treatment assembly.

In another version there is provided a method for reducing noise from a landing gear of an aircraft. The method comprises the step of providing one or more acoustically treated landing gear doors. Each acoustically treated landing gear door comprises a landing gear door having an acoustic treatment assembly integrated on an inner mold line of an interior side of the landing gear door, and extending within an interior cavity of the landing gear door.

The acoustic treatment assembly comprises a core structure. The core structure comprises a first side and a second side, a plurality of core cells extending between the first side and the second side, and a drainage system having a plurality of drainage paths interconnected between the plurality of core cells. The plurality of drainage paths are coupled to one or more drainage exits located at one or more perimeter portions of the landing gear door. The acoustic treatment assembly further comprises an acoustic facesheet coupled atop the first side of the core structure. The acoustic treatment assembly further comprises a nonporous backsheet directly coupled between the second side of the core structure and a portion of the interior cavity of the landing gear door.

The method further comprises the step of attaching the one or more acoustically treated landing gear doors to a fuselage of the aircraft. The method further comprises the step of opening the one or more acoustically treated landing gear doors during a takeoff phase, or a landing phase, of the aircraft, and deploying the landing gear of the aircraft.

The method further comprises the step of reducing the noise created by acoustic waves emanating from the landing gear, by absorbing the acoustic waves through the acoustic facesheet and the core structure of the acoustic treatment assembly, and reflecting the acoustic waves off the nonporous backsheet of the acoustic treatment assembly.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or embodiments, but which are not necessarily drawn to scale, wherein:

FIG. 8A is an illustration of an enlarged front perspective view of a version of a core structure for an acoustically treated landing gear door of the disclosure;

FIG. 8B is an illustration of a front cross-section view of the core structure of FIG. 8A, taken along lines 8B-8B of FIG. 8A;

FIG. 10A is an illustration of a schematic cross-section of a version of a portion of an acoustic treatment assembly of an acoustically treated landing gear door of the disclosure;

FIG. 10B is an illustration of a top view of a test model of an acoustically treated main landing gear door of the disclosure having a porous facesheet;

FIG. 10C is an illustration of an enlarged top perspective view of a portion of the test model of the acoustically treated main landing gear door of FIG. 10B;

FIG. 11A is an illustration of a schematic top view of an exemplary version of a porous placard;

FIG. 11B is an illustration of a schematic side view of a laser drilled porous placard;

FIG. 11C is an illustration of a schematic side view of a sintered porous placard;

Each figure shown in this disclosure shows a variation of an aspect of the versions or examples presented, and only differences will be discussed in detail.

DETAILED DESCRIPTION

Disclosed versions or examples will now be described more fully hereinafter with reference to the accompanying drawings, in which some, but not all of the disclosed versions or examples are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "in one version" or "in a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "designed to" or "configured to" means various parts or components may be described or claimed as "designed to" or "configured to" perform a task or tasks. In such contexts, "designed to" or "configured to" is used to connote structure by indicating that the parts or components include structure that performs the task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

As used herein, elements that are "coupled" may, but do not necessarily, interact through one or more intermediating elements.

Figure 1:
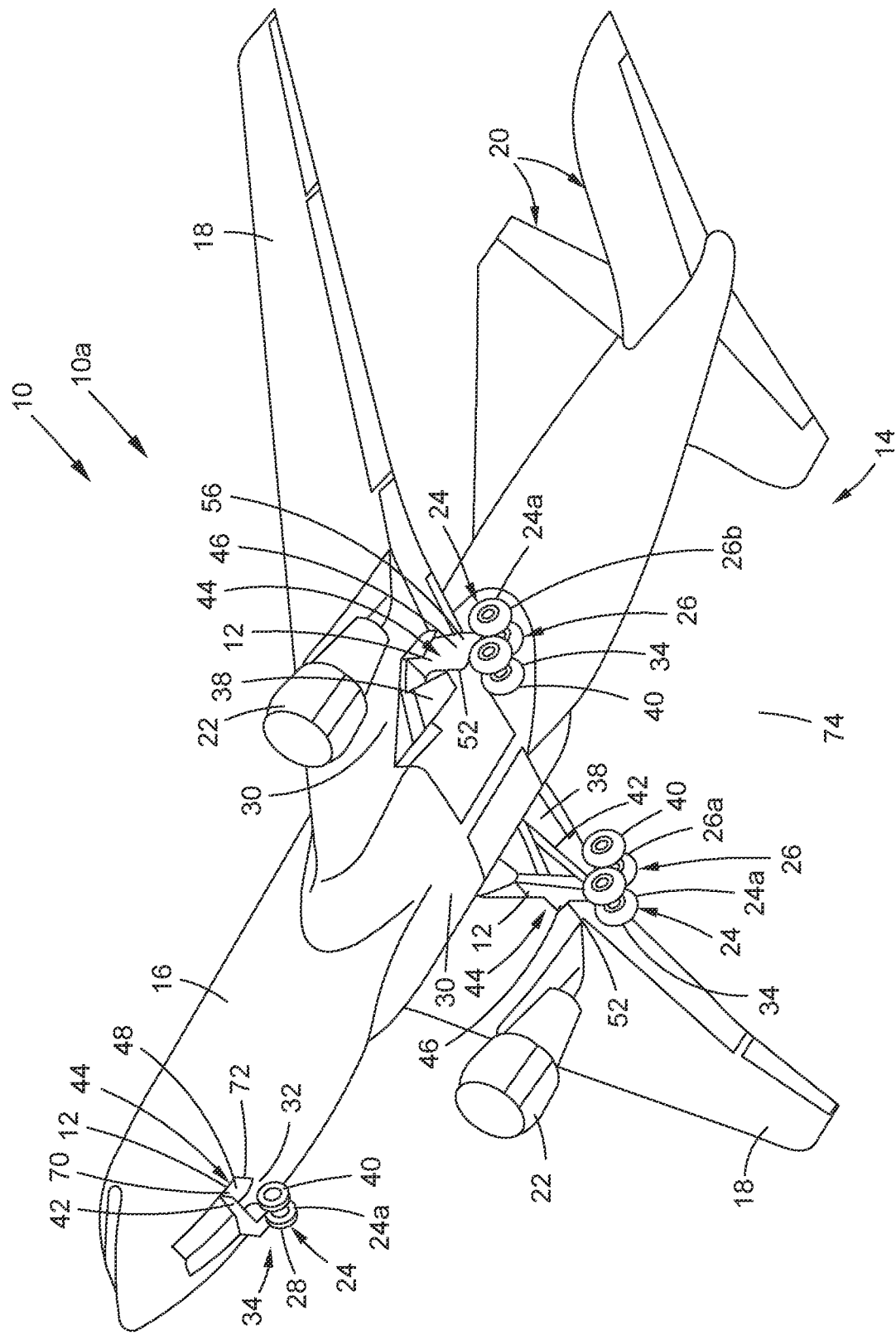
FIG. 1 is an illustration of a bottom perspective view of an aircraft having acoustically treated landing gear doors of the disclosure.

Now referring to the Figures, FIG. 1 is an illustration of a bottom perspective view of an aircraft 10, such as a jet aircraft 10a, having acoustically treated landing gear doors 12 of the disclosure. The aircraft 10, such as the jet aircraft 10a, generally may be utilized to transport persons and/or cargo. As shown in FIG. 1, an exemplary version of the aircraft 10 is in a takeoff phase 14 and comprises a fuselage 16, or body, wings 18 attached to the fuselage 16, a tail assembly 20 attached to the fuselage 16, engines 22 attached to the wings 18, and landing gear 24 attached to the fuselage 16. Preferably, the aircraft 10 is a jet aircraft 10a propelled by the engines 22, such as in the form of gas-turbine engines, and having wings 18, such as fixed wings.

As further shown in FIG. 1, the landing gear 24, or landing gear structure, are retractable landing gear 24a, comprising main landing gear (MLG) 26, or gears, and a nose landing gear (NLG) 28. As further shown in FIG. 1, the main landing gear 26 comprise a first main landing gear (MLG) 26a, or right main landing gear, and a second main landing gear (MLG) 26b, or left main landing gear, each retractably coupled to center undercarriage portions 30 of the fuselage 16. As further shown in FIG. 1, the nose landing gear 28 is retractably coupled to a nose undercarriage portion 32 of the fuselage 16. FIG. 1 shows the landing gear 24, such as the main landing gear 26 and the nose landing gear 28, each in a deployed position 34. When the landing gear 24, such as the main landing gear 26 and the nose landing gear 28, are not in the deployed position 34, they are in a retracted position 36 (see FIG. 5).

As shown in FIG. 1, the fuselage 16 further defines one or more wheel wells 38 operatively coupled to and/or configured to receive a corresponding landing gear 24. As shown in FIG. 1, each landing gear 24, or landing gear structure, comprises a wheel assembly 40 operatively coupled to the fuselage 16, via a strut assembly 42. As shown in FIG. 1, the wheel assembly 40 for each main landing gear 26 includes four wheels, and the wheel assembly 40 for the nose landing gear 28 includes two wheels. Alternatively, the wheel assembly 40 for each main landing gear 26 may include less than four wheels or greater than four wheels, and the nose landing.

As further shown in FIG. 1, the acoustically treated landing gear doors 12 comprise one or more landing gear doors 44, such as one or more main landing gear (MLG) doors 46, and/or one or more nose landing gear (NLG) doors 48, each having an acoustic treatment assembly 50 (see FIGS. 2-5), or acoustic liner. As further shown in FIG. 1, the landing gear doors 44, such as the main landing gear doors 46 and the nose landing gear door 48, are each in an open position 52.

The landing gear doors 44 are movable between the open position 52 in which the landing gear 24 may be deployed through the wheel wells 38, or openings, in the fuselage 16, and a closed position 54 (see FIG. 5) in which the landing gear 24 may be retracted back into the wheel wells 38, or openings, in the fuselage 16.

The acoustically treated landing gear doors 12 comprise landing gear doors 44 having a flat configuration 56 (see FIGS. 1, 5), a curved configuration 58 (see FIG. 5), or another suitable configuration. The acoustically treated landing gear doors 12 each comprises the acoustic treatment assembly 50 that allows fluid communication between an external environment 74 (see FIG. 1) and the acoustic treatment assembly 50, when the acoustically treated landing gear doors 12 are in the open position 52. FIG. 1 further shows an exterior side 70 with an outer mold line (OML) 72, or outer surface, of the landing gear door 44, such as the nose landing gear door 48.

Figure 2:
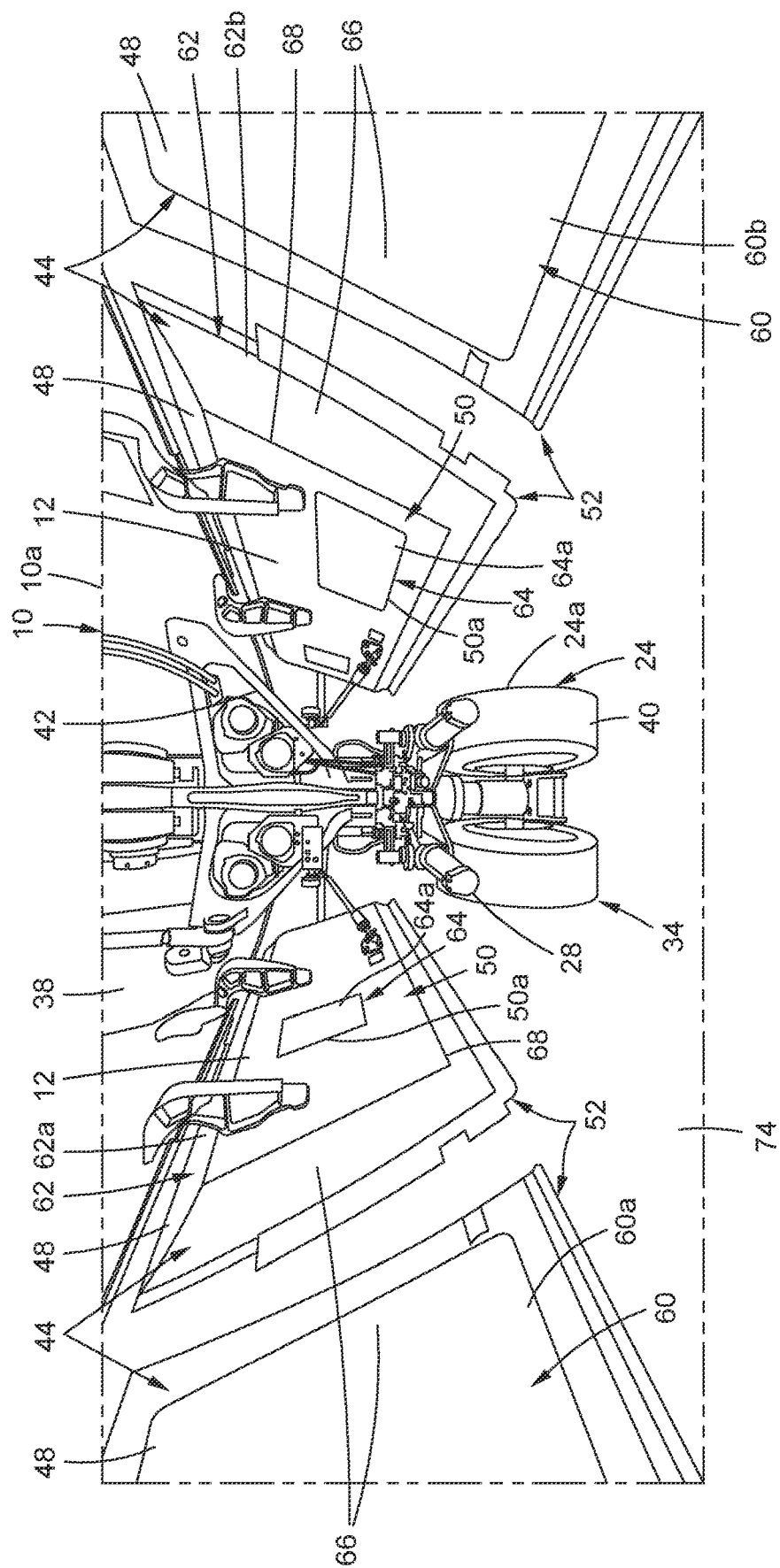
FIG. 2 is an illustration of a front perspective view of a nose landing gear having acoustically treated landing gear doors of the disclosure.

Now referring to FIG. 2, FIG. 2 is an illustration of a front perspective view of a landing gear 24, such as a retractable landing gear 24a, for example, a nose landing gear 28, of an aircraft 10, such as a jet aircraft 10a, having acoustically treated landing gear doors 12 of the disclosure. As shown in FIG. 2, the nose landing gear 28 comprises a wheel assembly 40 operatively coupled to the fuselage 16, via a strut assembly 42. FIG. 2 shows the nose landing gear 28 in the deployed position 34 outside the wheel well 38.

As shown in FIG. 2, the landing gear doors 44 comprise the nose landing gear (NLG) doors 48 in the open position 52, and include, for example, forward nose landing gear doors 60, such as a first forward nose landing gear door 60a and a second forward nose landing gear door 60b, and include, for example, aft nose landing gear doors 62, such as a first aft nose landing gear door 62a and a second aft nose landing gear door 62b. The forward nose landing gear doors 60 are positioned forward of the aft nose landing gear door 62, and the aft nose landing gear doors 62 are positioned aft of the forward nose landing gear doors 60.

As shown in FIG. 2, in one version, the acoustically treated landing gear doors 12 comprise the first aft nose landing gear door 62a and the second aft nose landing gear door 62b, each having an acoustic treatment assembly 50 with a placard 64, such as a servicing placard 64a, printed on a portion 50a of the acoustic treatment assembly 50.

As shown in FIG. 2, the acoustically treated landing gear doors 12 comprise the landing gear doors 44, each having an interior side 66 with an inner mold line (IML) 68 (see also FIGS. 3A-3B, 5), or inner surface, and an exterior side 70 (see FIGS. 1, 5) with an outer mold line (OML) 72 (see FIG. 5), or outer surface. The acoustically treated landing gear doors 12 each comprises the acoustic treatment assembly 50 that allows fluid communication between an external environment 74 and the acoustic treatment assembly 50, when the acoustically treated landing gear doors 12 are in the open position 52.

Figure 3A:
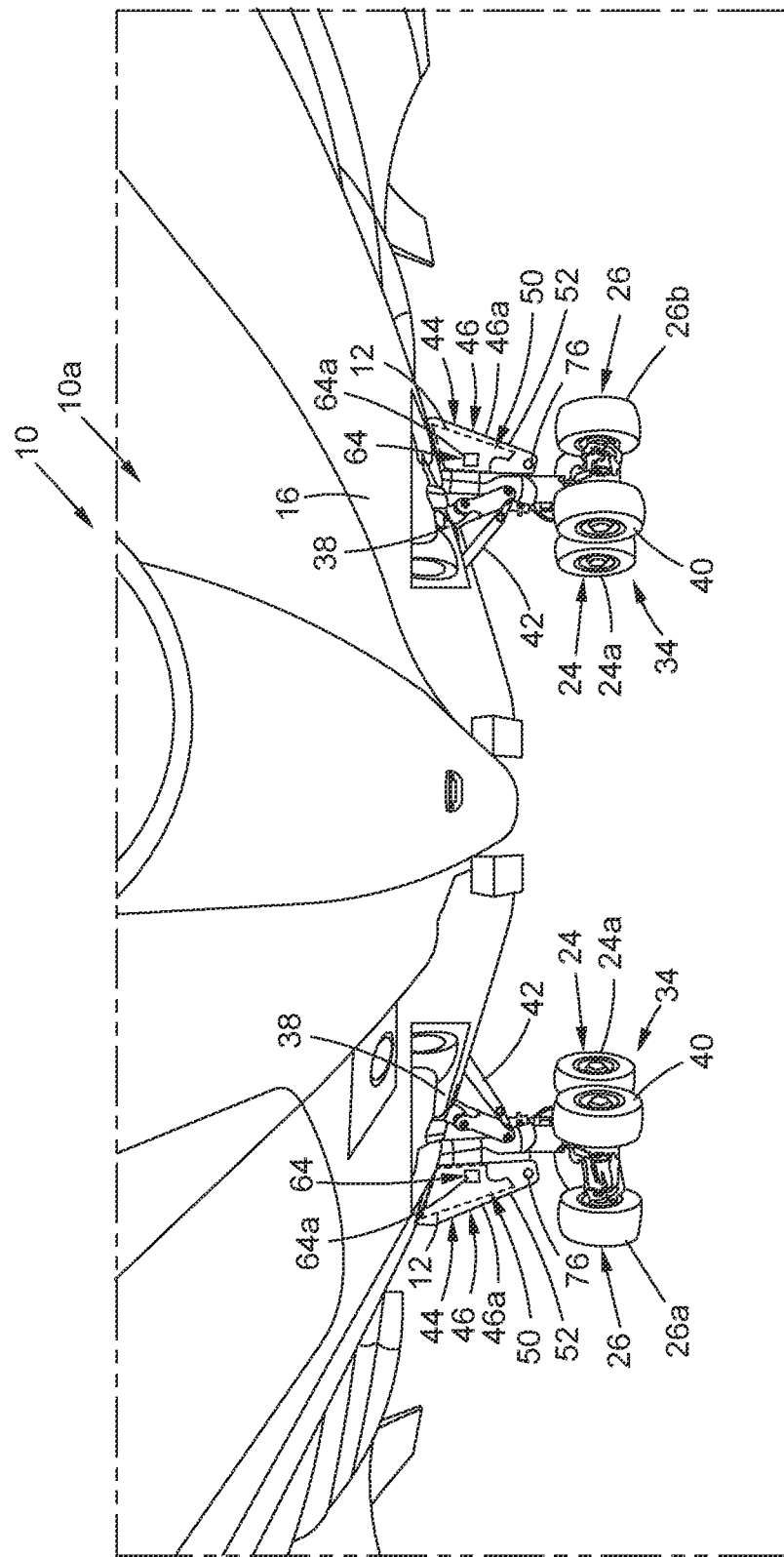
FIG. 3A is an illustration of a front perspective view of main landing gears having acoustically treated landing gear doors of the disclosure.

Now referring to FIG. 3A, FIG. 3A is an illustration of a front perspective view of landing gear 24, such as retractable landing gear 24a, for example, main landing gear 26, including the first main landing gear 26a, or right main landing gear, and the second main landing gear 26b, or left main landing gear, where each main landing gear 26 is retractably attached to the fuselage 16 of the aircraft 10, such as the jet aircraft 10a. As shown in FIG. 3A, the main landing gear 26, including the first main landing gear 26a and the second main landing gear 26b, each comprises the wheel assembly 40 operatively coupled to the fuselage 16, via the strut assembly 42. FIG. 3A shows the first main landing gear 26a and the second main landing gear 26b in the deployed position 34 outside the wheel wells 38.

As further shown in FIG. 3A, the acoustically treated landing gear doors 12 comprise landing gear doors 44, such as main landing gear doors 46, including main landing gear strut doors 46a associated with each main landing gear 26. As shown in FIG. 3A, each of the acoustically treated landing gear doors 12 comprises the landing gear door 44, such as the main landing gear strut door 46a, in the open position 52, and the acoustic treatment assembly 50 with the placard 64, such as the servicing placard 64a. FIG. 3A further shows the landing gear door 44, such as the main landing gear strut door 46a, having a drainage exit 76. As discussed in further detail below, the drainage exit 76 is part of a drainage system 80 (see FIG. 5) of the acoustic treatment assembly 50 of the acoustically treated landing gear door 12.

Figure 3B:
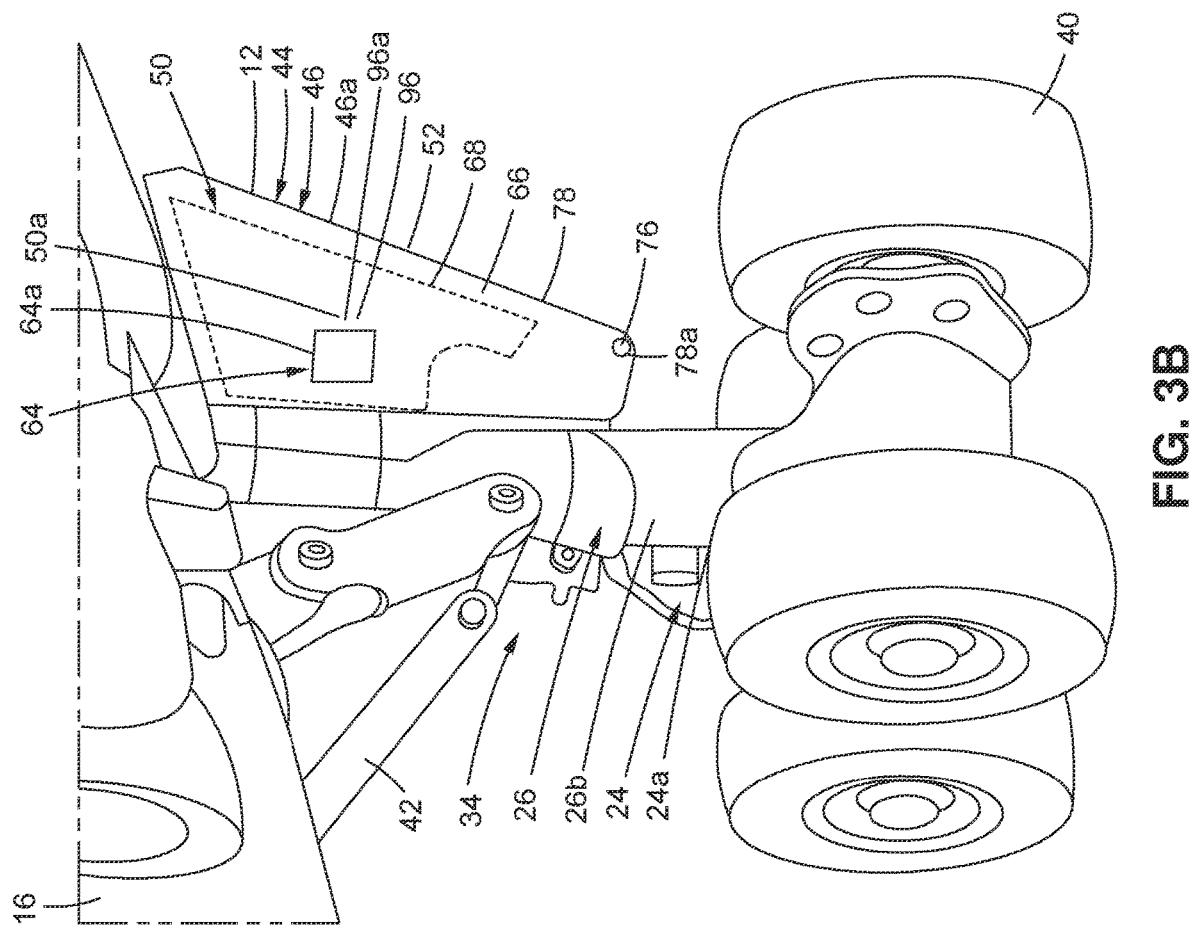
FIG. 3B is an illustration of an enlarged front perspective view of a second main landing gear and the acoustically treated landing gear door of FIG. 3A.

Now referring to FIG. 3B, FIG. 3B is an illustration of an enlarged front perspective view of the landing gear 24, such as the retractable landing gear 24a, for example, the main landing gear 26, including the second main landing gear 26b, or left main landing gear, in the deployed position 34, and the acoustically treated landing gear door 12 associated with the second main landing gear 26b, of FIG. 3A. As shown in FIG. 3B, the main landing gear 26 comprises the wheel assembly 40 operatively coupled to the fuselage 16, via the strut assembly 42.

FIG. 3B further shows the acoustically treated landing gear door 12 comprising the landing gear door 44, such as the main landing gear door 46, for example, the main landing gear strut door 46a, in the open position 52, and with the acoustic treatment assembly 50 having the placard 64, such as the servicing placard 64a, printed on the portion 50a of the acoustic treatment assembly 50, such as a portion 96a of an acoustic facesheet 96 of the acoustic treatment assembly 50. FIG. 3B shows the interior side 66 with the inner mold line (IML) 68, or inner surface, of the acoustically treated landing gear door 12. FIG. 3B further shows the drainage exit 76 located at or near a perimeter portion 78a of a perimeter 78 of the landing gear door 44 of the acoustically treated landing gear door 12.

Figure 4:
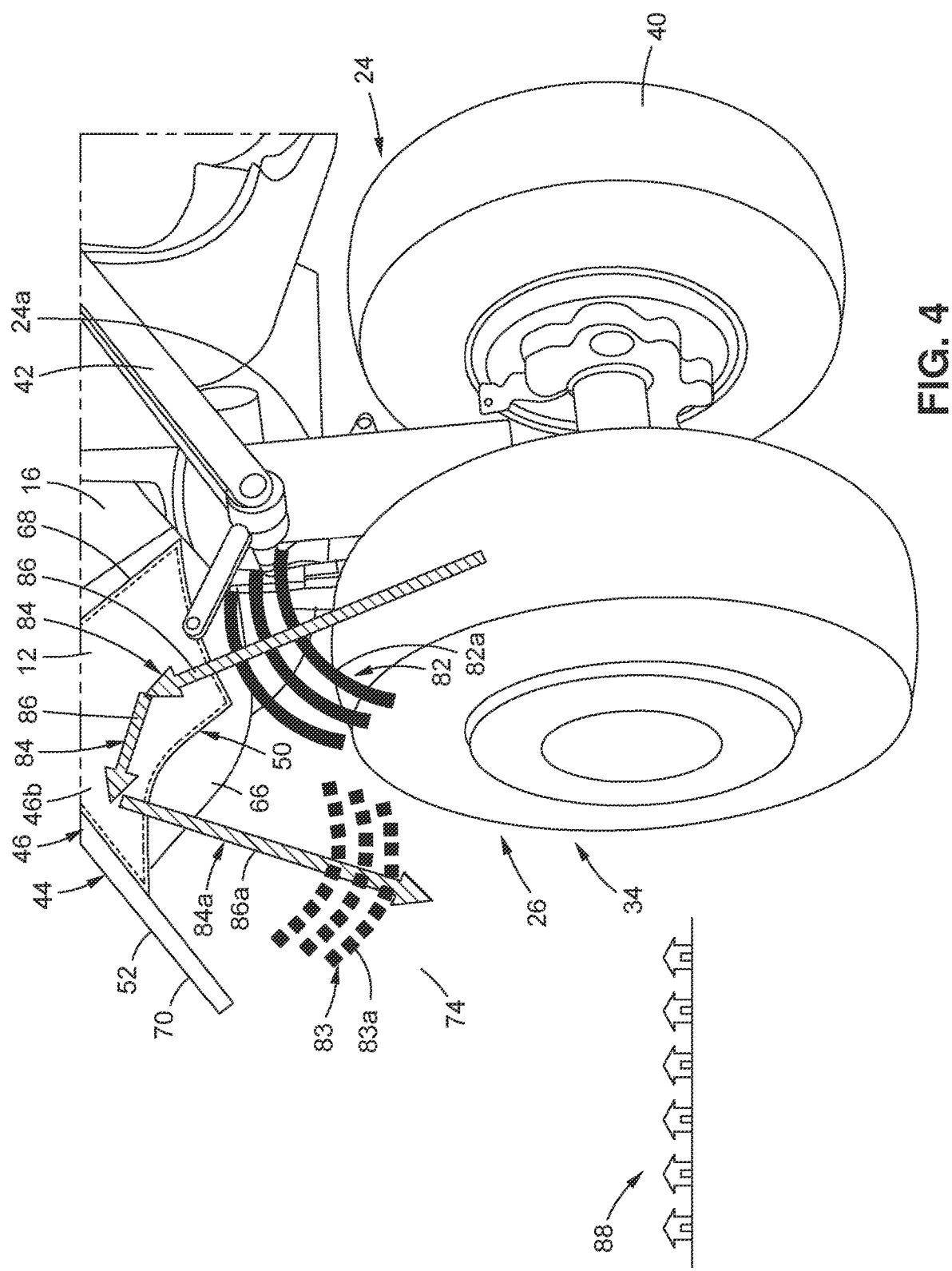
FIG. 4 is an illustration of an enlarged front perspective view of a main landing gear and an acoustically treated main landing gear body door of the disclosure.

Now referring to FIG. 4, FIG. 4 is an illustration of an enlarged front perspective view of the landing gear 24, such as the retractable landing gear 24a, for example, the main landing gear 26, and the acoustically treated landing gear door 12 associated with the main landing gear 26. As shown in FIG. 4, the main landing gear 26 comprises the wheel assembly 40 operatively coupled to the fuselage 16, via the strut assembly 42, and shows the main landing gear 26 in the deployed position 34.

As further shown in FIG. 4, the acoustically treated landing gear door 12 comprises the landing gear door 44, such as the main landing gear door 46, for example, a main landing gear body door 46b, in the open position 52, and with the acoustic treatment assembly 50. As further shown in FIG. 4, the acoustic treatment assembly 50 is integrated on the inner mold line (IML) 68, or inner surface, on the interior side 66, of the main landing gear body door 46b. FIG. 4 further shows the exterior side 70 of the main landing gear body door 46b.

FIG. 4 shows acoustic waves 82, or sound waves 82a, emanating from, or generated by, the landing gear 24, such as the main landing gear 26, and traveling as sound 84, such as noise 86, for example, drag noise, from the landing gear 24, such as the main landing gear 26, to the acoustic treatment assembly 50 of the acoustically treated landing gear door 12. The sound 84, such as the noise 86, for example, drag noise, is absorbed into the acoustic treatment assembly 50, and reflected back out, or radiated from, the acoustic treatment assembly 50, as attenuated sound 84a (see FIGS. 4, 5), or reduced sound, such as attenuated noise 86a (see FIGS. 4, 5), or reduced noise, back out into an external environment 74 (see FIG. 4) and a community 88 (see FIG. 4). As shown in FIG. 4, the acoustic waves 82, or sound waves 82a, are suppressed by the acoustic treatment assembly 50 of the acoustically treated landing gear door 12, and become attenuated acoustic waves 83, or attenuated sound waves 83a, and result in attenuated sound 84a, or reduced sound, such as attenuated noise 86a, or reduced noise, for example, attenuated drag noise.

The acoustically treated landing gear door 12 reduces the sound 84, such as the noise 86, emanating from, or generated by, the landing gear 24, such as the main landing gear 26, of the aircraft 10, when the landing gear 24, such as the main landing gear 26, is in the deployed position 34, by attenuating the acoustic waves 82, or sound waves 82a, emanating, or generated, from the landing gear 24, such as the main landing gear 26, and reflected off the acoustic treatment assembly 50 of the acoustically treated landing gear door 12. The acoustically treated landing gear door 12 allows the acoustic waves 82, or sound waves 82a, to communicate through a volume 90 (see FIG. 5) of the landing gear door 44, such as the main landing gear door 46. The acoustic waves 82, and the energy of the acoustic waves 82, are reduced or decreased as the sound 84, such as the noise 86, is absorbed into the acoustic treatment assembly 50 and reflects back out. Thus, the acoustically treated landing gear door 12 suppresses the acoustic waves 82, or sound waves 82a, emanating from, or generated by, the landing gear 24, such as the main landing gear 26, when the acoustic waves 82, or sound waves 82a, are reflected on the inner mold line (IML) 68 before being radiated to the external environment 74 (see FIGS. 4, 5) and the community 88 (see FIGS. 4, 5), immediately before and during the takeoff phase 14 (see FIGS. 1, 5) of the aircraft 10 and during a landing phase 15 (see FIG. 5) of the aircraft 10.

Figure 5:
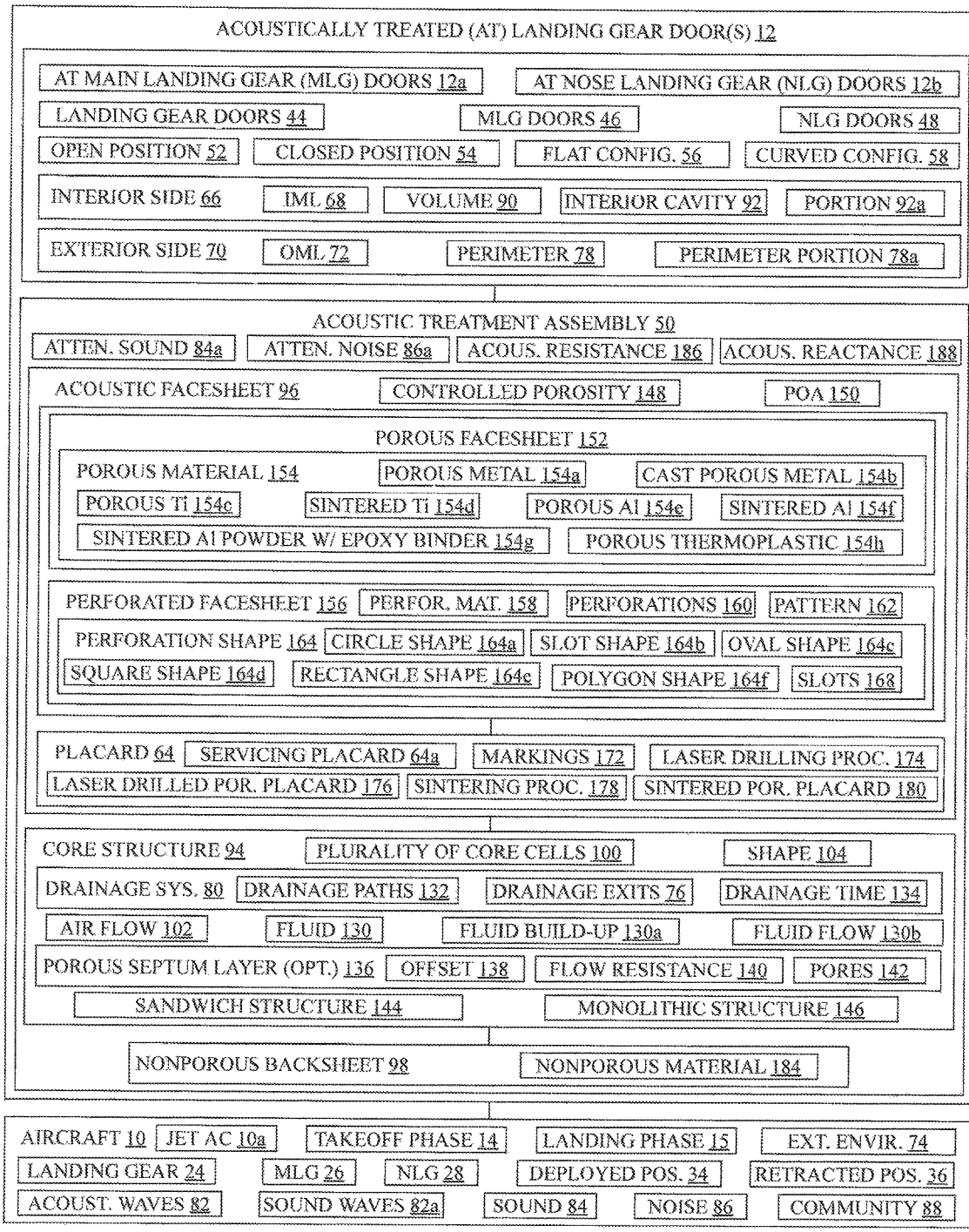
FIG. 5 is an illustration of a functional block diagram showing exemplary versions of acoustically treated landing gear doors of the disclosure for use on an aircraft.

Now referring to FIG. 5, FIG. 5 is an illustration of a functional block diagram showing exemplary versions of acoustically treated landing gear doors 12 of the disclosure for use on an aircraft 10, such as a jet aircraft 10a. The blocks in FIG. 5 represent elements, and lines connecting the various blocks do not imply any particular dependency of the elements. Furthermore, the connecting lines shown in FIG. 5 are intended to represent example functional relationships and/or physical couplings between the various elements, but it is noted that other alternative or additional functional relationships or physical connections may be present in versions disclosed herein. Other components in addition to, or in place of, the ones illustrated may be used. Some components may be optional.

In one version of the disclosure, there is provided an acoustically treated landing gear door 12 for reducing sound 84, such as noise 86, from a landing gear 24 of an aircraft 10. As shown in FIG. 5, the acoustically treated (AT) landing gear door(s) 12 may be in the form of one or more acoustically treated (AT) main landing gear doors (MLG) 12a, and/or one or more acoustically treated (AT) nose landing gear doors (NLG) 12b. The acoustically treated landing gear doors 12 preferably comprise landing gear doors 44, such as main landing gear (MLG) doors 46, for example, one or more of, a main landing gear (MLG) strut door 46a (see also FIGS. 3A-3B), and/or a main landing gear (MLG) body door 46b (see also FIG. 4), and such as nose landing gear (NLG) doors 48, for example, one or more of, forward nose landing gear (NLG) doors 60, such as a first forward nose landing gear door 60a (see FIG. 2) and a second forward nose landing gear door 60b (see FIG. 2), and aft nose landing gear (NLG) doors 62, such as a first aft nose landing gear door 62a (see FIG. 2) and a second aft nose landing gear door 62b (see FIG. 2).

As shown in FIG. 5, the acoustically treated landing gear doors 12 comprise landing gear doors 44 having a flat configuration 56, a curved configuration 58, or another suitable configuration. The landing gear doors 44 are movable between the open position 52 (see FIGS. 1, 5) in which the landing gear 24 are deployed to the deployed position 34 (see FIGS. 1, 5), and the closed position 54 (see FIG. 5) in which the landing gear 24 are retracted back to the retracted position 36 (see FIG. 5).

As shown in FIG. 5, each landing gear door 44 has the interior side 66 with the inner mold line (IML) 68, or inner surface, and the exterior side 70 with the outer mold line (OML) 72, or outer surface. As further shown in FIG. 5, the interior side 66 of the landing gear door 44 has an interior cavity 92 with a volume 90, and the landing gear door 44 has a perimeter 78. The acoustically treated landing gear door 12 comprises the landing gear door 44 having the acoustic treatment assembly 50 integrated on the inner mold line (IML) 68 of the interior side 66 of the landing gear door 44, and extending within the interior cavity 92, and within the volume 90, of the landing gear door 44.

As shown in FIG. 5, the acoustic treatment assembly 50 comprises a core structure 94 coupled, or attached, and sandwiched between an acoustic facesheet 96 on top of the core structure 94, and a nonporous backsheet 98 on the bottom of the core structure 94. The acoustic facesheet 96 faces the external environment 74 when the acoustically treated landing gear door 12 is in the open position 52, and the landing gear 24 is in the deployed position 34. A plurality of core cells 100 (see FIG. 5) of the core structure 94 function as a plurality of connecting members coupling the acoustic facesheet 96 to the nonporous backsheet 98, to form the acoustic treatment assembly 50 having the plurality of core cells 100 spanning outwardly from the acoustic facesheet 96 to the nonporous backsheet 98. The coupling of the acoustic facesheet 96 and the nonporous backsheet 98 to the core structure 94 creates a controlled resonator-type effect, which is capable of attenuating the sound 84 (see FIG. 5), such as noise 86 (see FIG. 5), at a number of selected frequency ranges.

Air flow 102 (see FIG. 7B) flows through and between the plurality of core cells 100. When acoustic waves 82 (see FIG. 5), or sound waves 82a (see FIG. 5), travel through the air, the air flow 102 through and between the plurality of core cells 100 attenuates the sound 84 (see FIG. 4), such as the noise 86 (see FIG. 4), generated by the acoustic waves 82 (see FIGS. 4, 5), or sound waves 82a (see FIGS. 4, 5). The size of each core cell 100, the shape of each core cell 100, the placement of each core cell 100, or some combination thereof, may be designed such that a desired sound attenuation level may be achieved at each of a number of frequency ranges.

Each of the plurality of core cells 100 has a shape 104 (see FIGS. 5, 9A-9J). The shape 104, as discussed in further detail below with respect to FIGS. 9A-9J, may comprise one of, a hexagonal cylinder shape 106 (see FIG. 9A), a rectangular cylinder shape 108 (see FIG. 9C), a cylinder shape 110 (see FIG. 9D), a flared cylinder shape 112 (see FIG. 9E), a tapered cylinder shape 114 (see FIG. 9F), a truncated cone cylinder shape 116 (see FIG. 9G), a bell cylinder shape 118 (see FIG. 9H), a nested flared cylinder shape 120 (see FIG. 9I), a nested tapered cylinder shape 122 (see FIG. 9J), or another suitable shape. Each core cell 100 has a height 124 (see FIG. 8A), or depth, a width 126 (see FIG. 8A), and a length 128 (see FIG. 8A). Preferably, each core cell 100 has a height 124 to width 126 ratio of 2:1, or below, for the core structure 94 to maintain a local reactance.

As shown in FIG. 5, the core structure 94 of the acoustic treatment assembly 50 further comprises the drainage system 80 designed or configured to evacuate fluid 130, such as fluid build-up 130a, from the core structure 94, when there is a fluid flow 130b through the core structure 94. The drainage system 80 has a plurality of drainage paths 132 (see FIG. 5), or interconnects, coupled to the one or more drainage exits 76 (see FIG. 5). The plurality of drainage paths 132 are interconnected between the plurality of core cells 100. The one or more drainage exits 76 are located at or near one or more perimeter portions 78a (see FIG. 5) of the perimeter 78 (see FIG. 5) of the landing gear door 44, such as at one or more low perimeter points. The number of drainage exits 76 needed depends on the size, orientation, and geometry of the acoustically treated landing gear door 12.

The plurality of drainage paths 132 are optimized to minimize a drainage time 134 (see FIG. 5), while keeping the shape of the landing gear door 44 structurally durable. The shape, size, and location of each drainage path 132 from one core cell 100 to a neighboring core cell 100 is optimized to allow the fastest flow rate to the one or more drainage exits 76. The shape, size, and location of the drainage paths 132 within each core cell 100 may be unique. Air flow 102 (see FIG. 5) and fluid flow 130b (see FIG. 5) communicate, or flow, into the structure of the acoustic treatment assembly 50 and the landing gear door 44, and the plurality of drainage paths 132 are designed to allow fluid 130 (see FIG. 5), fluid build-up 130a (see FIG. 5), liquid, water, condensation, and/or moisture to drain out of the acoustic treatment assembly 50 and the landing gear door 44, when the landing gear 24 is deployed immediately before and during the takeoff phase 14 (see FIG. 5) and the landing phase 15 (see FIG. 5).

The drainage system 80 is integrated in the core structure 94 and is interconnected between the plurality of core cells 100 of the core structure 94, to ensure that fluid 130 (see FIG. 5), fluid build-up 130a (see FIG. 5), liquid, water, condensation, and/or moisture does not build up, freeze, or expand within the core structure 94. The drainage system 80 is designed to drain fluid 130, fluid build-up 130a, liquid, water, condensation, and/or moisture out of the core structure 94, so that it will not freeze and expand at altitude and cause the core structure 94 to delaminate or break. The drainage system 80 avoids trapped water becoming ice and breaking the underlying core structure 94.

As shown in FIG. 5, the core structure 94 of the acoustically treated landing gear door 12 may further optionally comprise one or more porous septum layers 136 disposed, or installed, within the core structure 94, and coupled to one or more of the plurality of core cells 100. The one or more porous septum layers 136 may each comprise one or more porous septum segments 136a (see FIG. 8A), where an individual porous septum segment 136a is attached, or coupled, within each core cell 100. The core structure 94 may comprise one porous septum layer 136 or one layer of porous septum segments 136a, two porous septum layers 136 or two layers of porous septum segment 136a, three porous septum layers 136 or three layers of porous septum segments 136a, or more than three porous septum layers 136 or more than three layers of porous septum segments 136a. The number of porous septum layers 136 or the number of porous septum segments 136a may be adjusted, and the type of material the porous septum layer 136 or porous septum segments 136a is made of and an offset 138 (see FIGS. 5, 8B), or distance, between each of two or more porous septum layers 136 or two or more porous septum segments 136a, may be adjusted to optimize and maximize acoustic dampening or absorption. The addition of the one or more porous septum layers 136 or porous septum segments 136a further reduces, or attenuates, the sound 84, or noise 86, emanating from, or generated by the landing gear 24 immediately before and during the takeoff phase 14 (see FIG. 5) and the landing phase 15 (see FIG. 5) of the aircraft 10.

The one or more porous septum layers 136 or porous septum segments 136a increase a frequency range of noise attenuation performance. In addition, each of the one or more porous septum layers 136, or porous septum segments 136a, has a flow resistance 140 (see FIG. 5) to air flow 102 (see FIG. 5) and/or fluid 130 (see FIG. 5), that is optimized. Each of the one or more porous septum layers 136 preferably has a flow resistance 140 that is in a range of 25 cgs Rayls to 100 cgs Rayls.

Each porous septum layer 136, or porous septum segment 136a, is generally planar in shape, or another suitable shape. Each porous septum layer 136, or layer of porous septum segments 136a, extends substantially parallel to the nonporous backsheet 98, and each porous septum layer 136, or layer of porous septum segments 136a, extends substantially parallel to the acoustic facesheet 96. Each porous septum layer 136 or porous septum segment 136a is made of a material comprising one or more of, a metal wire mesh material, a composite mesh material, including a thermoplastic mesh material, for example, a thermoplastic such as polyether ether ketone (PEEK), polyetherketoneketone (PEKK), or another suitable thermoplastic, a ceramic mesh material, a composite woven fabric, or another suitable material.

Preferably, each porous septum layer 136, or porous septum segment 136a, is porous and includes a plurality of pores 142 (see FIG. 5), or holes, formed through the porous septum layer 136. Each porous septum layer 136, or porous septum segment 136a, has a desired pore size that allows air flow 102 to flow through each porous septum layer 136, or porous septum segment 136a, and through the plurality of core cells 100 of the core structure 94. The plurality of pores 142, or holes, may be formed in each porous septum layer 136, or porous septum segment 136a, by any suitable technique, such as, for example and without limitation, a drilling process, or another suitable process. The plurality of pores 142, or holes, also allow the acoustic waves 82, or sound waves 82a, to pass through each porous septum layer 136, or porous septum segment 136a, and to be reflected off of the nonporous backsheet 98 in order to attenuate the acoustic waves 82, or sound waves 82a. Each porous septum layer 136, or porous septum segment 136a, is preferably transparent, or substantially transparent, to acoustic waves 82, or sound waves 82a.

Each of the one or more porous septum layers 136, or porous septum segments 136a, preferably divides one or more of the plurality of core cells 100 into at least two core cell portions 101 (see FIG. 8A). Each porous septum layer 136, or porous septum segment 136a, may be in the form of an insert that is inserted into, or formed internally within, an individual core cell 100. The porous septum layer 136, or porous septum segment 136a, divides an individual, or single, core cell 100 along a height 124 (see FIG. 8B), or depth, of the core cell 100.

Figure 6A:
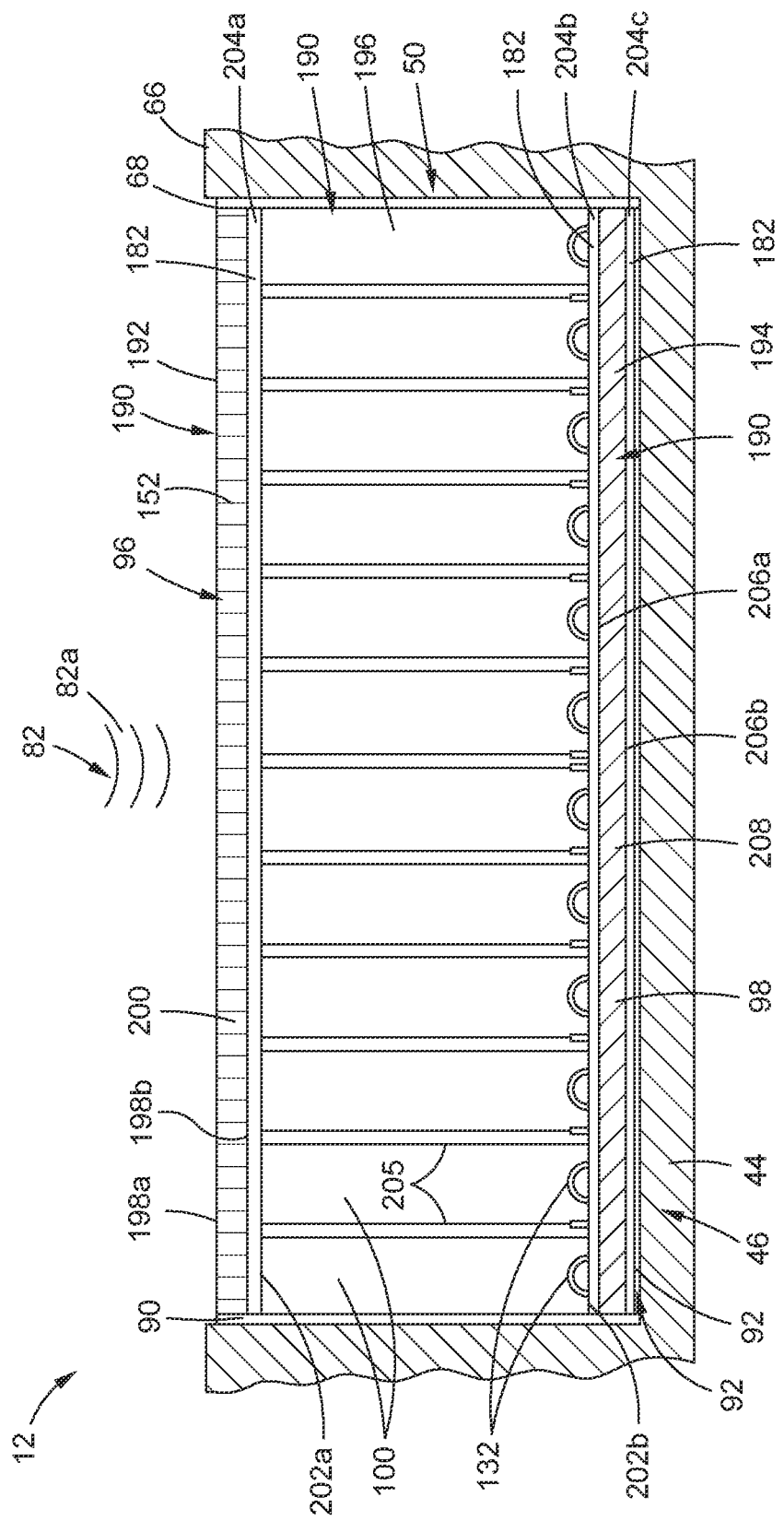
FIG. 6A is an illustration of a schematic cross-section view of a version of an acoustically treated landing gear door of the disclosure.
Figure 6B:
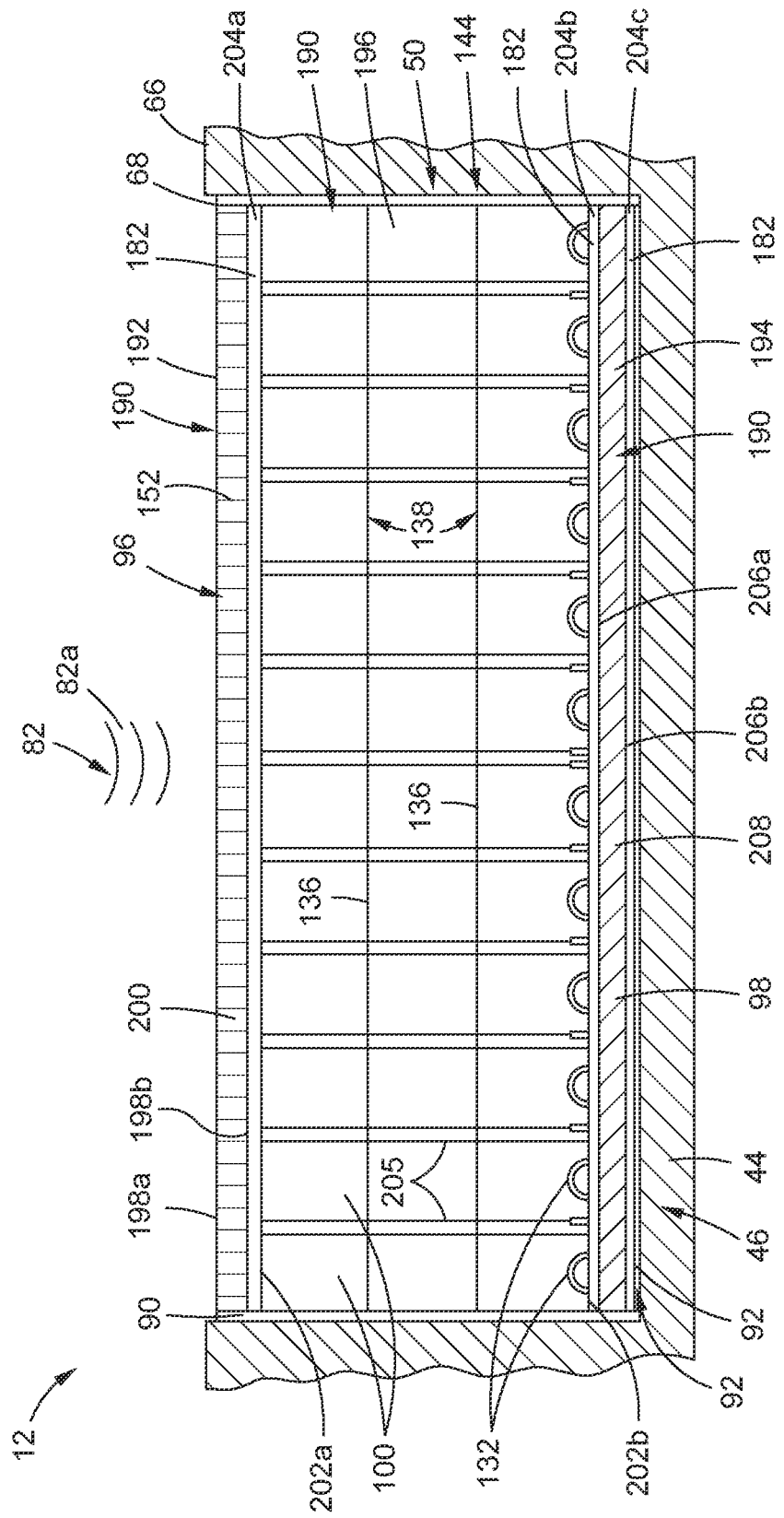
FIG. 6B is an illustration of a schematic cross-section view of another version of an acoustically treated landing gear door of the disclosure, where a core structure includes porous septum layers.

In one version, the core structure 94 with the one or more porous septum layers 136 is formed as a sandwich structure 144 (see FIGS. 5, 6B) with a plurality of layers 190 (see FIG. 6B). In another version, the core structure 94 is formed as a monolithic structure 146 (see FIGS. 5, 8A), where each core cell 100 of the core structure 94 has a porous septum segment 136a (see FIG. 8A) positioned, and attached in place, such as with an adhesive 182 (see FIG. 8A), for example, glue, at a predetermined partial height 124a (see FIG. 8A) within the core cell 100. To form a version of a septumized core structure 94a (see FIG. 8A), one or more of the porous septum segments 136a may be inserted, positioned, and secured individually within each core cell 100.

As shown in FIG. 5, the acoustic treatment assembly 50 further comprises an acoustic facesheet 96, or acoustic layer, coupled, or attached, atop the core structure 94. The acoustic facesheet 96 allows for fluid communication between the external environment 74 (see FIGS. 1, 5) and the plurality of core cells 100 of the core structure 94. Air flow 102 that flows into the core structure 94 through the acoustic facesheet 96 may flow into, and between, the plurality of core cells 100 of the core structure 94 and into any open spaces between the plurality of core cells 100 and the acoustic facesheet 96. The acoustic facesheet 96 has a controlled porosity 148 (see FIG. 5), or a desired porosity, with a percent open area (POA) 150 (see FIG. 5) in a range of from 4 percent open area (POA) 150 to 25 percent open area (POA) 150. In particular, the acoustic facesheet 96 has the controlled porosity 148 (see FIG. 5), or the desired porosity, with a percent open area (POA) 150 (see FIG. 5) in a range of from 4 percent open area (POA) 150 to 8 percent open area (POA) 150, when the acoustic facesheet 96 is coupled, or attached, to the core structure 94 and there is no porous septum layer 136, or porous septum segments 136a, present in the core structure 94. Further, in particular, the acoustic facesheet 96 has the controlled porosity 148 (see FIG. 5), or the desired porosity, with a percent open area (POA) 150 (see FIG. 5) in a range of from 8 percent open area (POA) 150 to 25 percent open area (POA) 150, when the acoustic facesheet 96 is coupled, or attached, to the core structure 94, where the core structure 94 has one or more porous septum layers 136, or porous septum segments 136a, present in the core structure 94.

As used herein, "percent open area (POA)" means a ratio of how much of a sheet, for example, an acoustic facesheet, is occupied by holes or perforations, normally expressed by percent. For example, if the percent open area of the acoustic facesheet is 20%, it means that 20% of the acoustic facesheet has holes or perforations, and 80% of the acoustic facesheet is material. The acoustic facesheet 96 has a thickness in a range of from 0.030 inch to 0.2 inch. However, the acoustic facesheet 96 may have another suitable thickness.

In one version, as shown in FIG. 5, the acoustic facesheet 96 comprises a porous facesheet 152. The porous facesheet 152 has the controlled porosity 148, or desired porosity, that allows air flow 102 to flow through the porous facesheet 152 into the plurality of core cells 100 of the core structure 94. As shown in FIG. 5, the porous facesheet 152 is made of a porous material 154 that may comprise one or more of, porous metal 154a, cast porous metal 154b, porous titanium (Ti) 154c, sintered titanium (Ti) 154d, porous aluminum (Al) 154e, sintered aluminum (Al) 154f, sintered aluminum (Al) powder with epoxy binder 154g, porous thermoplastic 154h, or another suitable porous material that enables the porous facesheet 152 to function as described herein. The porous facesheet 152 has a thickness in a range of from 0.04 inch to 0.15 inch. However, the porous facesheet 152 may have another suitable thickness.

In another version, as shown in FIG. 5, the acoustic facesheet 96 comprises a perforated facesheet 156. The perforated facesheet 156 is made of a perforated material 158 (see FIG. 5) with a plurality of perforations 160. As further shown in FIG. 5, the plurality of perforations 160 are preferably arranged in a pattern 162, and each of the plurality of perforations 160 has a perforation shape 164 comprising one or more of, a circle shape 164a, a slot shape 164b, an oval shape 164c, a square shape 164d, a rectangle shape 164e, a polygon shape 164f, or another suitable shape. As shown in FIGS. 7B, 7D, the plurality of perforations 160 comprise circles 166 having the circle shape 164a. In one version, the perforated facesheet 156 may be perforated with slots 168 (see FIG. 5), where the slots 168 are perpendicular to the direction of the air flow 102. The plurality of perforations 160 are arranged in the pattern 162 on the perforated facesheet 156, such that the perforated facesheet 156 has the controlled porosity 148 in a range of from 4 percent open area (POA) 150 to 25 percent open area (POA) 150. In particular, the perforated facesheet 156 has the controlled porosity 148 (see FIG. 5), or the desired porosity, with a percent open area (POA) 150 (see FIG. 5) in a range of from 4 percent open area (POA) 150 to 8 percent open area (POA) 150, when the perforated facesheet 156 is coupled, or attached, to the core structure 94 and there is no porous septum layer 136, or porous septum segments 136a, present in the core structure 94. Further, in particular, the perforated facesheet 156 has the controlled porosity 148 (see FIG. 5), or the desired porosity, with a percent open area (POA) 150 (see FIG. 5) in a range of from 8 percent open area (POA) 150 to 25 percent open area (POA) 150, when the perforated facesheet 156 is coupled, or attached, to the core structure 94, where the core structure 94 has one or more porous septum layers 136, or porous septum segments 136a, present in the core structure 94. Each of the plurality of perforations 160 has a perforation diameter 161 (see FIG. 7B) that ranges from, for example, without limitation, from 0.03 inch to 0.1 inch, depending on the implementation.

The perforated material 158 may be made of a material comprising one or more of, a composite material, including a polymer film, a graphite/epoxy composite material, a woven fabric, a textile material, a metallic material, including an aluminum, titanium, or other metallic material, or other suitable perforated materials. The perforated facesheet 156 has the controlled porosity 148 (see FIG. 5), or desired porosity, that allows air flow 102 (see FIG. 5) to flow through the perforated facesheet 156 into the plurality of core cells 100 of the core structure 94.

As further shown in FIG. 5, the acoustically treated landing gear door 12 may further comprise a placard 64 (see also FIG. 3B), such as a servicing placard 64a (see also FIG. 3B), or servicing chart, that may be printed, reproduced, or formed on a portion 50a (see FIG. 3B) of the acoustic treatment assembly 50 (see FIG. 3B), such as a portion 96a (see FIG. 3B) of the acoustic facesheet 96 (see FIG. 3B). The placard 64, such as the servicing placard 64a, has an exterior placard surface 170 (see FIGS. 11A, 12) displaying markings 172 (see FIG. 12) that are legible and readable, while maintaining the controlled porosity 148, or desired porosity, of the acoustic facesheet 96. The markings 172 on the placard 64, such as the servicing placard 64a, may comprise words 172a (see FIGS. 11A, 12), text 172b (see FIG. 12), graphics 172c (see FIG. 12), numbers 172d (see FIG. 12), letters 172e (see FIG. 12), drawings 172f (see FIG. 12), symbols 172g (see FIG. 12), and other suitable information that is legible and readable to an operator, a service person, ground handling personnel, or another suitable user reading the placard 64, such as the servicing placard 64a, on the landing gear door 44 of the aircraft 10.

In one version, the placard 64, such as the servicing placard 64a, may be printed, reproduced, or formed on the acoustic facesheet 96, such as the porous facesheet 152, to obtain a porous placard 240 (see FIG. 11A) having the exterior placard surface 170, or surface area of the porous placard 240, as part of the acoustically treated landing gear door 12. In one exemplary version, the placard 64, such as the servicing placard 64a, for example, the porous placard 240, may be printed, reproduced, or formed on a portion of the acoustic facesheet 96, such as the porous facesheet 152, using a laser drilling process 174 (see FIG. 5), to obtain a laser drilled porous placard 176 (see FIGS. 5, 11B), where the laser drilled porous placard 176 has an exterior placard surface 170 displaying markings 172 that are legible, while maintaining the controlled porosity 148, or desired porosity. In another exemplary version, the placard 64, such as the servicing placard 64a, may be printed, reproduced, or formed on a portion of the acoustic facesheet 96, such as the porous facesheet 152, or desired porosity, using a sintering process 178 (see FIG. 5), to obtain a sintered porous placard 180 (see FIGS. 5, 11C), where the sintered porous placard 180 has an exterior placard surface 170 displaying markings 172 that are legible, while maintaining the controlled porosity 148, such as the desired porosity. In another exemplary version, the placard 64, such as the servicing placard 64a, may be printed with a 3D (three-dimensional) printing process on the porous facesheet 152, or another suitable printing or reproduction process.

The placard 64, such as the servicing placard 64a, that is printed, reproduced, or formed on the porous facesheet 152 allows for a greater area of the landing gear door 44 for acoustic treatment and increased noise attenuation, such as sound attenuation, while maintaining the readability of the placard 64, such as the servicing placard 64a. For example, information that is printed on known solid aluminum sheet placards for landing gear doors may be printed or reproduced on one or more portions of the porous facesheet 152 (see FIG. 11A), to obtain a porous placard 240 (see FIG. 11A), such as the laser drilled porous placard 176, the sintered porous placard 180, or another suitable porous placard.

In another version, the placard 64, such as the servicing placard 64a, may be printed, reproduced, or formed on the acoustic facesheet 96, such as the perforated facesheet 156, to obtain a perforated placard 244 (see FIG. 12) having the exterior placard surface 170, or surface area of the perforated placard 244, as part of the acoustically treated landing gear door 12. The plurality of perforations 160 of the perforated facesheet 156 are preferably each of a size having a perforation diameter 161 (see FIG. 7B) that is sufficiently small, so that the markings 172 on the placard 64, such as the servicing placard 64a, are legible and readable, and the number of the plurality of perforations 160 is sufficiently large so that the controlled porosity 148 (see FIG. 5), such as the desired porosity, is maintained. The perforation diameter 161 of each of the plurality of perforations 160 and the spacing between each of the plurality of perforations 160 are optimized to maximize the clarity, legibility, and readability of the markings 172 on the placard 64, such as the servicing placard 64a.

As shown in FIG. 5, the acoustic treatment assembly 50 further comprises a nonporous backsheet 98, or base layer, directly coupled, or attached, between the bottom of the core structure 94 and a portion 92a of the interior cavity 92 in the volume 90 of the interior side 66 of the landing gear door 44. The nonporous backsheet 98 may be integrated in the interior cavity 92 and the volume 90 of the interior side 66 of the landing gear door 44, or the nonporous backsheet 98 may be attached to the portion 92a of the interior cavity 92 in the volume 90 of the interior side 66 of the landing gear door 44, with an adhesive 182 (see FIG. 6A), such as a reticulated film adhesive, glue, or another suitable attachment material.

The nonporous backsheet 98 is made of a nonporous material 184 comprising one or more of, a composite material, a metal material, or another suitable nonporous material that enables the nonporous backsheet 98 to function as described herein. The nonporous backsheet 98, or base layer, is preferably impervious to fluid 130, such as liquid, for example, water, and is preferably impermeable to air, to enable reflection of the acoustic waves 82, such as the sound waves 82a. The nonporous backsheet 98 has a thickness that is a function of the durability of the landing gear door 44 (see FIG. 5) to withstand all of the structural and aerodynamic loads during a flight of the aircraft 10. The thicker the nonporous backsheet 98 is, the less volume is available for the core depth of the core structure 94.

In certain versions, the acoustic facesheet 96 and the nonporous backsheet 98 are formed from substantially identical materials and have substantially identical thicknesses. In other embodiments, the acoustic facesheet 96 and the nonporous backsheet 98 are each formed from a different material and/or each have a different thickness. As shown in FIGS. 6A-6B, the nonporous backsheet 98 includes no perforations or orifices extending radially therethrough.

As shown in FIG. 5, the acoustically treated landing gear door 12 is designed or configured for attachment to, and attached to, an aircraft 10, such as a jet aircraft 10a. As shown in FIG. 5, the aircraft 10, such as the jet aircraft 10a, comprises landing gear 24, including main landing gear (MLG) 26 and a nose landing gear (NLG) 28. In one version, as shown in FIG. 3A, the main landing gear (MLG) 26 comprises the first main landing gear 26a, and the second main landing gear 26b. In other versions, the aircraft 10 may comprise additional landing gear. Immediately before and during the takeoff phase 14 (see FIG. 5) and the landing phase 15 (see FIG. 5) of the aircraft 10, the landing gear 24 are in the deployed position 34 (see FIGS. 1, 5), and the one or more acoustically treated landing gear doors 12 are in the open position 52 (see FIGS. 1, 5). The acoustic treatment assembly 50 is designed or configured to achieve, and achieves, a desired sound attenuation level immediately before and during the takeoff phase 14 and the landing phase

15. During a cruise phase of the aircraft 10, the landing gear 24 are in a retracted position 36 (see FIG. 5), and the one or more acoustically treated landing gear doors 12 are in a closed position 54 (see FIG. 5).

The acoustically treated landing gear door 12 reduces the sound 84 (see FIG. 5), such as noise 86 (see FIG. 5), from the landing gear 24 of the aircraft 10 and the region of the landing gear 24 of the aircraft 10, when the landing gear 24 is in the deployed position 34, by attenuating acoustic waves 82 (see FIG. 5), or sound waves 82*a*, (see FIG. 5) emanating from, or generated by, the landing gear 24 and reflected off the acoustic treatment assembly 50 of the acoustically treated landing gear door 12. The acoustically treated landing gear door 12 allows the acoustic waves 82, or sound waves 82*a*, to communicate through the volume 90 of the landing gear door 44. The acoustic waves 82, or sound waves 82*a*, and energy of the acoustic waves 82, are reduced or decreased as the sound 84, such as the noise 86, propagates into the volume 90 of the landing gear door 44 and reflects back out.

The acoustically treated landing gear door 12 suppresses the acoustic waves 82, or sound waves 82*a*, originally generated from the landing gear 24 or the region of the landing gear 24, when the acoustic waves 82, or sound waves 82*a*, are reflected on the inner mold line (IML) 68 before being radiated to the external environment 74 (see FIGS. 4, 5), and the community 88 (see FIGS. 4, 5), immediately before and during the takeoff phase 14 and the landing phase 15 of the aircraft 10. The level of sound 84, such as noise 86, generated by, or emanating from, the landing gear 24 is attenuated by integrating the acoustic treatment assembly 50 on the inner mold line (IML) 68 of the landing gear door 44, such as the main landing gear (MLG) strut door 46*a* and/or the main landing gear (MLG) body door 46*b*, and the nose landing gear (NLG) door 48, to reduce sound 84, such as noise 86, to the external environment 74 and the community 88.

The sound 84, such as the noise 86, emanating from, or generated by, the landing gear 24 gets directly absorbed through the acoustic treatment assembly 50, and in particular, through the core structure 94 and, if present, through the one or more porous septum layers 136, or porous septum segments 136*a*, as the acoustic waves 82, or sound waves 82*a*, communicate with the structure of the landing gear door 44 through the acoustic facesheet 96. The acoustic treatment assembly 50 attenuates the sound 84, such as noise 86, from the region of the landing gear 24 by absorbing the acoustic waves 82, or sound waves 82*a*, and the energy of the acoustic waves 82 on the inner surface of the acoustically treated landing gear door 12.

The acoustic waves 82, or sound waves 82*a*, generated around the landing gear 24 and the landing gear doors 44 enter the core cells 100 of the core structure 94 through the acoustic facesheet 96 and reflect from the nonporous backsheet 98 at a phase different from the entering or incoming acoustic waves 82, or sound waves 82*a*, which tends to cancel out the incoming acoustic waves 82, or sound waves 82*a*. The acoustic treatment assembly 50 is in contact with air flow 102, when the landing gear door 44 is in the open position 52, and the landing gear 24 is in the deployed position 34. The controlled porosity 148 of the porous facesheet 152 or the plurality of perforations 160 of the perforated facesheet 156 allow the acoustic waves 82, or sound waves 82*a*, to pass through the plurality of core cells 100, and if present, the one or more porous septum layers 136, or porous septum segments 136*a*, and be reflected off of the nonporous backsheet 98 in order to attenuate acoustic waves 82, or sound waves 82*a*, that are incoming.

The geometry of the acoustic treatment assembly 50 comprising the acoustic facesheet 96, the nonporous backsheet 98, the core structure 94, and the optional one or more porous septum layers 136, or porous septum segments 136*a*, is designed to provide an acoustic resistance 186 (see FIG. 5) of 1 rho*c to 2 rho*c over a wide range of frequencies, such that an acoustic reactance 188 (see FIG. 5) is within 0.0+/−0.5 rho*c. As used herein, "acoustic resistance" is the real component of acoustic impedance and is associated with the dissipation of acoustic energy, and "acoustic reactance" is the imaginary component of acoustic impedance and is associated with the phase difference between the acoustic pressure and the acoustic velocity through the surface.

In another version of the disclosure, there is provided an aircraft 10 (see FIGS. 1, 5), such as a jet aircraft 10*a* (see FIGS. 1, 5). As shown in FIG. 1, the aircraft 10, such as the jet aircraft 10*a*, comprises the fuselage 16, one or more wings 18 attached to the fuselage 16, one or more main landing gear 26 (see FIG. 1) retractably coupled to the center undercarriage portion 30 (see FIG. 1) of the fuselage 16, the nose landing gear 28 (see FIG. 1) retractably coupled to the nose undercarriage portion 32 (see FIG. 1) of the fuselage 16, and one or more acoustically treated landing gear doors 12.

Each of the one or more acoustically treated landing gear doors 12 (see FIGS. 1, 5) comprises the landing gear door 44 (see FIGS. 1, 5) attached to the fuselage 16, and associated with one of, the one or more main landing gear 26 (see FIG. 5), and the nose landing gear 28, and the acoustic treatment assembly 50 (see FIG. 5). The acoustic treatment assembly 50 is integrated on the inner mold line 68 (see FIGS. 3B, 5) of the interior side 66 (see FIGS. 3B, 5) of the landing gear door 44, and extending within the interior cavity 92 (see FIGS. 5, 6A) of the landing gear door 44. The acoustic treatment assembly 50 does not increase the thickness of the landing gear door 44, as it is integrated in the interior cavity 92 (see FIG. 5) and the volume 90 (see FIG. 5) of the landing gear door 44.

The acoustic treatment assembly 50 comprises the core structure 94 (see FIGS. 5, 6B). As shown in FIG. 6B, the core structure 94 comprises the first side 202*a* and the second side 202*b*, the plurality of core cells 100 extending between the first side 202*a* and the second side 202*b*, one or more porous septum layers 136 coupled to one or more of the plurality of core cells 100, and a drainage system 80 (see FIG. 5) designed or configured to evacuate fluid 130 (see FIG. 5) from the core structure 94. The drainage system 80 has the plurality of drainage paths 132 (see FIGS. 5, 6A-6B) coupled to one or more drainage exits 76 (see FIGS. 5, 7A). The plurality of drainage paths 132 are interconnected between the plurality of core cells 100 (see FIGS. 6A-6B), and the one or more drainage exits 76 located at one or more perimeter portions 78*a* (see FIGS. 3B, 7A) of the landing gear door 44.

The acoustic treatment assembly 50 further comprises the acoustic facesheet 96 (see FIGS. 5, 6B) coupled atop the first side 202*a* of the core structure 94. The acoustic facesheet 96 allows fluid communication between the external environment 74 (see FIG. 1, 5) and the plurality of core cells 100. In one version, as discussed above, the acoustic facesheet 96 of the acoustic treatment assembly 50 comprises the porous facesheet 152 made of the porous material 154 comprising, as shown in FIG. 5, one of, porous metal 154*a*, cast porous metal 154*b*, porous titanium 154*c*, sintered titanium 154*d*, porous aluminum 154*e*, sintered aluminum 154*f*, sintered aluminum powder with epoxy binder 154g, and porous thermoplastic 154h. In another version, as discussed above, the acoustic facesheet 96 of the acoustic treatment assembly 50 comprises the perforated facesheet 156 (see FIG. 5) having the plurality of perforations 160 (see FIG. 5), each having the perforation shape 164 comprising, as shown in FIG. 5, one of, a circle shape 164a, a slot shape 164b, an oval shape 164c, a square shape 164d, a rectangle shape 164e, a polygon shape 164f, or another suitable perforation shape. The acoustic treatment assembly 50 further comprises the nonporous backsheet 98 (see FIGS. 5, 6B) directly coupled between the second side 202b (see FIGS. 6A-6B) of the core structure 94 and a portion 92a (see FIGS. 6A-6B) of the interior cavity 92 (see FIGS. 6A-6B) of the landing gear door 44.

The landing gear door 44 further comprises the placard 64 (see FIGS. 3B, 5) printed on a portion 50a (see FIG. 3B) of the acoustic treatment assembly 50 (see FIG. 3B), such as a portion 96a (see FIG. 3B) of the acoustic facesheet 96 (see FIG. 3B). The placard 64 has the exterior placard surface 170 displaying markings 172 (see FIG. 11A) that are legible, while maintaining the controlled porosity 148 (see FIG. 5), or desired porosity.

The landing gear door 44 comprises one or more of, the main landing gear door 46 (see FIGS. 1, 5), including the main landing gear strut door 46a (see FIG. 3B) and the main landing gear body door 46b (see FIG. 4), and the nose landing gear door 48 (see FIGS. 1, 2), including as shown in FIG. 2, the first forward nose landing gear door 60a, the second forward nose landing gear door 60b, the first aft nose landing gear door 62a, and the second aft nose landing gear door 62b.

Each of the one or more acoustically treated landing gear doors 12 reduces noise 86 (see FIGS. 4, 5) created by acoustic waves 82 (see FIGS. 4, 5) emanating from one of, the one or more main landing gear 26, and the nose landing gear 28, in the deployed position 34 (see FIGS. 1, 5), by absorbing the acoustic waves 82 through the acoustic facesheet 96 and the core structure 94 of the acoustic treatment assembly 50, and reflecting the acoustic waves 82 off the nonporous backsheet 98 of the acoustic treatment assembly 50.

Now referring to FIGS. 6A-6B, FIG. 6A is an illustration of a schematic cross-section view of a version of an acoustically treated landing gear door 12, of the disclosure, where the core structure 94 does not include porous septum layers 136. FIG. 6B is an illustration of a schematic cross-section view of another version of an acoustically treated landing gear door 12 of the disclosure, where the core structure 94 includes two porous septum layers 136.

As shown in FIGS. 6A-6B, the acoustically treated landing gear door 12 comprises the landing gear door 44, such as the main landing gear door 46, with the acoustic treatment assembly 50 integrated on the inner mold line 68, or inner surface, of the interior side 66 of the landing gear door 44, and extending within the interior cavity 92 and the volume 90 of the landing gear door 44. As further shown in FIGS. 6A-6B, the acoustic treatment assembly 50 comprises a plurality of layers 190, including a top layer 192 in the form of the acoustic facesheet 96, a bottom layer 194 in the form of the nonporous backsheet 98, and a middle layer 196 in the form of the core structure 94 sandwiched in between the top layer 192 and the bottom layer 194.

As further shown in FIGS. 6A-6B, the top layer 192, in the form of the acoustic facesheet 96, has a first facesheet side 198a, or top facesheet side, a second facesheet side 198b, or bottom facesheet side, and a body 200 formed between the first facesheet side 198a and the second facesheet side 198b. The first facesheet side 198a, or top side, is opposite the second facesheet side 198b, or bottom side. As shown in FIGS. 6A-6B, the first facesheet side 198a faces outwardly and faces the external environment 74 (see FIGS. 1, 5), and is exposed to acoustic waves 82, or sound waves 82a, when the landing gear door 44 is in the open position 52 (see FIGS. 2, 3A-3B, 5). As shown in FIGS. 6A-6B, the acoustic facesheet 96 is in the form of the porous facesheet 152. Alternatively, the acoustic facesheet 96 may be in the form of the perforated facesheet 156 (see FIG. 5). Although not shown in FIGS. 6A-6B, a placard 64 (see FIGS. 3B, 5), such as a servicing placard 64a (see FIGS. 3B, 5), may be printed, reproduced, or formed on a portion 96a (see FIG. 3B) of the first facesheet side 198a of the acoustic facesheet 96.

As further shown in FIGS. 6A-6B, the middle layer 196 in the form of the core structure 94 comprises a first side 202a (see FIG. 6A), or top side, and a second side 202b (see FIG. 6A), or bottom side, and the plurality of core cells 100 (see FIGS. 5, 6A), or middle portion, extending between the first side 202a and the second side 202b. The first side 202a, or top side, is opposite the second side 202b, or bottom side. FIGS. 6A-6B show the first side 202a of the core structure 94, coupled, or attached, to the second facesheet side 198b of the acoustic facesheet 96, with a first adhesive layer 204a of adhesive 182, such as a reticulated film adhesive, glue, or another suitable bonding or attachment material. However, the acoustic facesheet 96 may be coupled, or attached, atop the core structure 94, via another bonding, attachment, or coupling means, or the acoustic facesheet 96 may be integrated with the core structure 94. The plurality of core cells 100 (see FIGS. 6A-6B) are closely packed together, and the core cell walls 205 (see FIGS. 6A-6B) of the core structure 94 are continuous through the core structure 94 from the first side 202a, or top side, to the second side 202b, or bottom side.

As further shown in FIGS. 6A-6B, the bottom layer 194 in the form of the nonporous backsheet 98 comprises a first backsheet side 206a, or top backsheet side, a second backsheet side 206b, or bottom facesheet side, and a body 208 formed between the first backsheet side 206a and the second backsheet side 206b. The first backsheet side 206a, or top side, is opposite the second backsheet side 206b, or bottom side. FIGS. 6A-6B show the second side 202b of the core structure 94, coupled, or attached, to the first backsheet side 206a of the nonporous backsheet 98, with a second adhesive layer 204b of adhesive 182, such as a reticulated film adhesive, glue, or another suitable bonding or attachment material. However, the nonporous backsheet 98 may be coupled, or attached, to the bottom of the core structure 94, via another bonding, attachment, or coupling means, or the nonporous backsheet 98 may be integrated with the core structure 94. As shown in FIGS. 6A-6B, the nonporous backsheet 98 is attached to, and covers, the second side 202b, or bottom side, of the core structure 94.

FIGS. 6A-6B show the second backsheet side 206b coupled, or attached, to a portion 92a of the interior cavity 92 with a third adhesive layer 204c of adhesive 182, such as a reticulated film adhesive, glue, or another suitable bonding or attachment material. However, the nonporous backsheet 98 may be coupled, or attached, to the portion 92a of the interior cavity 92, via another bonding, attachment, or coupling means, or the nonporous backsheet 98 may be integrated with the interior cavity 92 of the landing gear door 44.

As shown in FIG. 6B, the core structure 94 of the acoustically treated landing gear door 12 further includes two porous septum layers 136 disposed, or installed, between the first side 202a and the second side 202b of the core structure 94, and coupled to the plurality of core cells 100. Although the core structure 94 in FIG. 6B shows two porous septum layers 136, the core structure 94 may comprise one porous septum layer 136, or more than two porous septum layers 136. FIG. 6B shows the offset 138, or distance, between the two porous septum layers 136, and the offset 138 may be adjusted to optimize and maximize acoustic dampening or absorption. As shown in FIG. 6B, the core structure 94 has a sandwich structure 144. Alternatively, the core structure 94 may have a monolithic structure 146 (see FIG. 5).

As shown in FIGS. 6A-6B, the acoustically treated landing gear door 12 may be assembled by any of a variety of techniques, including but not limited to, bonding the plurality of layers 190 to one another using a suitable adhesive 182. The assembly process may be accomplished by welding or brazing the plurality of layers 190 together where they are constructed of a metal material. Alternatively, such metal layers may be attached together by sintering, lasering, and/or a suitable adhesive 182. The assembly process may be accomplished with adhesive 182 or another bonding, attachment, or coupling means, to adhere, bond, or attach, the plurality of layers 190 together where they are constructed of a composite material.

Figure 7A:
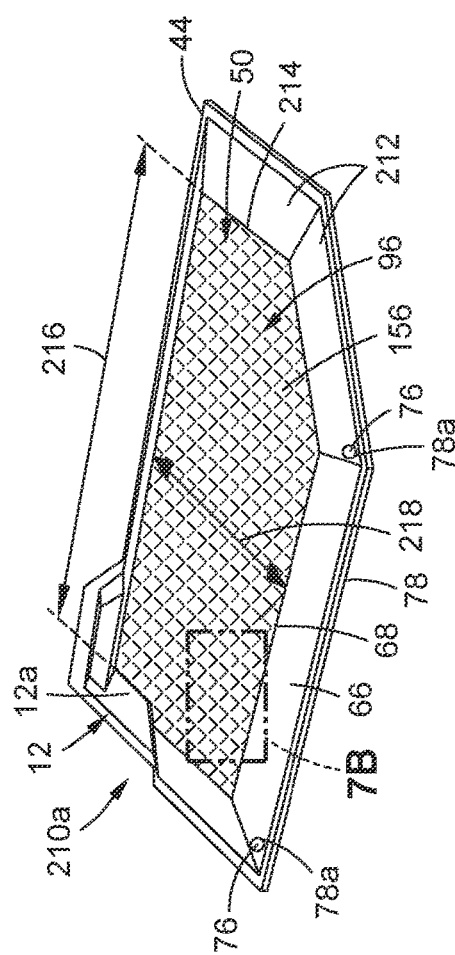
FIG. 7A is an illustration of a perspective view of an interior side of a test model of an acoustically treated main landing gear door of the disclosure.
Figure 7B:
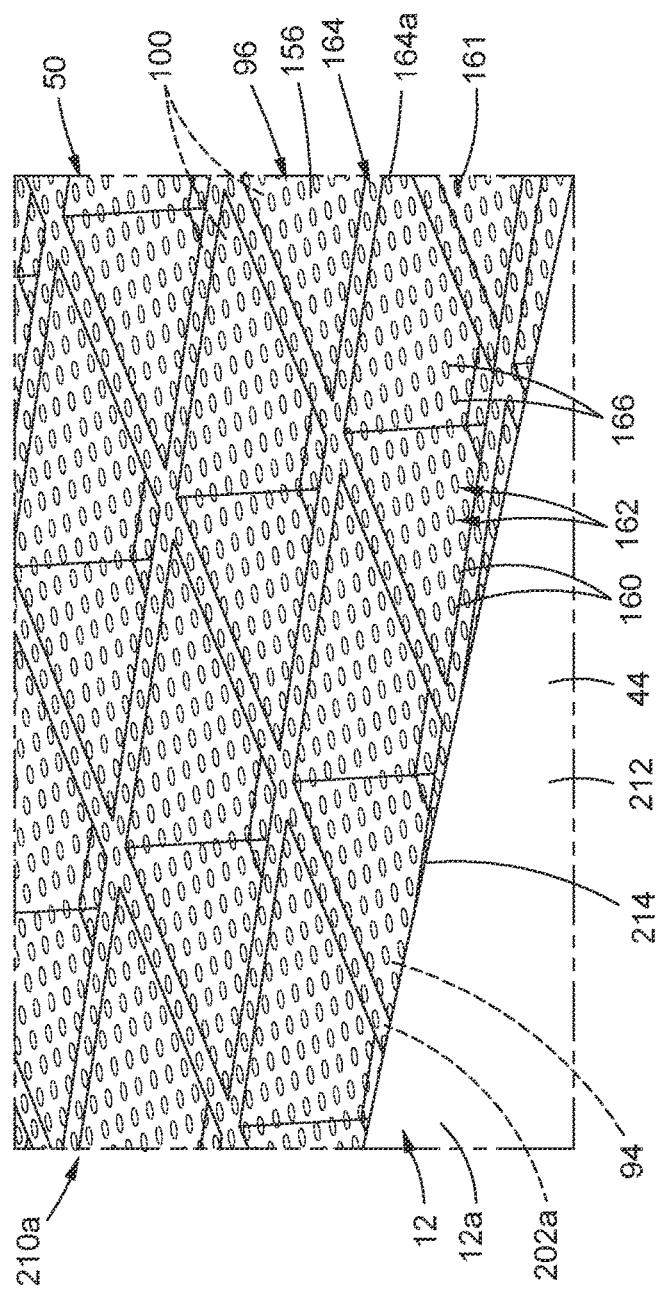
FIG. 7B is an illustration of an enlarged perspective view of portion 7B of the acoustically treated main landing gear door of FIG. 7A.

Now referring to FIG. 7A, FIG. 7A is an illustration of a perspective view of an interior side 66 of a test model 210a of an acoustically treated landing gear door 12, such as an acoustically treated main landing gear (MLG) door 12a, of the disclosure. As shown in FIG. 7A, the test model 210a of the acoustically treated landing gear door 12, such as the acoustically treated main landing gear (MLG) door 12a, includes the landing gear door 44 with the acoustic treatment assembly 50. FIG. 7A shows the acoustic facesheet 96, such as in the form of the perforated facesheet 156, of the acoustic treatment assembly 50. FIG. 7A shows the interior side 66 with the inner mold line (IML) 68, and the perimeter 78 of the landing gear door 44 of the acoustically treated landing gear door 12, such as the acoustically treated main landing gear (MLG) door 12a. FIG. 7A further shows drainage exits 76 of the drainage system 80 (see FIG. 5) located at or near perimeter portions 78a of the perimeter 78. Although FIG. 7A shows two drainage exits 76, the drainage system 80 (see FIG. 5) may have one drainage exit 76, or more than two drainage exits 76, as needed.

FIG. 7A further shows structural frame portions 212 of the landing gear door 44, surrounding, or edging, a periphery 214 of the acoustic treatment assembly 50. FIG. 7A further shows a length 216 of the acoustic treatment assembly 50 extending along a length of the inner mold line (IML) 68 of the landing gear door 44, and shows a width 218 of the acoustic treatment assembly 50.

Now referring to FIG. 7B, FIG. 7B is an illustration of an enlarged perspective view of portion 7B of the test model 210a of the acoustically treated landing gear door 12, such as the acoustically treated main landing gear door 12a, of FIG. 7A. FIG. 7B shows the acoustic treatment assembly 50 with the acoustic facesheet 96, such as in the form of the perforated facesheet 156, overlaid on the first side 202a, or top side, of the core structure 94. FIG. 7B further shows the perforated facesheet 156 having the plurality of perforations 160 in a pattern 162 of circles 166 that are all of the same size and arranged and evenly spaced in uniform rows, where each perforation 160 has a perforation shape 164 in the form of a circle shape 164a. Alternatively, the plurality of perforations 160 may have another perforation shape 164 comprising, as shown in FIG. 5, a slot shape 164b, an oval shape 164c, a square shape 164d, a rectangle shape 164e, a polygon shape 164f, or another suitable perforation shape. FIG. 7B further shows the plurality of core cells 100 of the core structure 94. FIG. 7B further shows a structural frame portion 212 of the landing gear door 44, surrounding, or edging, the periphery 214 of the acoustic treatment assembly 50. FIG. 7B further shows a perforation diameter 161 of the perforation 160, such as the circle 166.

Figure 7C:
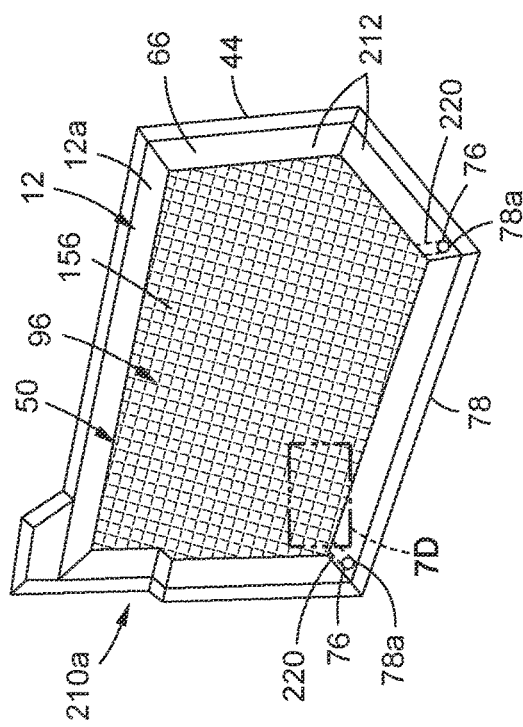
FIG. 7C is an illustration of a top view of the test model of the acoustically treated main landing gear door of FIG. 7A.
Figure 7D:
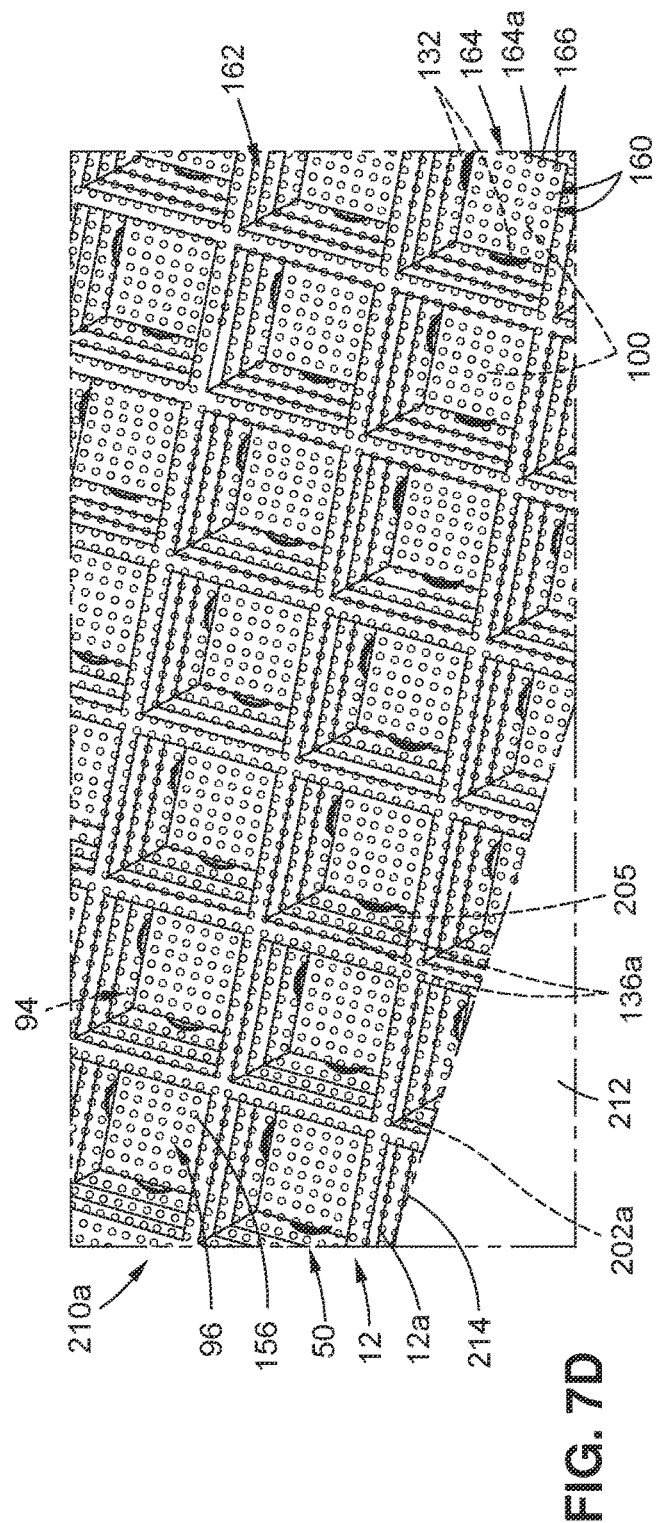
FIG. 7D is an illustration of an enlarged top view of portion 7D of the acoustically treated main landing gear door of FIG. 7C.

Now referring to FIG. 7C, FIG. 7C is an illustration of a top view of the interior side 66 of the test model 210a of the acoustically treated landing gear door 12, such as the acoustically treated main landing gear (MLG) door 12a, of FIG. 7A. As shown in FIG. 7C, the test model 210a of the acoustically treated landing gear door 12, such as the acoustically treated main landing gear (MLG) door 12a, includes the landing gear door 44 with the acoustic treatment assembly 50. FIG. 7C further shows the acoustic facesheet 96, such as in the form of the perforated facesheet 156, of the acoustic treatment assembly 50, and shows the structural frame portions 212. FIG. 7C further shows the drainage exits 76 located at or near the perimeter portions 78a of the perimeter 78 of the landing gear door 44, and shows drainage channels 220 coupled between the drainage exits 76 and the core structure 94 (see FIG. 7D) of the acoustic treatment assembly 50.

Now referring to FIG. 7D, FIG. 7D is an illustration of an enlarged top view of portion 7D of the test model 210a of the acoustically treated landing gear door 12, such as the acoustically treated main landing gear (MLG) door 12a, of FIG. 7C. FIG. 7D shows the acoustic facesheet 96, such as the perforated facesheet 156, and the core structure 94 of the acoustic treatment assembly 50 of FIG. 7C. FIG. 7D shows the acoustic treatment assembly 50 with the acoustic facesheet 96, such as in the form of the perforated facesheet 156, overlaid on the first side 202a, or top side, of the core structure 94. FIG. 7D further shows the perforated facesheet 156 having the plurality of perforations 160 in the pattern 162 of circles 166, where each perforation 160 has the perforation shape 164 in the form of the circle shape 164a. FIG. 7D further shows the plurality of core cells 100 of the core structure 94, and shows two porous septum segments 136a attached to the core cell walls 205 of each core cell 100 of the core structure 94. The two porous septum segments 136a in each core cell 100 are shown in partial view and cut away to show the plurality of drainage paths 132 of the drainage system 80, where the drainage paths 132 are formed in each core cell 100 and are interconnected between neighboring core cells 100. The plurality of drainage paths 132 are coupled to one or more of the drainage exits 76 (see FIG. 7C), via the one or more drainage channels 220 (see FIG. 7C). FIG. 7D further shows a structural frame portion 212 of the landing gear door 44, surrounding, or edging, the periphery 214 of the acoustic treatment assembly 50.

The plurality of drainage paths 132, the drainage channels 220, and the drainage exits 76 (see FIG. 7C) of the drainage system 80 (see FIG. 5) are designed or configured to evacuate fluid 130 (see FIG. 5), such as a fluid build-up 130a (see FIG. 5), from the core structure 94, when there is a fluid flow 130b (see FIG. 5) through the core structure 94. The plurality of drainage paths 132 are optimized to minimize a drainage time 134 (see FIG. 5), while keeping the shape of the landing gear door 44 structurally durable.

Now referring to FIGS. 8A-8B, FIG. 8A is an illustration of an enlarged front perspective view of a version of the core structure 94 of the acoustically treated landing gear door 12, such as the acoustically treated main landing gear (MLG) door 12a, of FIG. 7A. FIG. 8B is an illustration of a front cross-section view of the core structure 94 of FIG. 8A, taken along lines 8B-8B of FIG. 8A.

FIGS. 8A-8B shows the core structure 94, such as a septumized core structure 94a, having a monolithic structure 146. As shown in FIGS. 8A-8B, the core structure 94, such as the septumized core structure 94a, comprises the first side 202a, the second side 202b, and the plurality of core cells 100 extending between the first side 202a and the second side 202b, and comprises two porous septum layers 136 comprising multiple porous septum segments 136a, where two porous septum segments 136a are positioned and secured to core cell walls 205 within each core cell 100, and between the first side 202a and the second side 202b of the core structure 94. FIGS. 8A-8B shows a first porous septum segment 136b and a second porous septum segment 136c each dividing, or segmenting, each core cell 100 into core cell portions 101, including a first core cell portion 101a, a second core cell portion 101b, and a third core cell portion 101c. As shown in FIG. 8B, the plurality of core cells 100 of the core structure 94 each have a shape 104 in the form of a rectangular cylinder shape 108.

Each core cell 100 has a height 124 (see FIG. 8A), or depth, a width 126 (see FIG. 8A), and a length 128 (see FIG. 8A). Preferably, each core cell 100 has a height 124 to width 126 ratio of 2:1, or below. As shown in FIG. 8A, the first porous septum segment 136b is positioned, and attached in place, such as with adhesive 182, or another suitable bonding material or attachment means, at a predetermined partial height 124a, such as a first predetermined partial height 124b, or depth, within the core cell 100. As further shown in FIG. 8A, the second porous septum segment 136c is positioned, and attached in place, such as with adhesive 182, or another suitable bonding material or attachment means, at a predetermined partial height 124a, such as a second predetermined partial height 124c, or depth, within the core cell 100.

As further shown in FIGS. 8A-8B, the core structure 94 comprises the plurality of drainage paths 132 formed in each core cell 100 and interconnected between neighboring core cells 100. As shown in FIGS. 8A-8B each drainage path 132 comprises through openings 222, such as in the form of arched through openings 222a, each formed through a core cell wall 205 at a base 224 of each core cell 100, within the third core cell portion 101c of each core cell 100. As further shown in FIGS. 8A-8B, each through opening 222, such as the arched through opening 222a, may open into, and join to, one or more passages 225 formed between adjacent core cells 100, or may open into, and join directly to, a through opening 222, such as an arched through opening 222a, of an adjacent or neighboring core cell 100. Although FIG. 8A shows two through openings 222 in each core cell 100, in alternative versions, each core cell 100 may comprise one through opening 222, or more than two through openings 222. The through openings 222, such as in the form of arched through openings 222a, and the one or more passages 225 forming the drainage paths 132 connect to, and are in fluid communication with, the one or more drainage channels 220 (see FIG. 7C), and in turn, the one or more drainage exits 76 (see FIG. 7C).

Figure 8C:
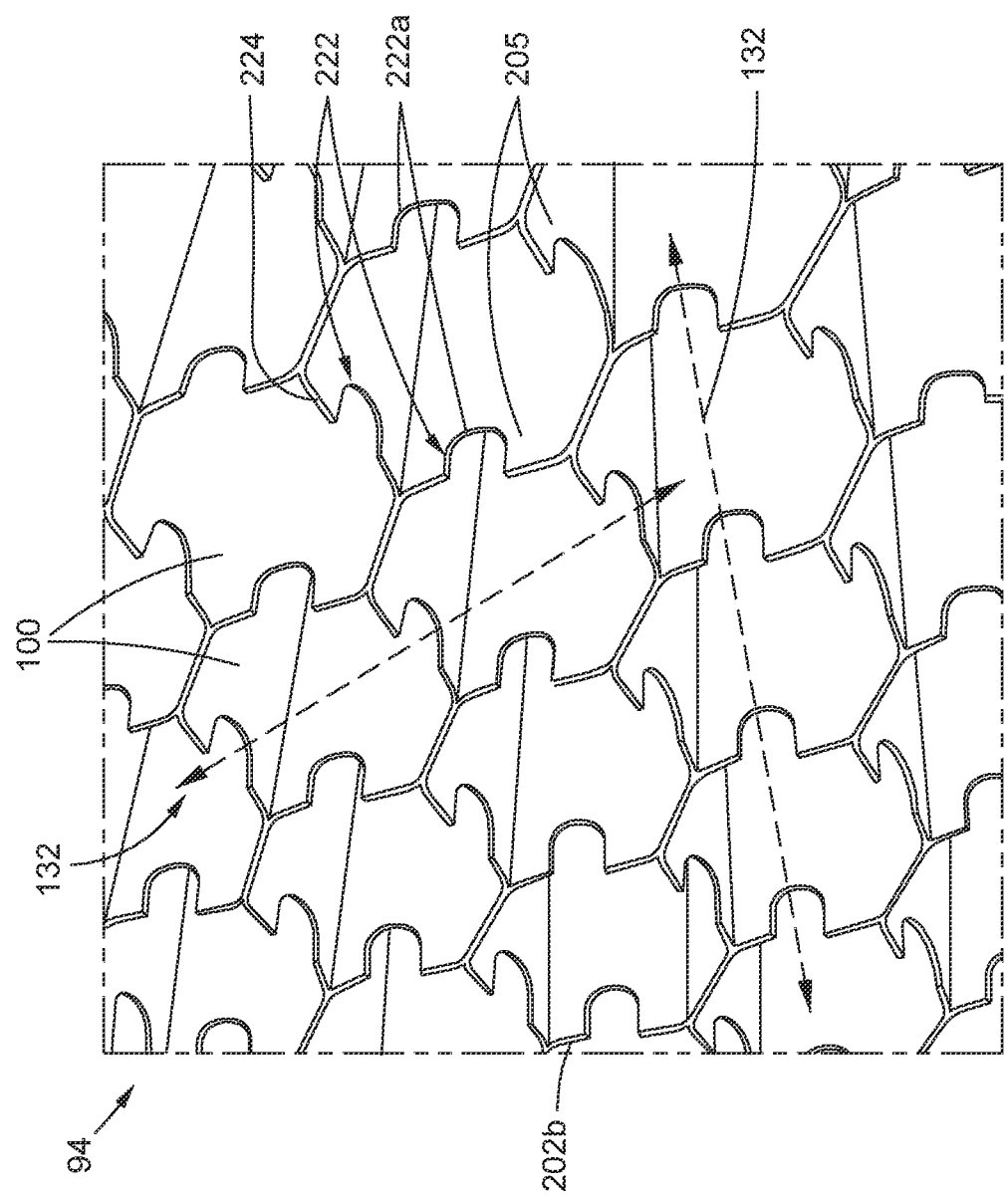
FIG. 8C is an illustration of an enlarged bottom perspective view of another version of a core structure for an acoustically treated landing gear door of the disclosure.

Now referring to FIG. 8C, FIG. 8C is an illustration of an enlarged bottom perspective view of another version of the core structure 94 for the acoustically treated landing gear door 12 (see FIG. 5) of the disclosure. FIG. 8C shows the second side 202b, or second end, of the core structure 94, and shows the plurality of core cells 100 of the core structure 94. As shown in FIG. 8C, in this version, the core structure 94 comprises the plurality of drainage paths 132 interconnected between neighboring core cells 100, where the plurality of drainage paths 132 include four through openings 222, such as in the form of four arched through openings 222a, formed in each core cell 100. Each through opening 222, such as the arched through opening 222a, is formed through a core cell wall 205 at a base 224 of each core cell 100. As shown in FIG. 8C, each through opening 222, such as in the form of the arched through opening 222a, opens into, and joins directly to, a through opening 222, such as an arched through opening 222a, of an adjacent or neighboring core cell 100. As shown in FIG. 8C, the through openings 222, such as the arched through openings 222a, are aligned to form the plurality of drainage paths 132.

Figure 9B:
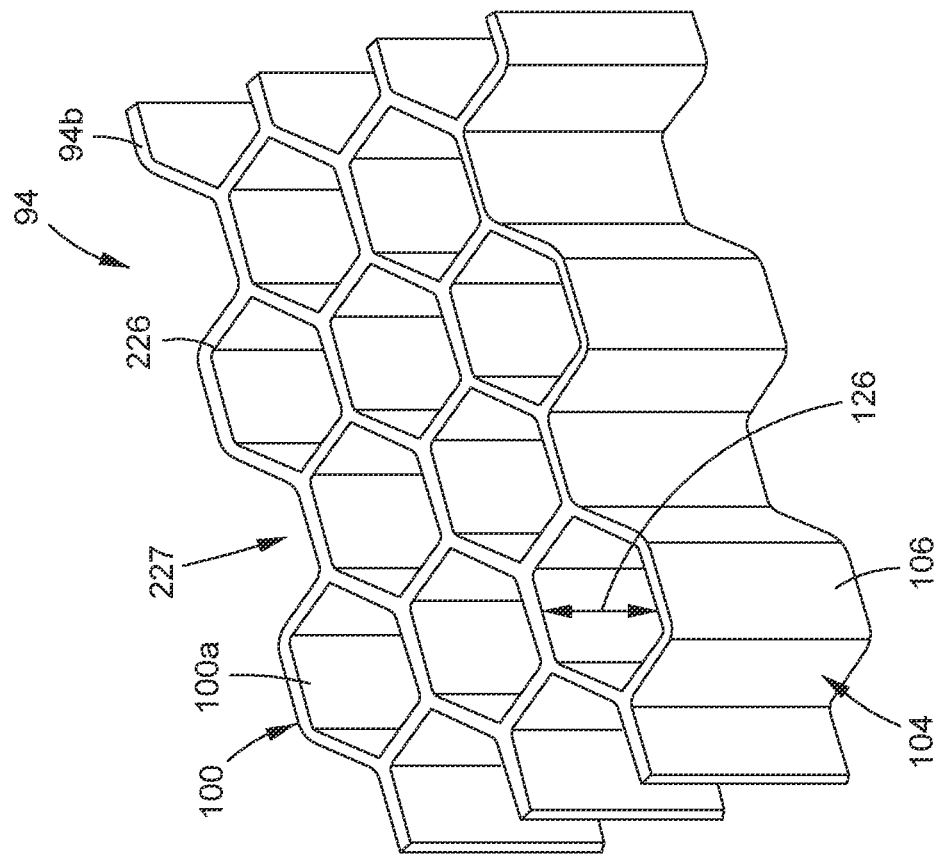
FIG. 9B is an illustration of a top perspective view of a core structure in the form of a hexagonal honeycomb core structure for use in an acoustically treated landing gear door of the disclosure.
Figure 9A:
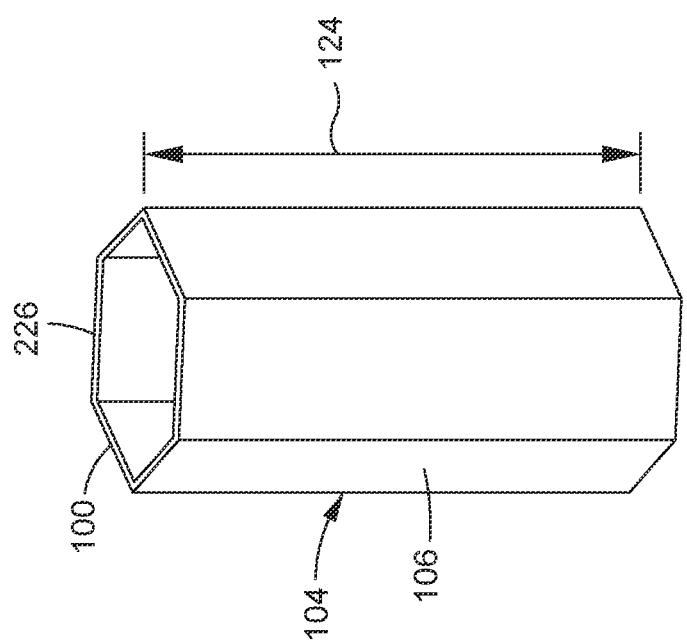
FIG. 9A is an illustration of a side perspective view of a version of a core cell having a hexagonal cylinder shape.

Now referring to FIGS. 9A-9J, FIGS. 9A-9J show the core cell 100 having various shapes 104. FIG. 9A is an illustration of a side perspective view of a version of the core cell 100 having a shape 104, such as a hexagonal cylinder shape 106, or hexagonal prism, and a height 124. As shown in FIG. 9A, the core cell 100 with the hexagonal cylinder shape 106 has a hexagonal cross-section 226.

FIG. 9B is an illustration of a top perspective view of a core structure 94, in the form of a hexagonal honeycomb core structure 94b, for use in the acoustic treatment assembly 50 (see FIG. 5) of the acoustically treated landing gear door 12 (see FIG. 5) of the disclosure. As shown in FIG. 9B, the hexagonal honeycomb core structure 94b has a honeycomb geometry 227 comprising a plurality of hexagon core cells 100a each having a shape 104, such as a hexagonal cylinder shape 106, with a hexagonal cross-section 226. As further shown in FIG. 9B, each hexagon core cells 100a has a width 126. In one exemplary version, the width 126 is preferably ⅜ inch. However, the width 126 may be less than ⅜ inch or greater than ⅜ inch.

Figure 9C:
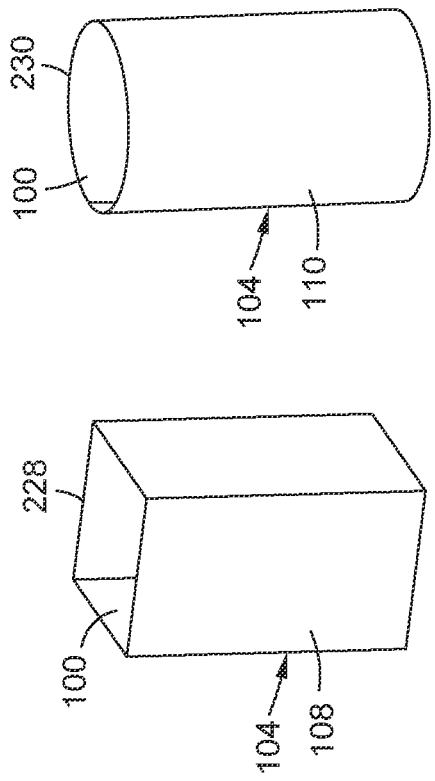
FIG. 9C is an illustration of a side perspective view of another version of a core cell having a rectangular cylinder shape.

FIG. 9C is an illustration of a side perspective view of another version of a core cell 100 having a shape 104, in the form of a rectangular cylinder shape 108. As shown in FIG. 9C, the core cell 100 with the rectangular cylinder shape 108 has a rectangular cross-section 228.

Figure 9D:
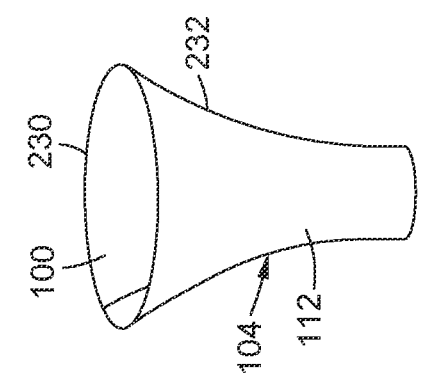
FIG. 9D is an illustration of a side perspective view of yet another version of a core cell having a cylinder shape.

FIG. 9D is an illustration of a side perspective view of yet another version of a core cell 100 having a shape 104, in the form of a cylinder shape 110. As shown in FIG. 9D, the core cell 100 with the cylinder shape 110 has a circular cross-section 230.

Figure 9E:
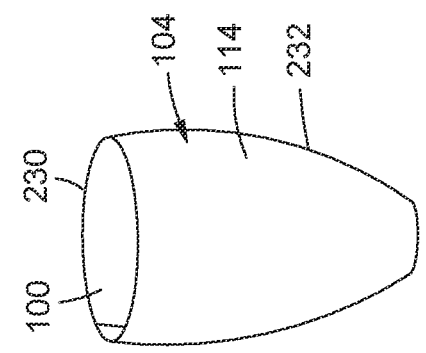
FIG. 9E is an illustration of a side perspective view of yet another version of a core cell having a flared cylinder shape.

FIG. 9E is an illustration of a side perspective view of yet another version of a core cell 100 having a shape 104, in the form of a flared cylinder shape 112 or funnel shape. As shown in FIG. 9E, the core cell 100 with the flared cylinder shape 112 has a circular cross-section 230 with a converging profile 232.

Figure 9F:
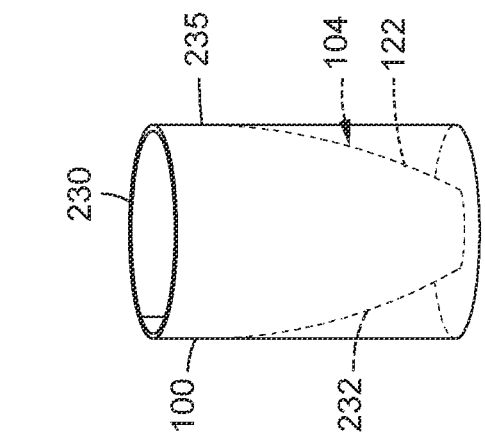
FIG. 9F is an illustration of a side perspective view of yet another version of a core cell having a tapered cylinder shape.

FIG. 9F is an illustration of a side perspective view of yet another version of a core cell 100 having a shape 104, in the form of a tapered cylinder shape 114. As shown in FIG. 9F, the core cell 100 with the tapered cylinder shape 114 has a circular cross-section 230 with a converging profile 232.

Figure 9G:
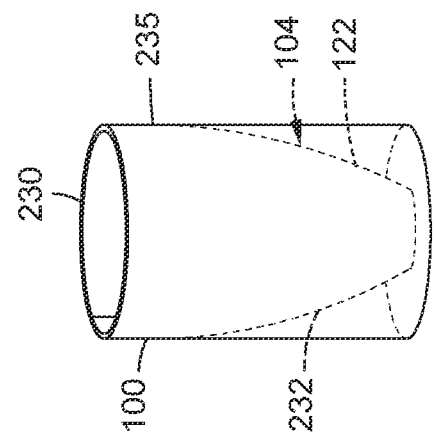
FIG. 9G is an illustration of a side perspective view of yet another version of a core cell having a truncated cone cylinder shape.

FIG. 9G is an illustration of a side perspective view of yet another version of a core cell 100 having a shape 104, in the form of a truncated cone cylinder shape 116. As shown in FIG. 9G, the core cell 100 with the truncated cone cylinder shape 116 has a circular cross-section 230 with a diverging profile 234.

Figure 9H:
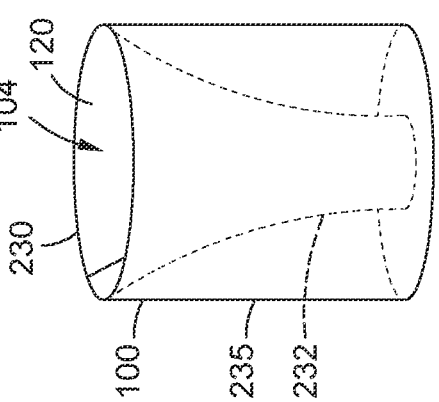
FIG. 9H is an illustration of a side perspective view of yet another version of a core cell having a bell cylinder shape.

FIG. 9H is an illustration of a side perspective view of yet another version of a core cell 100 having a shape 104, in the form of a bell cylinder shape 118. As shown in FIG. 9H, the core cell 100 with the bell cylinder shape 118 has a circular cross-section 230 with a diverging profile 234.

Figure 9I:
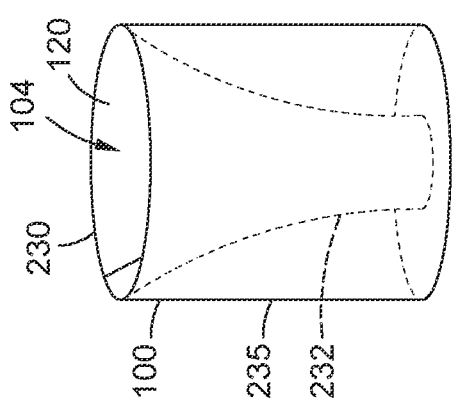
FIG. 9I is an illustration of a side perspective view of yet another version of a core cell having a nested flared cylinder shape.

FIG. 9I is an illustration of a side perspective view of yet another version of a core cell 100 having a shape 104, in the form of a nested flared cylinder shape 120, or funnel shape, nested in a cylinder 235. As shown in FIG. 9I, the core cell 100 with the nested flared cylinder shape 120 has a circular cross-section 230 with a converging profile 232.

Figure 9J:
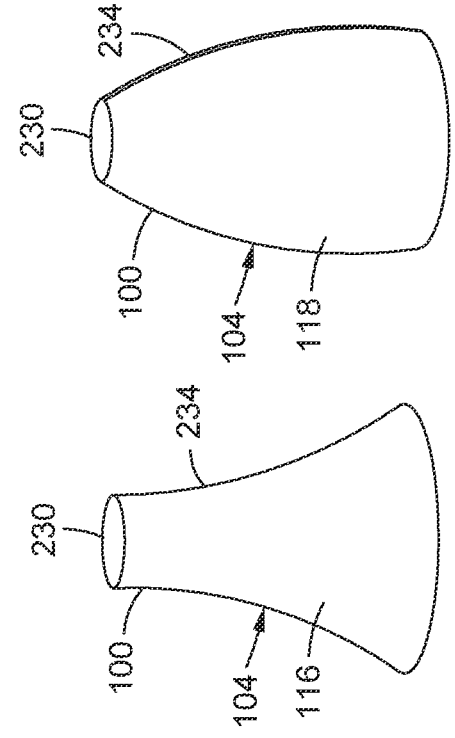
FIG. 9J is an illustration of a side perspective view of yet another version of a core cell having a nested tapered cylinder shape.

FIG. 9J is an illustration of a side perspective view of yet another version of a core cell 100 having a shape 104, in the form of a nested tapered cylinder shape 122, nested in a cylinder 235. As shown in FIG. 9I, the core cell 100 with the nested flared cylinder shape 122 has a circular cross-section 230 with a converging profile 232.

Now referring to FIG. 10A, FIG. 10A is an illustration of a schematic cross-section of a version of a portion 50b of the acoustic treatment assembly 50 of the acoustically treated landing gear door 12 (see FIGS. 5, 6A-6B) of the disclosure. FIG. 10A shows the acoustic facesheet 96, which may be in the form of the porous facesheet 152 (see FIG. 5) or the perforated facesheet 156 (see FIG. 5). FIG. 10A further shows the core structure 94 with the core cell 100 and a porous septum layer 136 dividing the core cell 100 into two core cell portions 101, including a first core cell portion 101a and a second core cell portion 101b. FIG. 10A further shows the nonporous backsheet 98. As shown in FIG. 10A, the acoustic facesheet 96 is coupled, or attached, to the first side 202a of the core cell 100 and atop the core cell 100, and the nonporous backsheet 98 is coupled, or attached, to the second side 202b of the core cell 100 and at the bottom of the core cell 100. The porous septum layer 136 (see FIG. 10A) is attached to the core cell walls 205 of the core cell 100. As shown in FIG. 10A, the core cell 100 has a rectangular cylinder shape 108.

Now referring to FIG. 10B, FIG. 10B is an illustration of a top view of an interior side 66 of a test model 210b of an acoustically treated landing gear door 12, such as an acoustically treated main landing gear (MLG) door 12a, used for testing, where the acoustic treatment assembly 50 has an acoustic facesheet 96 in the form of a porous facesheet 152. As shown in FIG. 10B, the acoustically treated landing gear door 12, such as the acoustically treated main landing gear (MLG) door 12a, comprises the landing gear door 44, such as a main landing gear (MLG) door 46, with the acoustic treatment assembly 50 installed in the interior cavity 92 (see FIG. 6A) and the volume 90 (see FIG. 6A) of the landing gear door 44.

As further shown in FIG. 10B, the acoustic facesheet 96, such as the porous facesheet 152, of the acoustic treatment assembly 50 is implemented on the inner mold line (IML) 68 of the landing gear door 44. The porous facesheet 152 is made of a porous material 154, as shown in FIG. 5, comprising one or more of, porous metal 154a, cast porous metal 154b, porous titanium 154c, sintered titanium 154d, porous aluminum 154e, sintered aluminum 154f, sintered aluminum powder with epoxy binder 154g, porous thermoplastic 154h, or another suitable porous material that enables the porous facesheet 152 to function as described herein.

As further shown in FIG. 10B, a plurality of attachment elements 236, such as tie rods 236a, are used to attach the acoustically treated landing gear door 12, such as the acoustically treated main landing gear door 12a, to the landing gear 24 (see FIG. 1), such as a main landing gear 26 (see FIG. 1). FIG. 10B further shows a drainage exit 76 of a drainage system 80 (see FIG. 5) located at a perimeter portion 78a of the perimeter 78. Although FIG. 10B shows one drainage exit 76, the drainage system 80 may have more than one drainage exit 76, as needed. FIG. 10B further shows a structural frame portion 212 of the landing gear door 44, surrounding, or edging, a periphery 214 of the acoustic treatment assembly 50.

Now referring to FIG. 10C, FIG. 10C is an illustration of an enlarged top perspective view of a portion 238 of the test model 210b of the acoustically treated landing gear door 12, such as the acoustically treated main landing gear (MLG) door 12a, of FIG. 10B. FIG. 10C shows the acoustically treated landing gear door 12, such as the acoustically treated main landing gear (MLG) door 12a, comprising the landing gear door 44, such as the main landing gear (MLG) door 46, with the acoustic treatment assembly 50 installed in the interior cavity 92 (see FIG. 6A) and the volume 90 (see FIG. 6A) of the landing gear door 44. FIG. 10C further shows the acoustic facesheet 96, such as the porous facesheet 152, of the acoustic treatment assembly 50, and shows an attachment element 236, such as a tie rod 236a, used to attach the acoustically treated landing gear door 12, such as the acoustically treated main landing gear door 12a, to the landing gear 24 (see FIG. 1), such as a main landing gear 26 (see FIG. 1).

Now referring to FIG. 11A, FIG. 11A is an illustration of a schematic top view of an exemplary version of a porous placard 240 comprising a placard 64, such as a servicing placard 64a, printed on an acoustic facesheet 96, such as a porous facesheet 152. As shown in FIG. 11A, the porous placard 240 has an exterior placard surface 170 displaying markings 172, such as words 172a, that are legible and readable, while maintaining the controlled porosity 148 (see FIG. 5), or desired porosity, of the acoustic facesheet 96, such as the porous facesheet 152. The porous placard 240 may be printed with a 3D (three-dimensional) printing process or another suitable printing or reproduction process, or may be formed using a suitable forming process.

Now referring to FIG. 11B, FIG. 11B is an illustration of a schematic side view of a laser drilled porous placard 176 that is formed using a laser drilling process 174 (see FIG. 5). As shown in FIG. 11B, the laser drilled porous placard 176 has a plurality of holes 242a formed through the exterior placard surface 170. The plurality of holes 242a each have a small diameter and a tight, uniform spacing between the holes 242a.

Now referring to FIG. 11C, FIG. 11C is an illustration of a schematic side view of a sintered porous placard 180 that is formed using a sintering process 178 (see FIG. 5). As shown in FIG. 11C, the sintered porous placard 180 has a plurality of holes 242b formed through the exterior placard surface 170. The plurality of holes 242b each have a small diameter and a random spacing, similar to a sponge, between the holes 242b.

Figure 12:
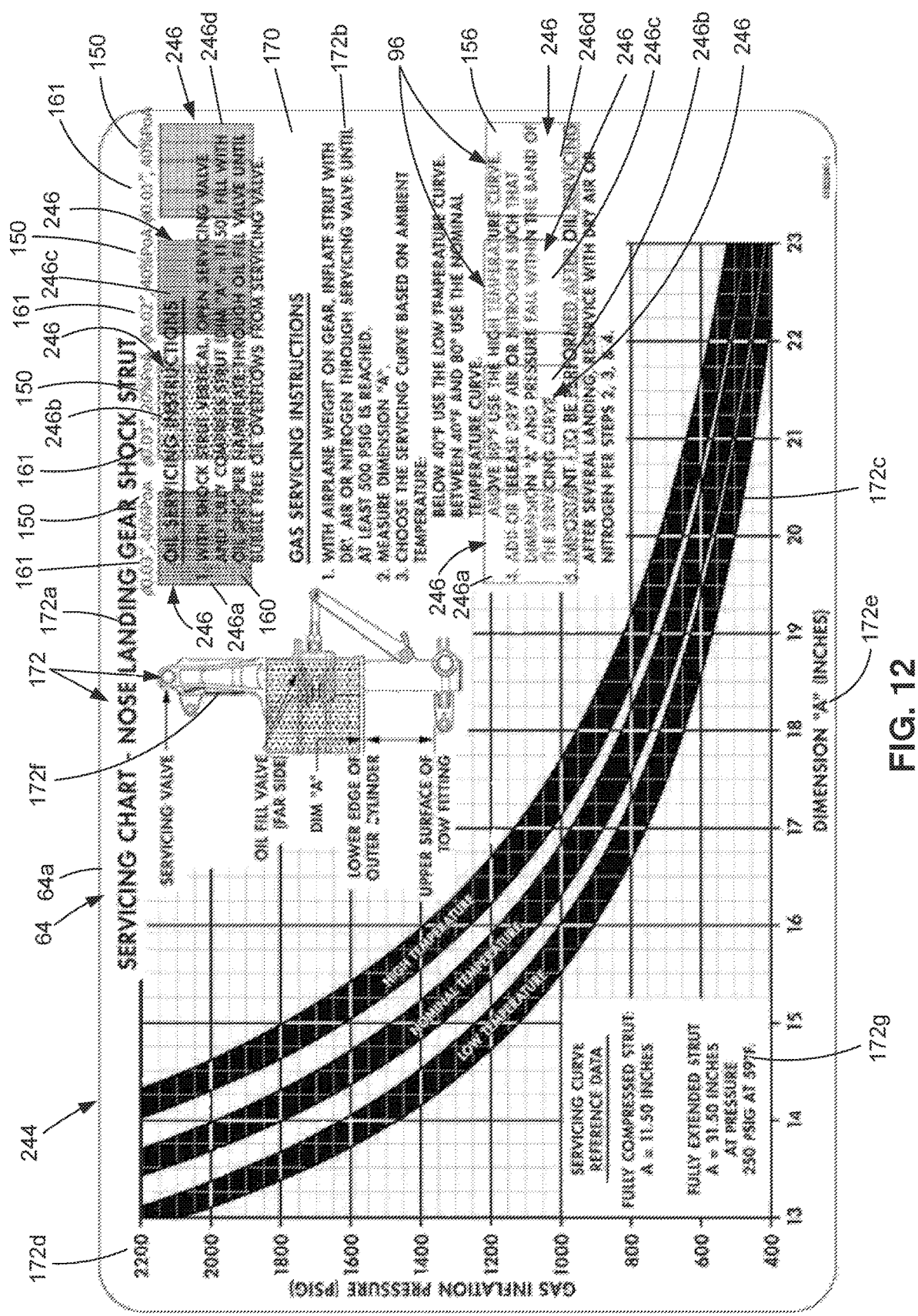
FIG. 12 is an illustration of a front view of an exemplary version of a perforated placard showing different perforation diameters and percent open areas.

Now referring to FIG. 12, FIG. 12 is an illustration of a front view of an exemplary version of a perforated placard 244 comprising a placard 64, such as a servicing placard 64a, formed on an acoustic facesheet 96, such as a perforated facesheet 156, and showing perforated portions 246 with perforations 160 of different perforation diameters 161 (see also FIG. 7B) and percent open areas (POAs) 150. As shown in FIG. 12, perforated placard 244 comprising the placard 64, such as the servicing placard 64a, includes markings 172, such as words 172a, text 172b, graphics 172c, numbers 172d, letters 172e, drawings 172f, and symbols 172g, on the exterior placard surface 170.

As further shown in FIG. 12, the perforated placard 244 shows first perforated portions 246a having a perforation diameter 161 of 0.03" (inch) and a percent open area (POA) 150 of 40%, shows second perforated portions 246b having a perforation diameter 161 of 0.03" (inch) and a percent open area (POA) 150 of 20%, shows third perforated portions 246c having a perforation diameter 161 of 0.02" (inch) and a percent open area (POA) 150 of 40%, and shows fourth perforated portions 246d having a perforation diameter 161 of 0.01" (inch) and a percent open area (POA) 150 of 40%. The different perforation diameters 161 and the percent open areas (POAs) 150 of the plurality of perforations 160, or holes, and the spacing between the plurality of perforations 160, or holes, impact the clarity, legibility, and readability of the perforated placard 244 comprising the placard 64, such as the servicing placard 64a.

As shown in FIG. 12, the fourth perforated portions 246d have a greater clarity, legibility, and readability than the third perforated portions 246c, and the third perforated portions 246c have a greater clarity, legibility, and readability than the second perforated portions 246b, and the second perforated portions 246b have a greater clarity, legibility, and readability than the first perforated portions 246a. Thus, as shown in FIG. 12, the fourth perforated portions 246d have a most preferred clarity, legibility, and readability, as compared to the third perforated portions 246c, the second perforated portions 246b, and the first perforated portions 246a, and the first perforated portions 246a have a least preferred clarity, legibility, and readability, as compared to the fourth perforated portions 246d, the third perforated portions 246c, and the second perforated portions 246b.

The plurality of perforations 160 of the perforated facesheet 156 are preferably each of a size having the perforation diameter 161 that is sufficiently small, so that the markings 172 on the perforated placard 244, comprising the placard 64, such as the servicing placard 64a, are legible and readable, and the number of the plurality of perforations 160 is sufficiently large so that the controlled porosity 148 (see FIG. 5), such as the desired porosity, is maintained. The perforation diameter 161 of each of the plurality of perforations 160 and the spacing between each of the plurality of perforations 160 are optimized to maximize the clarity, legibility, and readability of the markings 172 on the perforated placard 244, comprising the placard 64, such as the servicing placard 64a.

Figure 13:
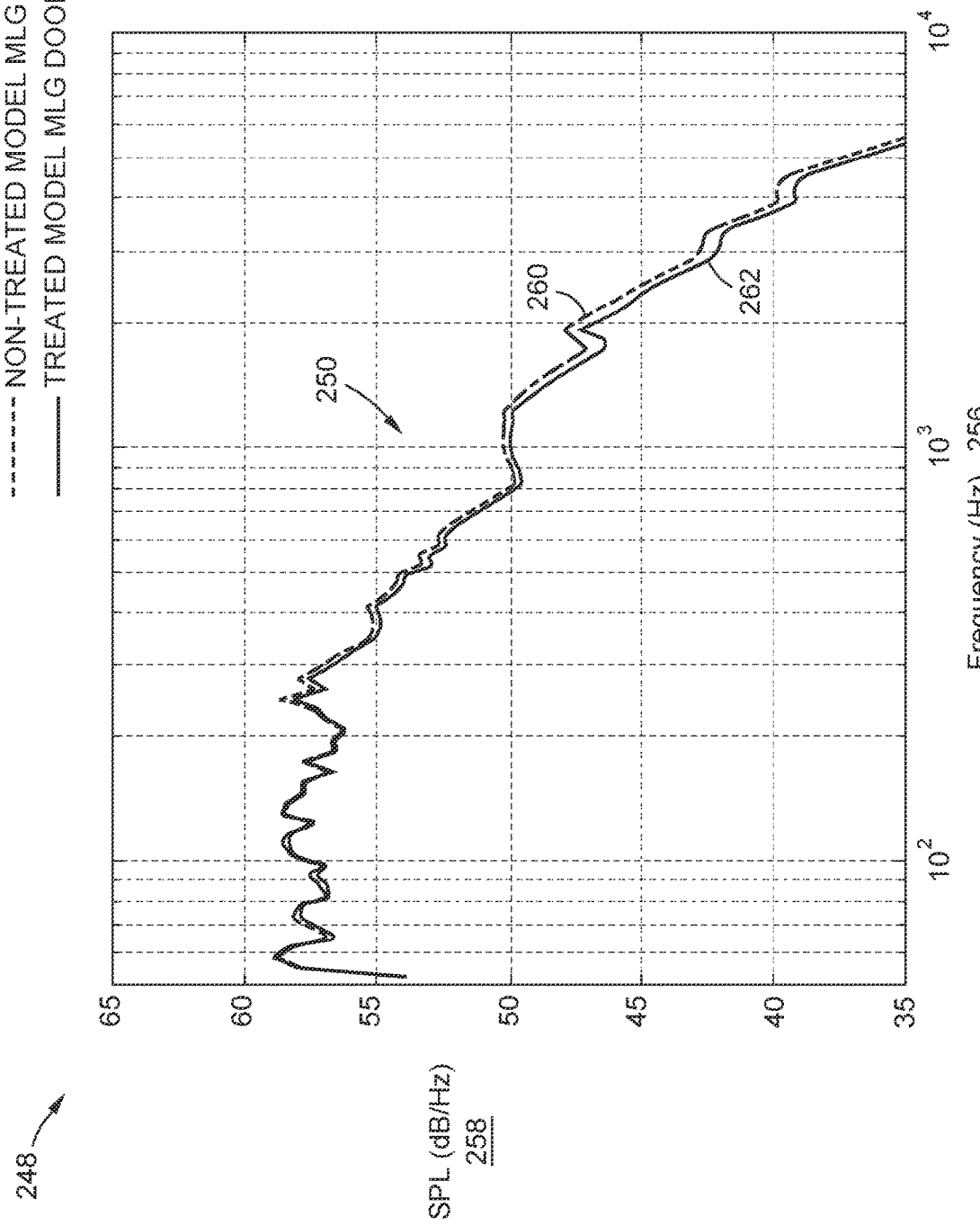
FIG. 13 is an illustration of a graph of a sound pressure level spectra comparing a non-treated model main landing gear door and an acoustically treated model main landing gear door.

Now referring to FIG. 13, FIG. 13 is an illustration of a graph 248 of a full-scale $1/12^{th}$ octave sound pressure level (SPL) spectra 250 comparing a non-treated model main landing gear (MLG) door 252 and an acoustically treated model main landing gear (MLG) door 254, in a fly-over condition in a model scaled wind tunnel. The acoustically treated model main landing gear (MLG) door 254 comprised an acoustic treatment assembly 50 integrated in a test model 210b (see FIG. 10B) of a landing gear door 44 (see FIG. 10B), such as a main landing gear (MLG) door 46 (see FIG. 10B). The acoustic treatment assembly 50 (see FIGS. 6B, 10B) comprised an acoustic facesheet 96 (see FIG. 10B), such as in the form of a porous facesheet 152 (FIG. 10B), and comprised a nonporous backsheet 98 (see FIG. 6B) coupled, or attached, to a portion 92a (see FIG. 6B) of the interior cavity 92 (see FIG. 6B) in the volume 90 (see FIG. 6B) of the interior side 66 (see FIG. 6B) of the landing gear door 44 (see FIG. 6B). The acoustic treatment assembly 50 further comprised a core structure 94 (see FIG. 6B) attached to, and sandwiched between, the acoustic facesheet 96, such as the porous facesheet 152, which was atop the core structure 94, and the nonporous backsheet 98, which was attached to the bottom of the core structure 94. The core structure 94 included a plurality of core cells 100 (see FIG. 6B), and two porous septum layers 136 (see FIG. 6B) coupled to the plurality of core cells 100. The non-treated model main landing gear (MLG) door 252 did not include any acoustic treatment assembly 50 and was not acoustically treated in any way.

As shown in FIG. 13, the graph 248 shows a frequency 256 in Hertz (Hz), along the x-axis, and shows a SPL (sound pressure level) 258 in dB/Hz (decibel/Hertz), along the y-axis. FIG. 13 further shows a first plot line 260 of the full-scale $1/12^{th}$ octave sound pressure level (SPL) spectra 250 measured for the non-treated model main landing gear (MLG) door 252. FIG. 13 further shows a second plot line 262 of the full-scale $1/12^{th}$ octave sound pressure level (SPL) spectra 250 measured for the acoustically treated model main landing gear (MLG) door 254.

The full-scale $1/12^{th}$ octave sound pressure level (SPL) spectra 250 was measured in the fly-over condition in the model scaled wind tunnel for the non-treated model main landing gear door 252 and for the acoustically treated model main landing gear door 254, at a polar angle 264 (see FIG. 14) comprising a first polar angle 264a of $\theta_{geo}=88.1°$ in degrees. The polar angle 264 ($\theta_{geo}$) is the angle measured between the direction of travel of a full-scale aircraft and an observer located directly beneath and centered between the first main landing gear 26a (see FIG. 1) and the second main landing gear 26b (see FIG. 1), both in the deployed position 34 (see FIG. 1).

As shown in FIG. 13, the acoustic treatment assembly 50 integrated on the landing gear door 44 of the acoustically treated model main landing gear (MLG) door 254 started to be effective beyond the frequency 256 of 1000 Hz (one thousand Hertz) and reduced the SPL (sound pressure level) 258 as much as 0.8 dB (decibel) without negative impact in any frequency range. This reduction in sound 84 (see FIG. 5), such as noise 86 (see FIG. 5) even occurred without optimization of the acoustic facesheet 96, such as the porous facesheet 152, and without optimization of the depth of the interior cavity 92 (see FIG. 6B) of the landing gear door 44 (see FIG. 6B).

Figure 14:
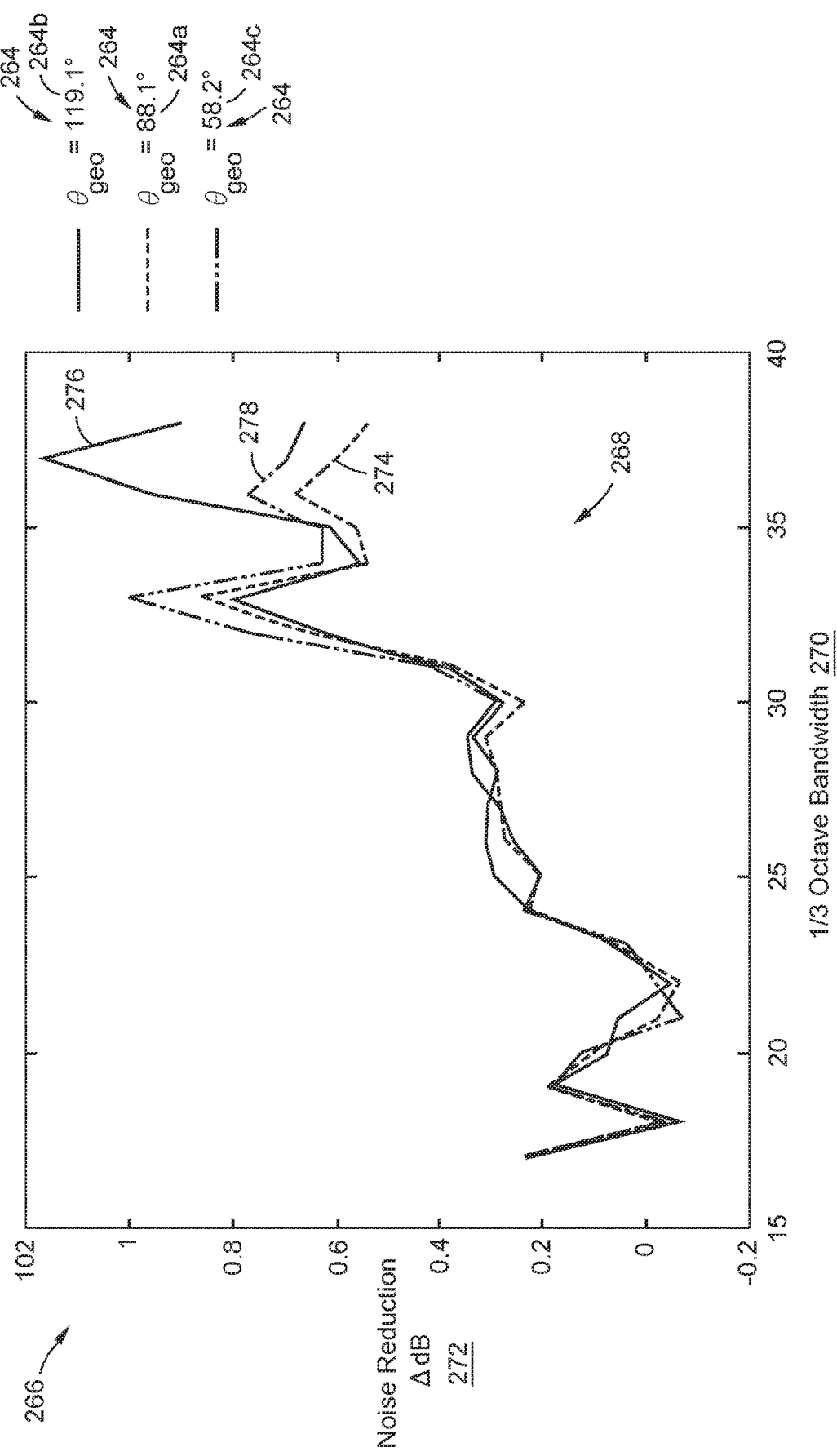
FIG. 14 is an illustration of a graph of a ⅓ octave sound pressure level differential between a non-treated model main landing gear door and an acoustically treated model main landing gear door at different polar angles.

Now referring to FIG. 14, FIG. 14 is an illustration of a graph 266 of a $1/3^{rd}$ octave sound pressure level (SPL) differential 268 between the non-treated model main landing gear (MLG) door 252 (see FIG. 13) and the acoustically treated model main landing gear (MLG) door 254 (see FIG. 13), in the fly-over condition in the model scaled wind tunnel, measured at three different polar angles 264.

As shown in FIG. 14, the graph 266 shows a $1/3^{rd}$ octave bandwidth 270, along the x-axis, and shows a noise reduction differential (Δ) 272 in dB (decibel), along the y-axis. FIG. 14 further shows three polar angles 264 in degrees, including the first polar angle 264a of $\theta_{geo}=88.1°$, a second polar angle 264b of $\theta_{geo}=119.1°$, and a third polar angle 264c of 58.2°. FIG. 14 further shows a first plot line 274 of the $1/3^{rd}$ octave sound pressure level (SPL) differential 268 between the non-treated model main landing gear (MLG) door 252 (see FIG. 13) and the acoustically treated model main landing gear (MLG) door 254 (see FIG. 13), measured at the first polar angle 264a of $\theta_{geo}=88.1°$. FIG. 14 further shows a second plot line 276 of the $1/3^{rd}$ octave sound pressure level (SPL) differential 268 between the non-treated model main landing gear (MLG) door 252 (see FIG. 13) and the acoustically treated model main landing gear (MLG) door 254 (see FIG. 13), measured at the second polar angle 264b of $\theta_{geo}=119.1°$. FIG. 14 further shows a third plot line 278 of the $1/3^{rd}$ octave sound pressure level (SPL) differential 268 between the non-treated model main landing gear (MLG) door 252 (see FIG. 13) and the acoustically treated model main landing gear (MLG) door 254 (see FIG. 13), measured at the third polar angle 264c of $\theta_{geo}=58.2°$.

The first plot line 274, the second plot line 276, and the third plot line 278 showed that plotting the 1/3$^{rd}$ octave sound pressure level (SPL) differential 268 between the non-treated model main landing gear (MLG) door 252 (see FIG. 13) and the acoustically treated model main landing gear (MLG) door 254 (see FIG. 13) clarified the noise benefit at high frequencies and indicated relatively small directivity. This noise benefit at high frequencies even occurred without optimization of the acoustic facesheet 96, such as the porous facesheet 152, and without optimization of the depth of the interior cavity 92 (see FIG. 6B) of the landing gear door 44 (see FIG. 6B).

Figure 15:
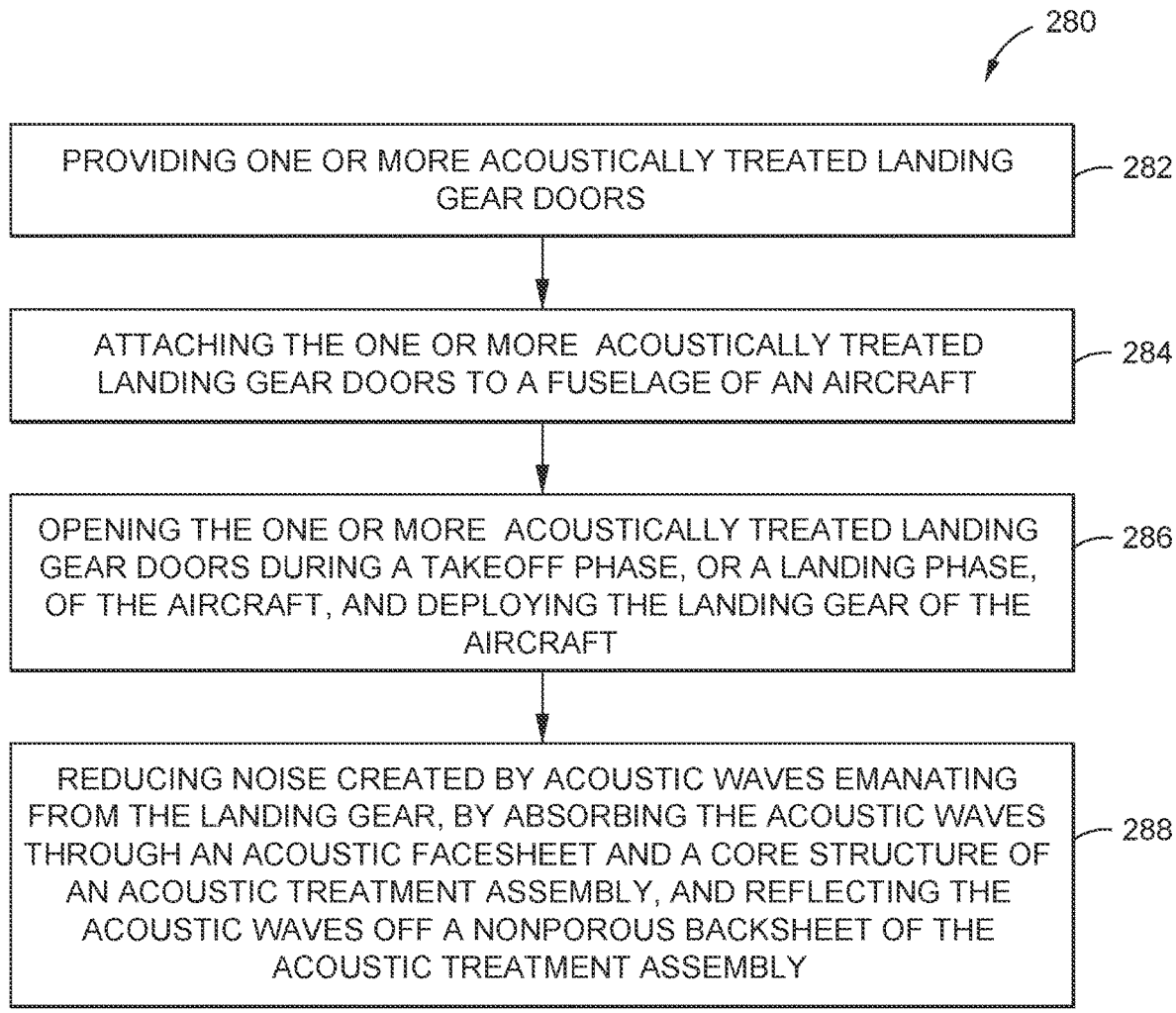
FIG. 15 is an illustration of a flow diagram showing a version of a method of the disclosure.

Now referring to FIG. 15, in another version there is provided a method 280 for reducing sound 84 (see FIGS. 4, 5), such as noise 86 (see FIGS. 4, 5) emanating from, or generated by, a landing gear 24 (see FIGS. 4, 5) of an aircraft 10 (see FIGS. 4, 5), such as a jet aircraft 10a (see FIGS. 4, 5). FIG. 15 is an illustration of a flow diagram showing a version of the method 280 of the disclosure.

The blocks in FIG. 15 represent operations and/or portions thereof, or elements, and lines connecting the various blocks do not imply any particular order or dependency of the operations or portions thereof, or elements. FIG. 15 and the disclosure of the steps of the method 280 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 15, the method 280 comprises the step of providing 282 one or more acoustically treated landing gear doors 12 (see FIGS. 5, 6A-6B). As discussed in detail above, each acoustically treated landing gear door 12 comprises the landing gear door 44 (see FIGS. 5, 6A-6B) having the acoustic treatment assembly 50 (see FIGS. 5, 6A-6B) integrated on the inner mold line (IML) 68 (see FIGS. 3B, 5) of the interior side 66 (see FIGS. 3B, 5) of the landing gear door 44, and extending within the interior cavity 92 (see FIGS. 3B, 5) and within the volume 90 (see FIGS. 3B, 5) of the landing gear door 44.

As discussed in detail above, the acoustic treatment assembly 50 comprises the core structure 94 (see FIGS. 5, 6A-6B). The core structure 94 comprises the first side 202a (see FIG. 6A) and the second side 202b (see FIG. 6A), and the plurality of core cells 100 (see FIGS. 5, 6A-6B) extending between the first side 202a and the second side 202b. Each of the plurality of core cells 100 has a shape 104, as shown in FIG. 5, comprising one of, a hexagonal cylinder shape 106, a rectangular cylinder shape 108, a cylinder shape 110, a flared cylinder shape 112, a tapered cylinder shape 114, a truncated cone cylinder shape 116, a bell cylinder shape 118, a nested flared cylinder shape 120, a nested tapered cylinder shape 122, or another suitable shape.

The core structure 94 further comprises the drainage system 80 (see FIG. 5) having the plurality of drainage paths 132 (see FIGS. 5, 8A) interconnected between the plurality of core cells 100. The plurality of drainage paths 132 are coupled to one or more drainage exits 76 (see FIGS. 5, 7A) located at or near one or more perimeter portions 78a (see FIG. 7A) of the perimeter 78 (see FIG. 7A) of the landing gear door 44 (see FIG. 7A). The plurality of drainage paths 132 are optimized to minimize a drainage time 134 (see FIG. 5), while keeping the shape of the landing gear door 44 structurally durable. In particular, the shape, size, and location of each drainage path 132 from one core cell 100 to a neighboring core cell 100 are preferably optimized to allow the fastest flow rate to the one or more drainage exits 76. The plurality of drainage paths 132 within the core structure 94 of the landing gear door 44 allows fluid 130 (see FIG. 5), fluid build-up 130a (see FIG. 5), liquid, water, condensation, and/or moisture to quickly and efficiently drain out of, or exit from, the one or more drainage exits 76 located at or near the one or more perimeter portions 78a of the perimeter 78 of the landing gear door 44, when the landing gear 24 is deployed immediately before and during the takeoff phase 14 (see FIGS. 1, 5) and the landing phase 15 (see FIG. 5) of the aircraft 10. The drainage system 80 interconnects the plurality of core cells 100 together and allow fluid communication between the plurality of core cells 100 and the plurality of drainage paths 132 and the one or more drainage exits 76, such that fluid build-up 130a (see FIG. 5) of fluid 130 (see FIG. 5), liquid, water, condensation, and/or moisture within the plurality of core cells 100 is drained to the exterior of the landing gear door 44.

The acoustic treatment assembly 50 further comprises the acoustic facesheet 96 (see FIGS. 5, 6A-6B) coupled atop the first side 202a of the core structure 94. In one version, the acoustic facesheet 96 comprises the porous facesheet 152 (see FIGS. 5, 10B) made of a porous material 154. As discussed above, the porous material 154, as shown in FIG. 5, may comprise one of, porous metal 154a, cast porous metal 154b, porous titanium 154c, sintered titanium 154d, porous aluminum 154e, sintered aluminum 154f, sintered aluminum powder with epoxy binder 154g, porous thermoplastic 154h, or another suitable porous material. In another version, the acoustic facesheet 96 comprises the perforated facesheet 156 (see FIGS. 5, 7B) having the plurality of perforations 160 with a perforation shape 164. The perforation shape 164, as shown in FIG. 5, may comprise one of, a circle shape 164a, a slot shape 164b, an oval shape 164c, a square shape 164d, a rectangle shape 164e, a polygon shape 164f, or another suitable shape.

The acoustic facesheet 96, such as the porous facesheet 152, or the perforated facesheet 156, may be formed by any suitable technique, such as, for example and without limitation, a laser drilling process 174 (see FIG. 5), a sintering process 178 (see FIG. 5), a mechanical drilling process, or any other necessary or appropriate means.

The step of providing 282 the one or more acoustically treated landing gear doors 12 may further comprise, forming the acoustic facesheet 96 having a controlled porosity 148 (see FIG. 5), or desired porosity, to allow fluid communication between an external environment 74 (see FIGS. 1, 5) and the plurality of core cells 100, wherein the controlled porosity 148, or desired porosity, is in a range of from 4 percent open area (POA) 150 (see FIG. 5) to 25 percent open area (POA) 150. The porosity, or plurality of perforations 160, allow the acoustic waves 82 (see FIG. 5), or sound waves 82a (see FIG. 5), to pass through the acoustic facesheet 96 and through the core structure 94, and to be reflected off of the nonporous backsheet 98 in order to attenuate acoustic waves 82, or sound waves 82a, that are incoming.

The acoustic facesheet 96 preferably has a percent open area (POA) 150 (see FIG. 5) that is controlled and enables an air flow 102 (see FIG. 5) that is controlled into the core structure 94. For example, the acoustic facesheet 96 may be designed or configured such that only acoustic waves 82, or sound waves 82a, of certain frequencies and wavelengths enter the core structure 94.

The step of providing 282 the one or more acoustically treated landing gear doors 12 further comprises, printing, reproducing, or forming a placard 64 (see FIGS. 3B, 5, 11A), such as a servicing placard 64*a* (see FIGS. 3B, 5, 11A), on a portion 50*a* (see FIG. 3B) of the acoustic treatment assembly 50, such as a portion 96*a* (see FIG. 3B) of the acoustic facesheet 96 (see FIG. 3B) using one of, a laser drilling process 174 (see FIG. 5), a sintering process 178 (see FIG. 5), or another suitable process. The placard 64 has the exterior placard surface 170 (see FIGS. 11A, 12) displaying markings 172 (see FIGS. 11A, 12) that are legible, while maintaining the controlled porosity 148, or desired porosity. The markings 172 on the placard 64, such as the servicing placard 64*a*, may comprise words 172*a* (see FIGS. 11A, 12), text 172*b* (see FIG. 12), graphics 172*c* (see FIG. 12), numbers 172*d* (see FIG. 12), letters 172*e* (see FIG. 12), drawings 172*f* (see FIG. 12), symbols 172*g* (see FIG. 12), and other suitable information that is legible and readable to an operator, a service person, ground handling personnel, or another suitable user reading the placard 64, such as the servicing placard 64*a*, on the landing gear door 44 of the aircraft 10.

In one exemplary version, as discussed above, the placard 64, such as the servicing placard 64*a*, comprises the porous placard 240 (see FIG. 11B), such as the laser drilled porous placard 176 (see FIGS. 5, 11B) formed with the laser drilling process 174. The laser drilling process 174 punches or forms a plurality of holes 242*a* (see FIG. 11B) each having a small diameter and having tight spacing and a uniform pattern through the placard 64, such as the servicing placard 64*a*. In another exemplary version, the placard 64, such as the servicing placard 64*a*, comprises the porous placard 240 (see FIG. 11C), such as the sintered porous placard 180 (see FIGS. 5, 11C) formed with the sintering process 178 (see FIG. 5). The sintering process 178 forms a plurality of holes 242*b* (see FIG. 11C) each having a small diameter and having random spacing and a random pattern, similar to a sponge, through the placard 64, such as the servicing placard 64*a*. The placard 64, such as the servicing placard 64*a*, is printed on the porous facesheet 152 and the exterior placard surface 170 is part of the porous facesheet 152, and in turn, part of the acoustically treated landing gear door 12. In another exemplary version, the placard 64, such as the servicing placard 64*a*, comprises the perforated placard 244 (see FIG. 12).

The acoustic treatment assembly 50, as discussed above, further comprises the nonporous backsheet 98 (see FIGS. 5, 6A-6B) directly coupled between the second side 202*b* (see FIGS. 6A-6B) of the core structure 94 and a portion 92*a* (see FIG. 6A) of the interior cavity 92 (see FIG. 6A) and the volume 90 (see FIG. 6A) of the landing gear door 44. The nonporous backsheet 98 is attached to and covers the second side 202*b* of the core structure 94. The nonporous backsheet 98, which is impermeable to air flow 102 and impervious to fluid 130, enables the reflection of the acoustic waves 82, or sound waves 82*a*. The coupling of the acoustic facesheet 96 and the nonporous backsheet 98 to the core structure 94 creates a controlled resonator-type effect, which is capable of attenuating sound 84 (see FIG. 5), such as noise 86 (see FIG. 5), at a number of selected frequency ranges.

The step of providing 282 the one or more acoustically treated landing gear doors 12 further comprises, coupling one or more porous septum layers 136 (see FIGS. 5, 6B) or porous septum segments 136*a* (see FIG. 8A), to one or more of the plurality of core cells 100 between the first side 202*a* and the second side 202*b* of the core structure 94, wherein each of the one or more porous septum layers 136, or porous septum segments 136*a*, divides each of the one or more plurality of core cells 100 into at least two core cell portions 101 (see FIGS. 6B, 8A).

Each of the one or more porous septum layers 136, or porous septum segments 136*a*, may be generally planar in shape, or another suitable shape, and each extends substantially parallel to the nonporous backsheet 98 and each extends substantially parallel to the acoustic facesheet 96. If there are two or more porous septum layers 136, or porous septum segments 136*a*, for example, an offset 138 (see FIGS. 5, 8A) between each of two adjacent porous septum layers 136, or porous septum segments 136*a*, is optimized to maximize acoustic dampening or absorption. In addition, a flow resistance 140 (see FIG. 5) of the one or more porous septum layers 136, or porous septum segments 136*a*, is optimized.

Each porous septum layer 136, or porous septum segment 136*a*, is made of a material comprising one or more of, a metal wire mesh material, a composite mesh material, including a thermoplastic mesh material, for example, a thermoplastic such as polyether ether ketone (PEEK), polyetherketoneketone (PEKK), or another suitable thermoplastic, a ceramic mesh material, a composite woven fabric, or another suitable material. The type of material the porous septum layers 136, or porous septum segments 136*a*, is made of is optimized to maximize the acoustic dampening or absorption. Preferably, each porous septum layer 136, or porous septum segment 136*a*, is porous and includes a plurality of pores 142 (see FIG. 5), or holes, formed through the porous septum layer 136. Each porous septum layer 136, or porous septum segment 136*a*, has a desired pore size that allows air flow 102 to flow through each porous septum layer 136 or porous septum segment 136*a* and through the plurality of core cells 100 of the core structure 94. The plurality of pores 142, or holes, may be formed in each porous septum layer 136, or porous septum segment 136*a*, by any suitable technique, such as, for example and without limitation, a drilling process, or another suitable process. The plurality of pores 142, or holes, also allow the acoustic waves 82, or sound waves 82*a*, to pass through each porous septum layer 136, or porous septum segment 136*a*, and to be reflected off of the nonporous backsheet 98 in order to attenuate the acoustic waves 82, or sound waves 82*a*. Each porous septum layer 136 or porous septum segment 136*a* is preferably transparent, or substantially transparent, to acoustic waves 82, or sound waves 82*a*.

The step of providing 282 the one or more acoustically treated landing gear doors 12 further comprises, forming the core structure 94 with the one or more porous septum layers 136 or one or more porous septum segments 136*a*, in one of, a sandwich structure 144 (see FIGS. 5, 6B), a monolithic structure 146 (see FIGS. 5, 8A), or another suitable structure. In one version, the core structure 94 with the one or more porous septum layers 136 is formed as the sandwich structure 144 (see FIGS. 5, 6B) with the plurality of layers 190 (see FIG. 6B). In another version, the core structure 94 is formed as the monolithic structure 146 (see FIGS. 5, 8A), or single structure or unitary structure, where each core cell 100 of the core structure 94 has the one or more porous septum segments 136*a* (see FIG. 8A) of the one or more porous septum layers 136 positioned, and attached in place, such as with an adhesive 182 (see FIG. 8A), for example, glue, or another suitable bonding or attachment means, at a predetermined partial height 124*a* (see FIG. 8A) within the core cell 100. To form a septumized core structure 94*a* (see FIG. 8A), one or more porous septum segments 136*a* may be inserted, positioned, and secured individually within each core cell 100, or one or more porous septum layers 136 may be attached to the plurality of core cells 100.

The geometry of the acoustic treatment assembly 50, including the acoustic facesheet 96, the core structure 94, the nonporous backsheet 98, and the optional one or more porous septum layers 136 is designed to provide an acoustic resistance 186 (see FIG. 5) of 1 rho*c to 2 rho*c over a wide range of frequencies, such that the acoustic reactance 188 (see FIG. 5) is within 0.0+/−0.5 rho*c. The optional one or more porous septum layers 136 may be used to increase the frequency range of noise attenuation performance.

As shown in FIG. 15, the method 280 further comprises the step of attaching 284 the one or more acoustically treated landing gear doors 12 to a fuselage 16 of the aircraft 10. As shown in FIG. 15, the method 280 further comprises the step of opening 286 the one or more acoustically treated landing gear doors 12 during the takeoff phase 14 (see FIG. 5), or the landing phase 15 (see FIG. 5), of the aircraft 10, and deploying the landing gear 24 of the aircraft 10. After the step of opening 286 the one or more acoustically treated landing gear doors 12 immediately before, and/or during the takeoff phase 14, or the landing phase 15, the method 290 may further comprise the step of evacuating from the core structure 94, any fluid build-up 130a of fluid 130 in the plurality of core cells 100, using the drainage system 80, and minimizing a drainage time 134 (see FIG. 5) of evacuating the fluid 130.

As shown in FIG. 15, the method 280 further comprises the step of reducing 288 the sound 84 (see FIG. 5), such as noise 86 (see FIG. 5), created by acoustic waves 82 (see FIG. 5), or sound waves 82a (see FIG. 5), emanating from the landing gear 24, by absorbing the acoustic waves 82, or sound waves 82a, through the acoustic facesheet 96 and the core structure 94 of the acoustic treatment assembly 50, and reflecting the acoustic waves 82, or sound waves 82a, off the nonporous backsheet 98 of the acoustic treatment assembly 50. The sound 84, such as noise 86, emanating from, or generated by, the landing gear 24 gets directly absorbed through the core structure 94 and the one or more porous septum layers 136, or one or more porous septum segments 136a, as the acoustic waves 82, or sound waves 82a, communicate with the structure of the landing gear door 44 through the acoustic facesheet 96. The acoustically treated landing gear door 12 reduces, or attenuates, the sound 84, such as noise 86, from the landing gear 24 of the aircraft 10, when the landing gear 24 is in the deployed position 34 (see FIGS. 1, 5), by attenuating acoustic waves 82, or sound waves 82a, emanating from the landing gear 24 and reflected off the acoustic treatment assembly 50 of the acoustically treated landing gear door 12.

Figure 16:
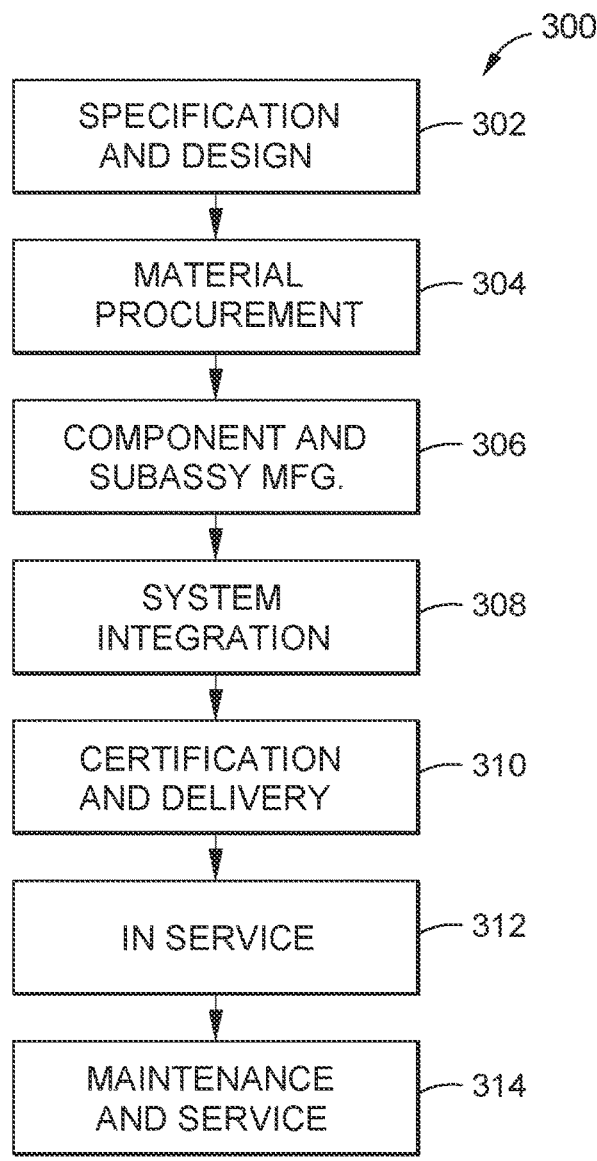
FIG. 16 is an illustration of a flow diagram of an aircraft manufacturing and service method.
Figure 17:
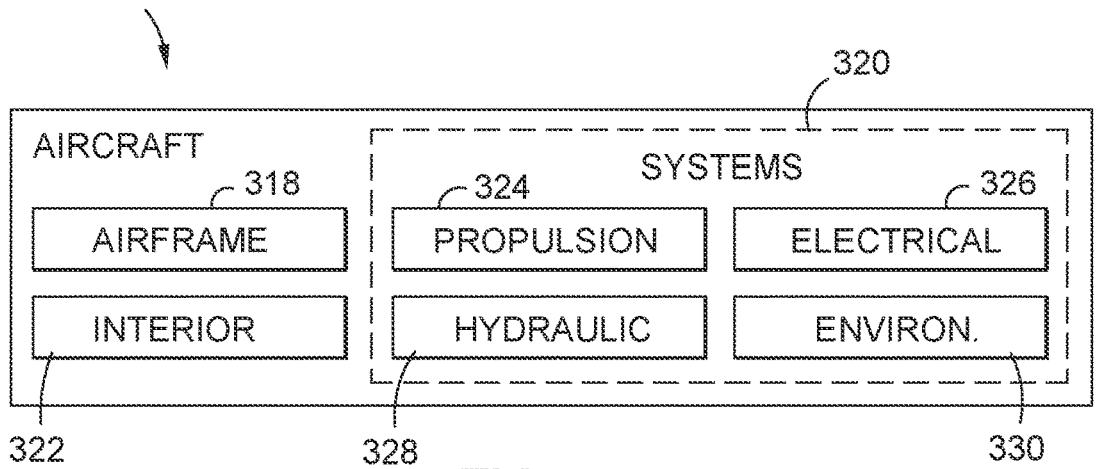
FIG. 17 is an illustration of a block diagram of an aircraft.

Now referring to FIGS. 16 and 17, FIG. 16 is an illustration of a flow diagram of an aircraft manufacturing and service method 300, and FIG. 17 is an illustration of a block diagram of an aircraft 316. Referring to FIGS. 16 and 17, versions of the disclosure may be described in the context of the aircraft manufacturing and service method 300 as shown in FIG. 16, and the aircraft 316 as shown in FIG. 17.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 17, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the acoustically treated landing gear door 12 (see FIGS. 1-7A) and the method 280 (see FIG. 15) provide for an acoustic treatment assembly 50 (see FIGS. 5, 6A-6B), or acoustic liner, integrated on the inner mold line (IML) 68 (see FIGS. 2, 3B, 6) and in an interior cavity 92 (see FIGS. 5, 6A-6B) of the landing gear door 44 (see FIGS. 1, 5, 6A-6B), such as the main landing gear (MLG) door 46 (see FIGS. 1, 5), and/or the nose landing gear (NLG) door 28 (see FIGS. 1, 6), of an aircraft 10 (see FIGS. 1, 5), such as a jet aircraft 10a (see FIGS. 1, 5), to reduce sound 84 (see FIGS. 4, 5), such as noise 86 (see FIGS. 4, 5), for example, drag noise, emanating from, or generated by, the landing gear 24 (see FIGS. 1, 5), to the external environment 74 (see FIGS. 1, 4, 5) and the community 88 (see FIGS. 4, 5), to obtain attenuated sound 84a (see FIGS. 4, 5), such as attenuated noise 86a (see FIGS. 4, 5). The acoustically treated landing gear door 12 (see FIGS. 1-7A) suppresses acoustic waves 82 (see FIGS. 4, 5), or sound waves 82a (see FIGS. 4, 5) emanating from, or generated by, the landing gear 24 (see FIGS. 1, 5), such as the main landing gear (MLG) 26 (see FIGS. 1, 5) and/or the nose landing gear (NLG) 28 (see FIGS. 1, 5), when they are absorbed by the core structure 94 (see FIGS. 5, 6A-6B) of the acoustic treatment assembly 50 and reflected off the nonporous backsheet 98 (see FIGS. 5, 6A-6B) of the acoustic treatment assembly 50, before being radiated to the community 88 immediately before, and during, the takeoff phase 14 (see FIGS. 1, 5) and the landing phase 15 (see FIG. 5) of the aircraft 10. The one or more acoustically treated landing gear doors 12 (see FIGS. 1-7A) installed on the aircraft 10 assists in making the aircraft 10 meet the noise certification standards for individual civil aircraft required by the Federal Aviation Administration (FAA).

In addition, disclosed versions of the acoustically treated landing gear door 12 (see FIGS. 1-7A) and the method 280 (see FIG. 15) provide an acoustic treatment assembly 50 (see FIGS. 5, 6A-6B) that may be integrated on landing gear doors 44 having a flat configuration 56 (see FIG. 5), a curved configuration 58 (see FIG. 5), or another suitable configuration. The acoustic treatment assembly 50 is not attached onto an outer surface of the landing gear door 44 but is integrated within the interior cavity 92 and within the volume 90 of the landing gear door 44. Thus, the acoustic treatment assembly 50 does not increase the thickness of the landing gear door 44.

Further, the acoustic treatment assembly 50 comprises the acoustic facesheet 96, such as the porous facesheet 152 (see FIGS. 5, 6A-6B, 10B) or the perforated facesheet 156 (see FIGS. 5, 7B), comprises the nonporous backsheet 98 (see FIGS. 5, 6A-6B), and comprises the core structure 94 sandwiched between the acoustic facesheet 96 and the nonporous backsheet 98, where the core structure 94 includes the drainage system 80 (see FIG. 5) having the plurality of drainage paths 132 (see FIGS. 5, 6A-6B, 7D), and may optionally include one or more porous septum layers 136 (see FIGS. 5, 6B), and/or porous septum segments 136a (see FIGS. 8A-8B). The core structure 94 having the plurality of core cells 100 (see FIGS. 6A-6B) with shapes 104 (see FIG. 5) of different geometric configurations and having the optional one or more porous septum layers 136 (see FIGS. 5, 6B), and/or porous septum segments 136a (see FIGS. 8A-8B), dampen or absorb the acoustic waves 82 (see FIGS. 4, 5), or sound waves 82a (see FIGS. 4, 5), through communication with the air flow 102 (see FIG. 5) inside the core structure 94 and across the acoustic facesheet 96 that is atop the core structure 94. The offset 138 (see FIG. 6B) between the one or more porous septum layers 136 (see FIGS. 5, 6B), and/or porous septum segments 136a (see FIGS. 8A-8B), is optimized to maximize the acoustic dampening. The acoustic treatment assembly 50 attenuates the sound 84, such as the noise 86, from the region of the landing gear 24, such as the main landing gear 26 or the nose landing gear 28, by absorbing the acoustic energy on the surface of the acoustic treatment assembly 50 of the acoustically treated landing gear doors 12.

The drainage system 80, with the plurality of drainage paths 132 or interconnects, the one or more passages 225 (see FIG. 8A), the one or more drainage channels 220 (see FIG. 7C), and the one or more drainage exits 76 (see FIGS. 3B, 7D), is optimally designed to allow fluid 130 (see FIG. 5), fluid build-up 130a (see FIG. 5), liquid, water, condensation, and/or moisture to quickly and efficiently drain out of, or exit from, the landing gear door 44, when the landing gear 24 is in the deployed position 34 (see FIG. 1) and the landing gear door 44 is in the open position 52 (see FIG. 1), immediately before, and during, the takeoff phase 14 and/or the landing phase 15 of the aircraft 10. The drainage system 80, including the plurality of drainage paths 132, the one or more passages 225, the one or more drainage channels 220, and the one or more drainage exits 76, is optimized to minimize the drainage time 134 (see FIG. 5), while keeping the landing gear door 44 structurally durable. In addition, the acoustic treatment assembly 50 (see FIGS. 5, 6A-6B) is able to operate in a wide range of temperatures and environments (e.g., rain, snow, icing), and is able to get the fluid 130, the fluid build-up 130a, liquid, water, condensation, and/or moisture out of the acoustic treatment assembly 50 and the landing gear door 44, so that the fluid 130, the fluid build-up 130a, liquid, water, condensation, and/or moisture does not freeze and expand at altitude, that is, flying at altitude, for example, high altitude. The implementation of an integrated drainage strategy, such as the drainage system 80, within the plurality of core cells 100 (see FIGS. 6A-6B, 7D) of the core structure 94, ensures that the fluid 130, the fluid build-up 130a, liquid, water, condensation, and/or moisture does not build up, freeze, and expand within the structure of the landing gear door 44 of the acoustically treated landing gear door 12. Further, the acoustically treated landing gear door 12 with the durable acoustic treatment assembly 50 and the efficient drainage system 80, is a viable solution for a producible aircraft landing gear part because it is practically usable and able to withstand all types of weather conditions (e.g., rain, snow, icing).

Moreover, disclosed versions of the acoustically treated landing gear door 12 (see FIGS. 1-7A) and the method 280 (see FIG. 15) provide the acoustic facesheet 96, such as the porous facesheet 152 (see FIGS. 5, 6A-6B, 10B) or the perforated facesheet 156 (see FIGS. 5, 7B), on which the placard 64 (see FIGS. 3B, 5, 11A, 12), such as the servicing placard 64a (see FIGS. 3B, 5, 11A, 12), may be printed, for example, 3D (three-dimensional) printed, reproduced, or formed, on a portion 50a (see FIG. 3B) of the acoustic treatment assembly 50, such as a portion 96a (see FIG. 3B) of the acoustic facesheet 96. Disclosed versions of the acoustically treated landing gear door 12 (see FIGS. 1-7A) and the method 280 (see FIG. 15) allow the placard 64, such as the servicing placard 64a, to be printed, reproduced, or formed on the acoustic facesheet 96, such as the porous facesheet 152, and use the exterior placard surface 170 (see FIG. 11A) and surface area as part of the acoustically treated landing gear door 12. The placard 64, such as the servicing placard 64a, may be in the form of the porous placard 240 (see FIG. 11A) or the perforated placard 244 (see FIG. 12), or another suitable form, and has the exterior placard surface 170 (see FIGS. 11A, 12) that displays markings 172 (see FIG. 12) that are legible and readable, while maintaining the controlled porosity 148 (see FIG. 5), or desired porosity, of the acoustic facesheet 96. The markings 172 on the placard 64, such as the servicing placard 64a, may comprise words 172a (see FIGS. 11A, 12), text 172b (see FIG. 12), graphics 172c (see FIG. 12), numbers 172d (see FIG. 12), letters 172e (see FIG. 12), drawings 172f (see FIG. 12), symbols 172g (see FIG. 12), and other suitable information that is legible and readable to an operator, a service person, ground handling personnel, or another suitable user reading the placard 64, such as the servicing placard 64a, on the landing gear door 44 of the aircraft 10. In a preferred form, the placard 64, such as the servicing placard 64a, comprises the porous placard 240 (see FIG. 11A), where the porosity is maintained for acoustic or sound dampening, while maintaining the legibility of the placard 64, such as the servicing placard 64a. The porous material 154 (see FIG. 5) of the porous facesheet 142 has a sufficient surface continuity such that the markings 172, for example, printed servicing instructions, applied thereon are legible and readable. The exterior placard surface 170 (see FIGS. 11B-11C), or the external porous surface, of the porous placard 240 (see FIG. 11A) defines a plurality of holes 242a (see FIG. 11B), or a plurality of holes 242b (see FIG. 11C), where the size of the holes 242a, or holes 242b is small enough such that the markings 172 (see FIG. 1A) are legible but the number of holes 242a, or holes 242b, is large enough for the controlled porosity 148 (see FIG. 5) to be maintained. For the placard 64, such as the servicing placard 64a, printed, reproduced, or formed on the perforated facesheet 156, the perforation diameter 161 (see FIG. 7B) and size of the plurality of perforations 160 (see FIG. 7B) chosen are preferably very small and the controlled porosity 148 (see FIG. 5), or desired porosity, is also maintained, so that the markings 172 on the placard 64, such as the servicing placard 64*a*, are legible and readable.

In addition, disclosed versions of the acoustically treated landing gear door 12 (see FIGS. 1-7A) and the method 280 (see FIG. 15) provide a cost effective means for attenuating sound 84, such as noise 86, produced by the landing gear 24 of the aircraft 10, within a number of selected frequency ranges. In particular, the acoustically treated landing gear door 12 reduces or attenuates sound 84, such as noise 86, over a frequency range including tones for all weather conditions, and the acoustically treated landing gear door 12 is practically usable in a wide range of temperatures and environments. Further, the acoustically treated landing gear door 12 is low weight and does not add unwanted weight to the aircraft 10, is simple to construct and does not add mechanical complexity to the landing gear 24 or the landing gear door 44, and does not disturb the air flow field.

Many modifications and other versions or embodiments of the disclosure will come to mind to one skilled in the art to which this disclosure pertains having the benefit of the teachings presented in the foregoing descriptions and the associated drawings. The versions or embodiments described herein are meant to be illustrative and are not intended to be limiting or exhaustive. Although specific terms are employed herein, they are used in a generic and descriptive sense only and not for purposes of limitation.

What is claimed is:

1. An acoustically treated landing gear door for reducing noise from a landing gear of an aircraft, the acoustically treated landing gear door comprising:
 a landing gear door configured for attachment to the aircraft, the landing gear door comprising an acoustic treatment assembly integrated on an inner mold line of an interior side of the landing gear door, and extending within an interior cavity of the landing gear door, the acoustic treatment assembly comprising:
  a core structure comprising:
   a first side and a second side;
   a plurality of core cells extending between the first side and the second side; and
   a drainage system configured to evacuate fluid from the core structure, the drainage system having a plurality of drainage paths coupled to one or more drainage exits, the plurality of drainage paths interconnected between the plurality of core cells, and the one or more drainage exits located at one or more perimeter portions of the landing gear door;
  an acoustic facesheet coupled atop the first side of the core structure, the acoustic facesheet allowing fluid communication between an external environment and the plurality of core cells; and
  a nonporous backsheet directly coupled between the second side of the core structure and a portion of the interior cavity of the landing gear door,
 wherein the landing gear door further comprises a placard printed on a portion of the acoustic facesheet, the placard having an exterior placard surface displaying markings that are legible, while maintaining a controlled porosity, and
 wherein when the landing gear of the aircraft is in a deployed position, the acoustically treated landing gear door reduces the noise created by acoustic waves emanating from the landing gear, by absorbing the acoustic waves through the acoustic facesheet and the core structure of the acoustic treatment assembly, and reflecting the acoustic waves off the nonporous backsheet of the acoustic treatment assembly.

2. The acoustically treated landing gear door of claim 1, wherein the core structure further comprises one or more porous septum layers disposed between the first side and the second side of the core structure, and coupled to one or more of the plurality of core cells, wherein each of the one or more porous septum layers divides each of one or more the plurality of core cells into at least two core cell portions.

3. The acoustically treated landing gear door of claim 1, wherein each of the plurality of core cells has a shape comprising one of, a hexagonal cylinder shape, a rectangular cylinder shape, a cylinder shape, a flared cylinder shape, a tapered cylinder shape, a truncated cone cylinder shape, a bell cylinder shape, a nested flared cylinder shape, and a nested tapered cylinder shape.

4. The acoustically treated landing gear door of claim 1, wherein the acoustic facesheet comprises a porous facesheet made of a porous material comprising one of, porous metal, cast porous metal, porous titanium, sintered titanium, porous aluminum, sintered aluminum, sintered aluminum powder with epoxy binder, and porous thermoplastic.

5. The acoustically treated landing gear door of claim 1, wherein the acoustic facesheet comprises a perforated facesheet having a plurality of perforations each with a perforation shape comprising one of, a circle shape, a slot shape, an oval shape, a square shape, a rectangle shape, and a polygon shape.

6. The acoustically treated landing gear door of claim 1, wherein the acoustic facesheet has a controlled porosity in a range of from 4 percent open area to 25 percent open area.

7. The acoustically treated landing gear door of claim 1, wherein the markings displayed on the exterior placard surface of the placard comprise one or more of, words, text, graphics, numbers, letters, drawings, and symbols.

8. The acoustically treated landing gear door of claim 1, wherein the placard comprises one of, a laser drilled porous placard, and a sintered porous placard.

9. The acoustically treated landing gear door of claim 1, wherein the landing gear door of the aircraft comprises one or more of, a main landing gear door, and a nose landing gear door.

10. An aircraft comprising:
 a fuselage;
 one or more wings attached to the fuselage;
 one or more main landing gear retractably coupled to a center undercarriage portion of the fuselage;
 a nose landing gear retractably coupled to a nose undercarriage portion of the fuselage;
 one or more acoustically treated landing gear doors, each comprising:
  a landing gear door attached to the fuselage, the landing gear door associated with one of, the one or more main landing gear, and the nose landing gear;
  an acoustic treatment assembly integrated on an inner mold line of an interior side of the landing gear door, and extending within an interior cavity of the landing gear door, the acoustic treatment assembly comprising:
   a core structure comprising:
    a first side and a second side;
    a plurality of core cells extending between the first side and the second side;
    one or more porous septum layers coupled to one or more of the plurality of core cells; and a drainage system configured to evacuate fluid from the core structure, the drainage system having a plurality of drainage paths coupled to one or more drainage exits, the plurality of drainage paths interconnected between the plurality of core cells, and the one or more drainage exits located at one or more perimeter portions of the landing gear door;

an acoustic facesheet coupled atop the first side of the core structure, the acoustic facesheet allowing fluid communication between an external environment and the plurality of core cells; and a nonporous backsheet directly coupled between the second side of the core structure and a portion of the interior cavity of the landing gear door, wherein the landing gear door comprises a placard printed on a portion of the acoustic facesheet, the placard having an exterior placard surface displaying markings that are legible, while maintaining a controlled porosity, and wherein each of the one or more acoustically treated landing gear doors reduces noise created by acoustic waves emanating from one of, the one or more main landing gear, and the nose landing gear, in a deployed position, by absorbing the acoustic waves through the acoustic facesheet and the core structure of the acoustic treatment assembly, and reflecting the acoustic waves off the nonporous backsheet of the acoustic treatment assembly.

11. The aircraft of claim 10, wherein the acoustic facesheet of the acoustic treatment assembly comprises a porous facesheet made of a porous material comprising one of, porous metal, cast porous metal, porous titanium, sintered titanium, porous aluminum, sintered aluminum, sintered aluminum powder with epoxy binder, and porous thermoplastic.

12. The aircraft of claim 10, wherein the acoustic facesheet of the acoustic treatment assembly comprises a perforated facesheet having a plurality of perforations each with a perforation shape comprising one of, a circle shape, a slot shape, an oval shape, a square shape, a rectangle shape, and a polygon shape.

13. The aircraft of claim 10, wherein the placard comprises one of, a laser drilled porous placard, and a sintered porous placard.

14. The aircraft of claim 10, wherein the landing gear door comprises one or more of, a main landing gear door, including a main landing gear strut door and a main landing gear body door, and a nose landing gear door, including a first forward nose landing gear door, a second forward nose landing gear door, a first aft nose landing gear door, and a second aft nose landing gear door.

15. A method for reducing noise from a landing gear of an aircraft, the method comprising the steps of:
providing one or more acoustically treated landing gear doors, each acoustically treated landing gear door comprising:
a landing gear door having an acoustic treatment assembly integrated on an inner mold line of an interior side of the landing gear door, and extending within an interior cavity of the landing gear door, the acoustic treatment assembly comprising:
a core structure comprising:
a first side and a second side;
a plurality of core cells extending between the first side and the second side; and
a drainage system having a plurality of drainage paths interconnected between the plurality of core cells, the plurality of drainage paths coupled to one or more drainage exits located at one or more perimeter portions of the landing gear door;

an acoustic facesheet coupled atop the first side of the core structure, wherein a placard is printed on a portion of the acoustic facesheet using one of, a laser drilling process, and a sintering process, and wherein the placard has an exterior placard surface displaying markings that are legible, while maintaining a controlled porosity; and a nonporous backsheet directly coupled between the second side of the core structure and a portion of the interior cavity of the landing gear door;

attaching the one or more acoustically treated landing gear doors to a fuselage of the aircraft;
opening the one or more acoustically treated landing gear doors during a takeoff phase, or a landing phase, of the aircraft, and deploying the landing gear of the aircraft; and
reducing the noise created by acoustic waves emanating from the landing gear, by absorbing the acoustic waves through the acoustic facesheet and the core structure of the acoustic treatment assembly, and reflecting the acoustic waves off the nonporous backsheet of the acoustic treatment assembly.

16. The method of claim 15, further comprising after the step of opening the one or more acoustically treated landing gear doors during the takeoff phase, or the landing phase, evacuating from the core structure, a fluid build-up of fluid in the plurality of core cells, using the drainage system, and minimizing a drainage time of evacuating the fluid.

17. The method of claim 15, wherein the step of providing the one or more acoustically treated landing gear doors further comprises, coupling one or more porous septum layers to one or more of the plurality of core cells between the first side and the second side of the core structure, wherein each of the one or more porous septum layers divides each of the one or more of the plurality of core cells into at least two core cell portions.

18. The method of claim 17, wherein the step of providing the one or more acoustically treated landing gear doors further comprises, forming the core structure with the one or more porous septum layers in one of, a sandwich structure, and a monolithic structure.

19. The method of claim 15, wherein the step of providing the one or more acoustically treated landing gear doors further comprises, forming the acoustic facesheet comprising a porous facesheet made of a porous material comprising one of, porous metal, cast porous metal, porous titanium, sintered titanium, porous aluminum, sintered aluminum, sintered aluminum powder with epoxy binder, and porous thermoplastic.

20. The method of claim 15, wherein the step of providing the one or more acoustically treated landing gear doors further comprises, forming the acoustic facesheet having a controlled porosity, to allow fluid communication between an external environment and the plurality of core cells, wherein the controlled porosity is in a range of from 4 percent open area to 25 percent open area.

* * * * *